US012129702B2

United States Patent
Eom et al.

(10) Patent No.: US 12,129,702 B2
(45) Date of Patent: Oct. 29, 2024

(54) REFRIGERATOR AND CONTROL METHOD THEREOF

(71) Applicant: SAMSUNG ELECTRONICS CO., LTD., Suwon-si (KR)

(72) Inventors: Taein Eom, Suwon-si (KR); Daesung Ki, Suwon-si (KR); Chanyoung Park, Suwon-si (KR); Hyunuk Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 17/732,679

(22) Filed: Apr. 29, 2022

(65) Prior Publication Data

US 2023/0003072 A1  Jan. 5, 2023

Related U.S. Application Data

(63) Continuation of application No. PCT/KR2022/005347, filed on Apr. 13, 2022.

(30) Foreign Application Priority Data

Jun. 30, 2021 (KR) .................. 10-2021-0085800

(51) Int. Cl.
  *E05F 15/614* (2015.01)
  *F25D 23/02* (2006.01)

(52) U.S. Cl.
  CPC .......... *E05F 15/614* (2015.01); *F25D 23/028* (2013.01); *E05Y 2900/31* (2013.01); *F25D 2323/024* (2013.01); *F25D 2700/02* (2013.01)

(58) Field of Classification Search
  CPC ....... E05F 15/614; E05F 15/07; E05F 15/619; E05F 15/616; E05F 2015/767;
  (Continued)

(56) References Cited

U.S. PATENT DOCUMENTS 9,695,624 B2  7/2017  Heydel et al.
10,132,555 B2  11/2018  Yasaka et al.
(Continued)

FOREIGN PATENT DOCUMENTS

CN  111721055 A  9/2020
CN  111997476 A  * 11/2020  ............ E05F 15/614
(Continued)

OTHER PUBLICATIONS

English translation for JP2006090982A (Year: 2006).*
(Continued)

*Primary Examiner* — Hiwot E Tefera
(74) *Attorney, Agent, or Firm* — STAAS & HALSEY LLP

(57) ABSTRACT

A refrigerator and a control method thereof. The refrigerator includes a housing, a door configured to be rotatably coupled to the housing by including a hinge shaft and a hinge gear fixed to the hinge shaft, and a door opening and closing device provided at one end of the door to control opening and closing of the door. The door opening and closing device includes a drive motor, a final gear configured to receive power from the drive motor and transmit the power to the hinge shaft, the final gear arranged at one end of the door opening and closing device to interlock with the hinge gear, and a door position sensor arranged on one side of the final gear to detect a rotation angle of the final gear.

19 Claims, 38 Drawing Sheets

(58) Field of Classification Search
CPC ............ F25D 23/028; F25D 2323/024; F25D 2700/02; F25D 29/00; F25D 2700/04; E05Y 2900/31; E05Y 2201/426; E05Y 2201/434; E05Y 2400/44; E05Y 2201/43; E05Y 2400/32; E05Y 2201/71; E05Y 2201/46

See application file for complete search history.

(56) References Cited

U.S. PATENT DOCUMENTS

| | | | |
|---|---|---|---|
| 10,309,143 B2 | 6/2019 | Eom et al. | |
| 10,995,536 B2 | 5/2021 | Song et al. | |
| 11,041,671 B2 | 6/2021 | Kim et al. | |
| 2008/0051961 A1 | 2/2008 | Ebashi et al. | |
| 2012/0017512 A1* | 1/2012 | Lee | E05F 15/614 49/358 |
| 2013/0154461 A1* | 6/2013 | Bohle | E05F 15/614 312/319.6 |
| 2017/0097185 A1* | 4/2017 | Yasaka | E05F 15/614 |
| 2017/0260794 A1* | 9/2017 | Son | E05F 15/619 |
| 2017/0261252 A1* | 9/2017 | Son | F25D 11/00 |
| 2017/0284144 A1* | 10/2017 | Yasaka | F25D 23/028 |
| 2017/0336132 A1* | 11/2017 | Chang | F25D 23/028 |
| 2018/0223582 A1* | 8/2018 | Shin | E05F 15/619 |
| 2018/0334844 A1* | 11/2018 | Eom | F25D 23/028 |
| 2018/0334846 A1* | 11/2018 | Eom | E05F 15/73 |
| 2019/0162006 A1* | 5/2019 | Lee | E05F 15/619 |
| 2020/0263918 A1* | 8/2020 | Lee | E05F 17/004 |
| 2021/0270519 A1 | 9/2021 | Yoon | |
| 2022/0145686 A1* | 5/2022 | Li | E05F 15/614 |

FOREIGN PATENT DOCUMENTS

| | | | |
|---|---|---|---|
| CN | 112031580 B * | 6/2021 | ............ E05C 17/56 |
| JP | 2005-120697 | 5/2005 | |
| JP | 2006-90982 | 4/2006 | |
| JP | 2010-25461 | 2/2010 | |
| JP | 2016-11798 | 1/2016 | |
| KR | 20-0223441 | 5/2001 | |
| KR | 10-2009-0075278 | 7/2009 | |
| KR | 10-1409605 | 6/2014 | |
| KR | 10-2017-0014564 | 2/2017 | |
| KR | 10-2017-0040738 | 4/2017 | |
| KR | 10-2017-0094548 | 8/2017 | |
| KR | 10-2020-0007590 | 1/2020 | |
| KR | 10-2342576 | 12/2021 | |
| KR | 10-2357610 | 2/2022 | |
| KR | 10-2393923 | 5/2022 | |
| KR | 10-2412016 | 6/2022 | |
| WO | WO 2017/061767 A1 | 4/2017 | |

OTHER PUBLICATIONS

International Search Report dated Aug. 5, 2022 for International Application No. PCT/KR2022/005347.
Written Opinion of the International Searching Authority dated Aug. 5, 2022 for International Application No. PCT/KR2022/005347.
Extended European Search Report dated May 31, 2024 for European Application No. 22833371.2.

* cited by examiner

FIG. 20
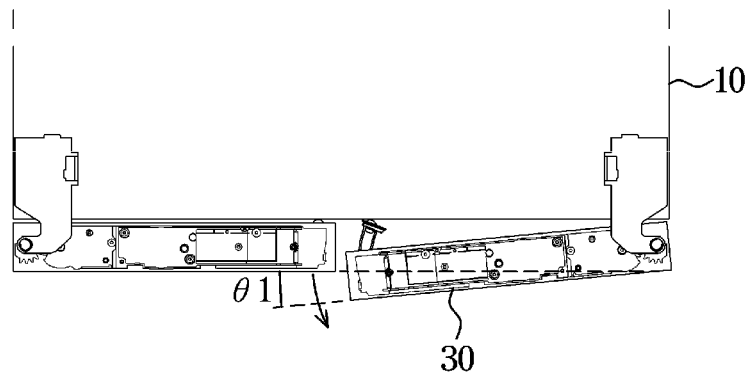
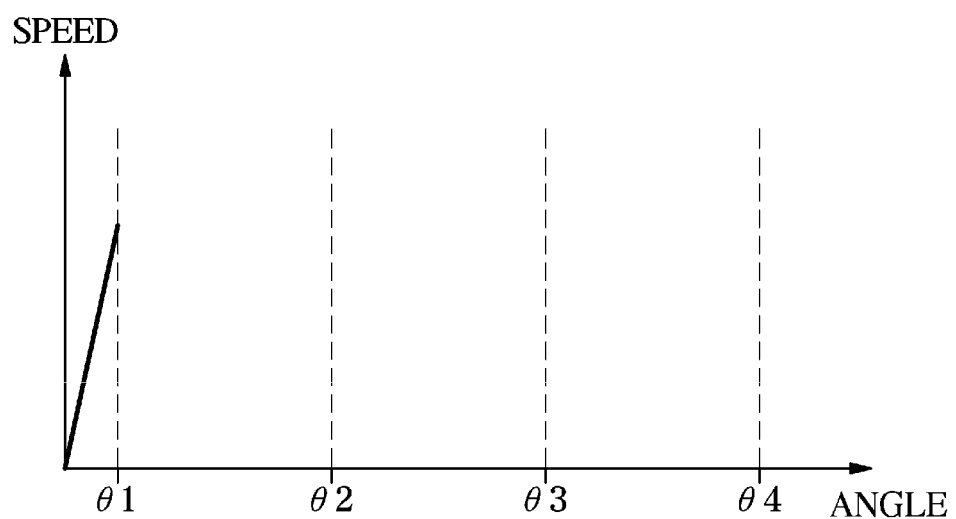

FIG. 21
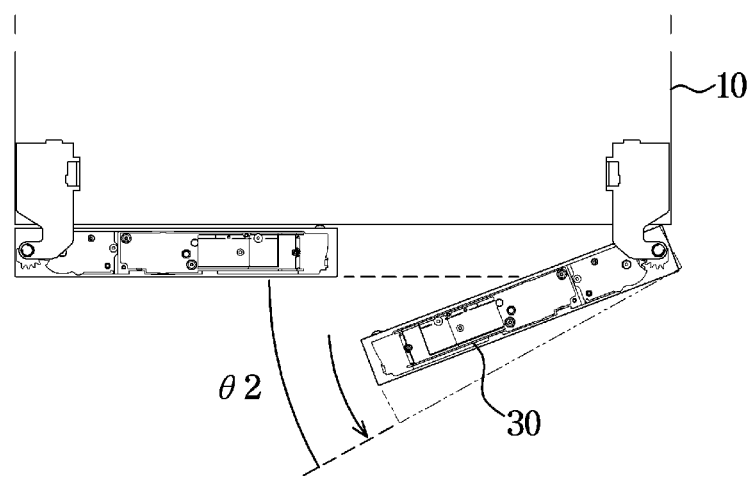
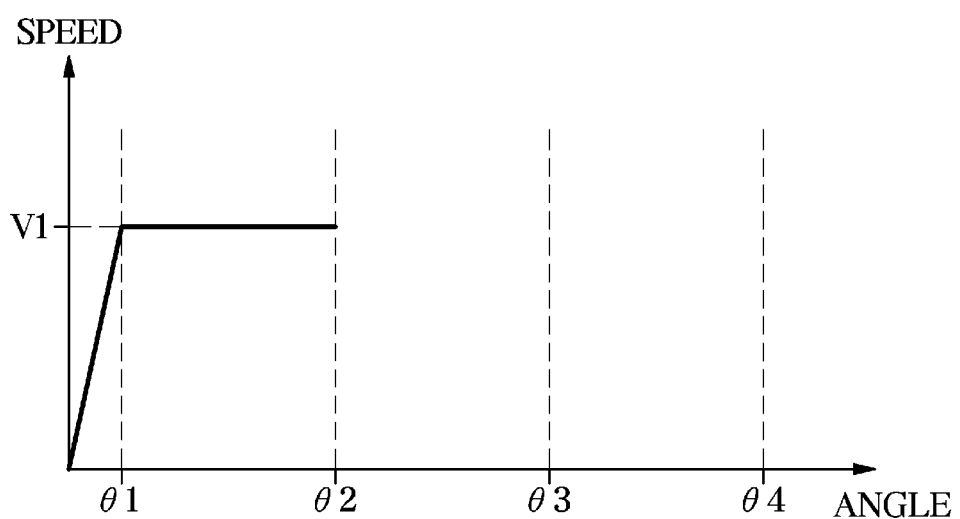

FIG. 22
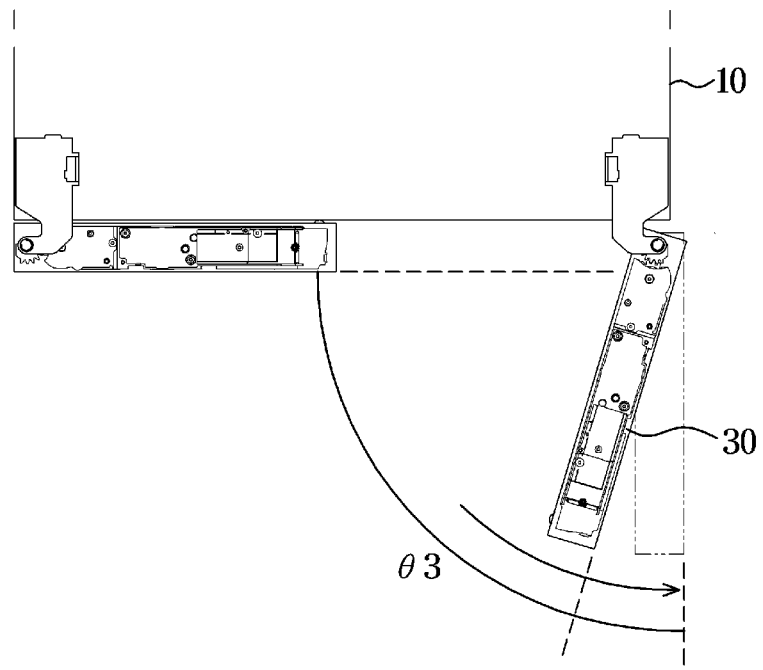
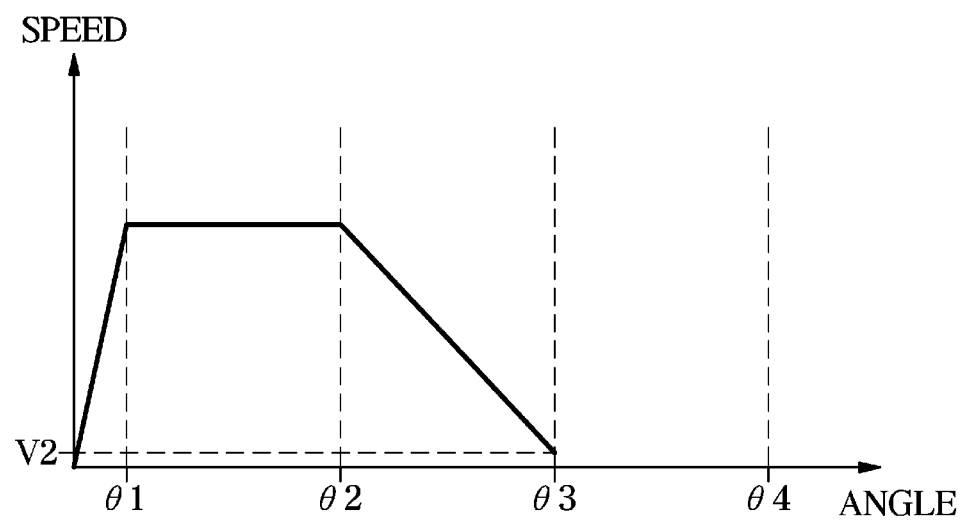

FIG. 23
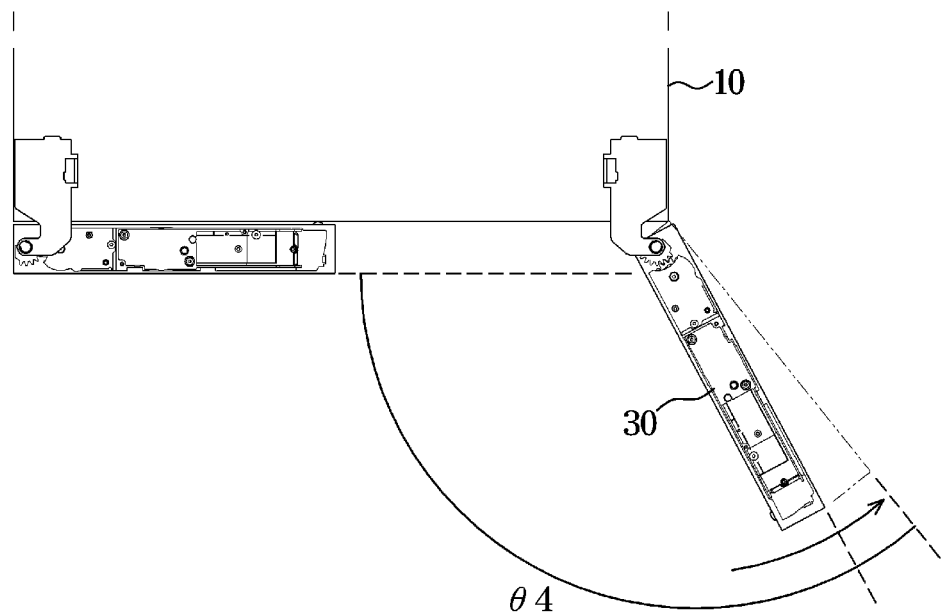
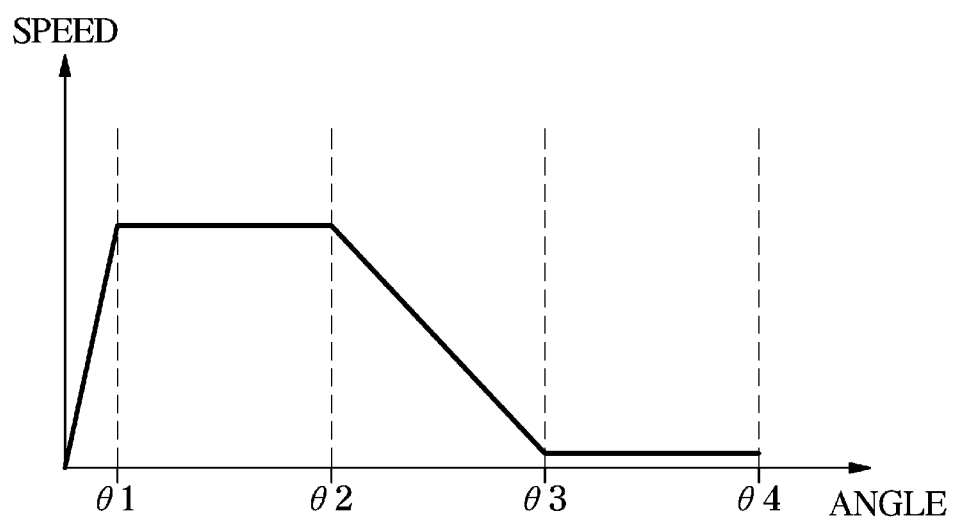

FIG. 25
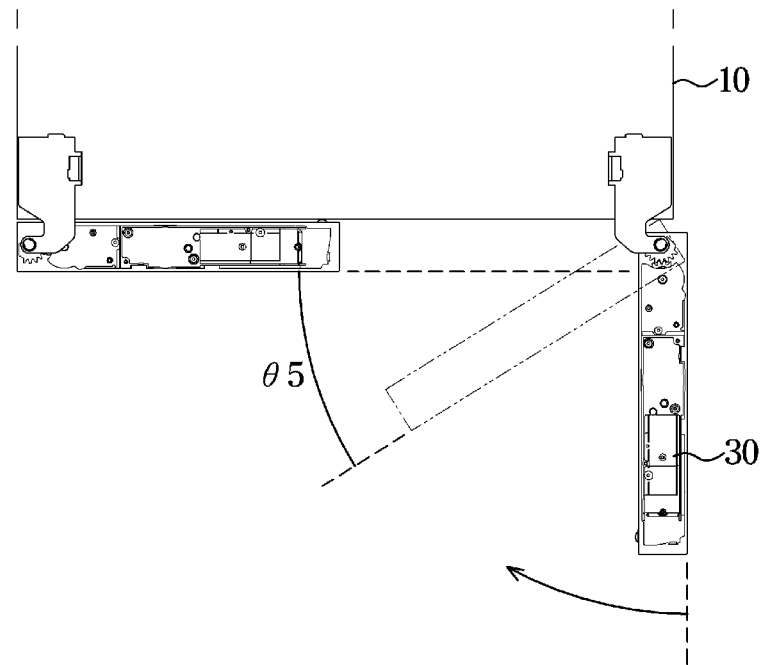
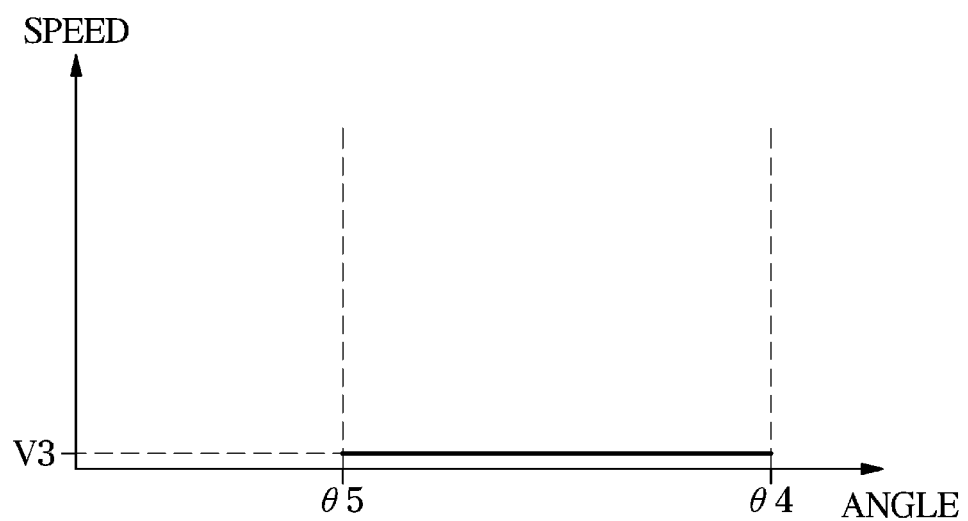

FIG. 26
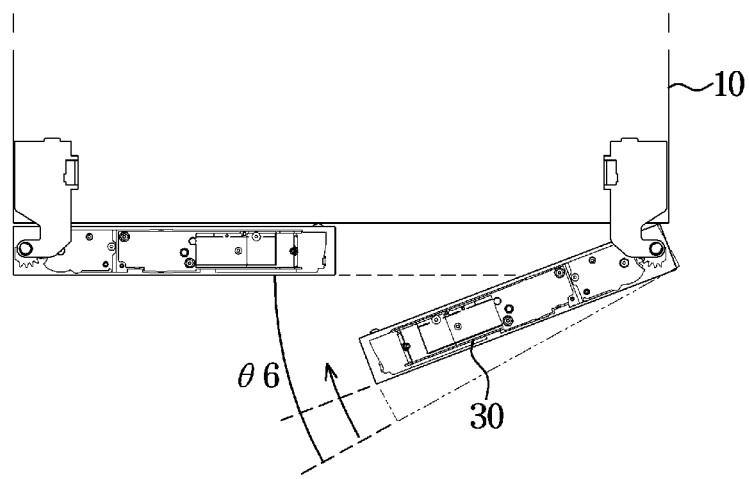
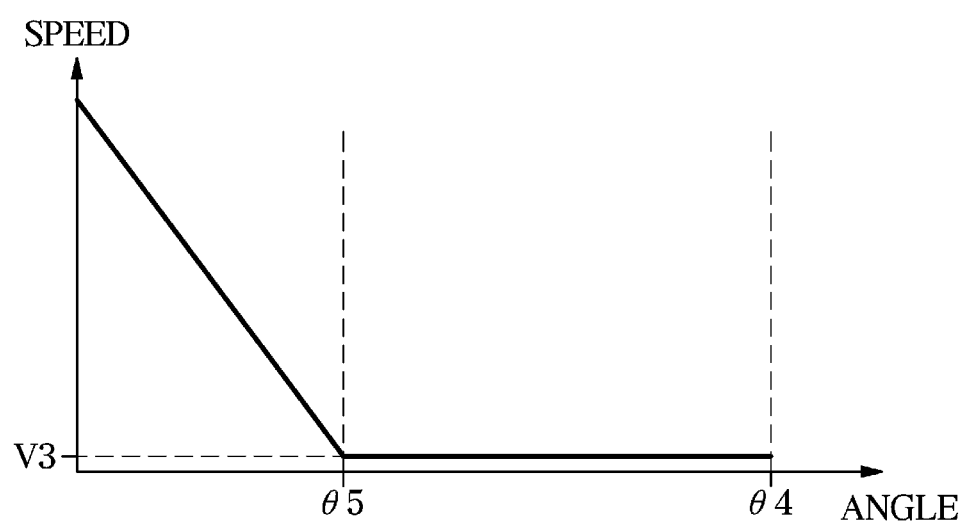

REFRIGERATOR AND CONTROL METHOD THEREOF

CROSS-REFERENCE TO RELATED APPLICATION(S)

This application is a continuation application, under 35 U.S.C. § 111(a), of International Application No. PCT/KR2022/005347, filed Apr. 13, 2022, which is based on and claims priority under 35 U.S.C. § 119 to Korean Patent Application No. 10-2021-0085800, filed on Jun. 30, 2021, in the Korean Intellectual Property Office, the disclosure of which is incorporated by reference herein in their entireties.

BACKGROUND

Field

The disclosure relates to a refrigerator and a control method thereof.

Description of Related Art

In general, a refrigerator is a device that keeps food fresh by including a storage compartment and a cold air supply device configured to supply cold air to the storage compartment. A temperature of the storage compartment is maintained at a temperature within a certain range required to keep the food fresh.

The storage compartment of the refrigerator is provided with an open front surface and the open front surface is closed by a door so as to maintain a temperature of the storage compartment. The door may be opened and closed manually, but may also be opened and closed automatically using a separate power. There is a demand to detect the position and/or angle of the door as well as a demand to detect whether the operation of the door is started, when the door is automatically opened and closed.

SUMMARY

Additional aspects of the disclosure will be set forth in part in the description which follows and, in part, will be obvious from the description, or may be learned by practice of the disclosure.

In accordance with an aspect of the disclosure, a refrigerator includes a housing, a door configured to be rotatably couplable to the housing by a hinge shaft and a hinge gear fixed to the hinge shaft, and a door opening and closing assembly provided at an end of the door to control opening of the door and closing of the door. The door opening and closing assembly comprises a drive motor, a final gear to receive power from the drive motor and to transmit the power to the hinge shaft, the final gear being arranged at an end of the door opening and closing assembly to interlock with the hinge gear to thereby allow the opening of the door and the closing of the door according to the received power, and a door position sensor arranged a one side of the final gear to detect a rotation angle of the final gear.

The door opening and closing assembly may further include a magnet provided to interact with the door position sensor and formed in an annular shape to be accommodated in the final gear.

The door position sensor may be arranged under the magnet to face the magnet so as to detect a change in polarity of the magnet in response to power transmitted to the hinge shaft by the final gear.

The door opening and closing assembly may further include a case in which the drive motor, the final gear and the door position sensor are accommodated. The final gear may include a central portion couplable to the case with respect to a rotation axis of the final gear, a tooth formed to protrude outwardly from the central portion to interlock with the hinge gear, a recess formed in an annular shape between the central portion and the tooth to accommodate the magnet, and a prevention protrusion formed to protrude from the central portion to the tooth to prevent the magnet from being separated from the recess.

The magnet may be accommodated in the recess by being coupled to the final gear, and the magnet may include an inner protrusion formed to protrude toward an inside of the magnet to interfere with the prevention protrusion.

The magnet may be insertable into the recess from a lower side of the final gear toward an upper side the final gear, and rotatable clockwise or counterclockwise within the recess so that the magnet is coupled to the final gear.

The prevention protrusion may be provided under the central portion to prevent the magnet, which is accommodated in the recess, from being separated from the recess, and the inner protrusion may be arranged above the prevention protrusion while the magnet is accommodated in the recess.

The refrigerator may further include a motor drive configured to apply a driving voltage to the drive motor, and a processor connected to the door position sensor and the motor drive. The processor may be configured to identify an angle between the door and the housing based on an output signal of the door position sensor, and configured to control the motor drive to allow the drive motor to rotate the door based on the identified angle.

The processor may be configured to control the motor drive to stop opening of the door or closing of the door based on identifying that the door is stopped while the processor controls the motor drive to open the door or close the door.

The processor may be configured to control the motor drive to stop opening of the door based on identifying that the door is being closed while the processor controls the motor drive to open the door, and configured to control the motor drive to stop closing of the door based on identifying that the door is being opened while the processor controls the motor drive to close the door.

The refrigerator may further include a microphone. The processor may be configured to control the motor drive to open the door based on a voice signal through the microphone.

The refrigerator may further include an object sensor. The processor may be configured to detect a user around the refrigerator based on an output signal of the object sensor, and configured to control the motor drive to close the opened door based on a time, for which the user is undetected, being greater than or equal to a period of time.

The processor may be configured to control the motor drive to control a speed, at which the door is opened or closed, based on the identified angle.

The processor may be configured to control the motor drive to apply a substantially maximum driving voltage to the drive motor based on the identified angle being less than a first angle while opening the door, configured to control the motor drive to open the door at a first speed based on the identified angle being greater than or equal to the first angle and less than a second angle while opening the door, configured to control the motor drive to gradually decrease an opening speed of the door based on the identified angle being greater than or equal to the second angle and less than a third angle while opening of the door, and configured to control the motor drive to open the door at a second speed less than the first speed, based on the identified angle being greater than or equal to the third angle and less than a fourth angle while opening the door.

The processor may be configured to control the motor drive to close the door at a third speed based on the identified angle being greater than or equal to a fifth angle while closing the door and configured to control the motor drive to apply a substantially maximum driving voltage to the drive motor based on the identified angle being less than the fifth angle while closing the door.

In accordance with another aspect of the disclosure, a control method of a refrigerator including a housing and a door rotatably coupled to the housing includes identifying an angle of the door, rotating the door to allow the door to be opened or closed based on the identified angle, and stopping opening or closing of the door based on identifying that the door is stopped while opening or closing the door.

The control method may further include stopping opening of the door based on identifying that the door is being closed while opening the door, and stopping closing of the door based on identifying that the door is being opened while closing the door.

The control method may further include closing the opened door based on a time, for which a user is not detected around the refrigerator, being greater than or equal to a first period of time.

The rotating of the door may include adjusting a speed, at which the door is opened or closed, based on the identified angle.

In accordance with another aspect of the disclosure, a refrigerator includes a housing, a door configured to be rotatably coupled to the housing, a door position sensor configured to output an output signal indicating rotation of the door, a drive motor configured to rotate the door so as to open or close the door, a motor drive configured to apply a driving voltage to the drive motor, and a processor connected to the door position sensor and the motor drive. The processor is configured to identify an angle between the door and the housing based on the output signal of the door position sensor, and configured to control the motor drive to allow the drive motor to rotate the door based on the identified angle.

BRIEF DESCRIPTION OF THE DRAWINGS

The above and other aspects, features, and advantages of certain embodiments of the present disclosure will be more apparent from the following description taken in conjunction with the accompanying drawings of which:

FIG. 20 is a view illustrating an example in which the refrigerator controls a speed of opening the door according to an angle of the door according to the method illustrated in FIG. 19;

FIG. 21 is a view illustrating an example in which the refrigerator controls the speed of opening the door according to an angle of the door according to the method illustrated in FIG. 19;

FIG. 22 is a view illustrating an example in which the refrigerator controls the speed of opening the door according to an angle of the door according to the method illustrated in FIG. 19;

FIG. 23 is a view illustrating an example in which the refrigerator controls the speed of opening the door according to an angle of the door according to the method illustrated in FIG. 19;

FIG. 25 is a view illustrating an example in which the refrigerator controls a speed of closing the door according to an angle of the door according to the method illustrated in FIG. 24;

FIG. 26 is a view illustrating an example in which the refrigerator controls the speed of closing the door according to an angle of the door according to the method illustrated in FIG. 24;

DETAILED DESCRIPTION

Figure 1:
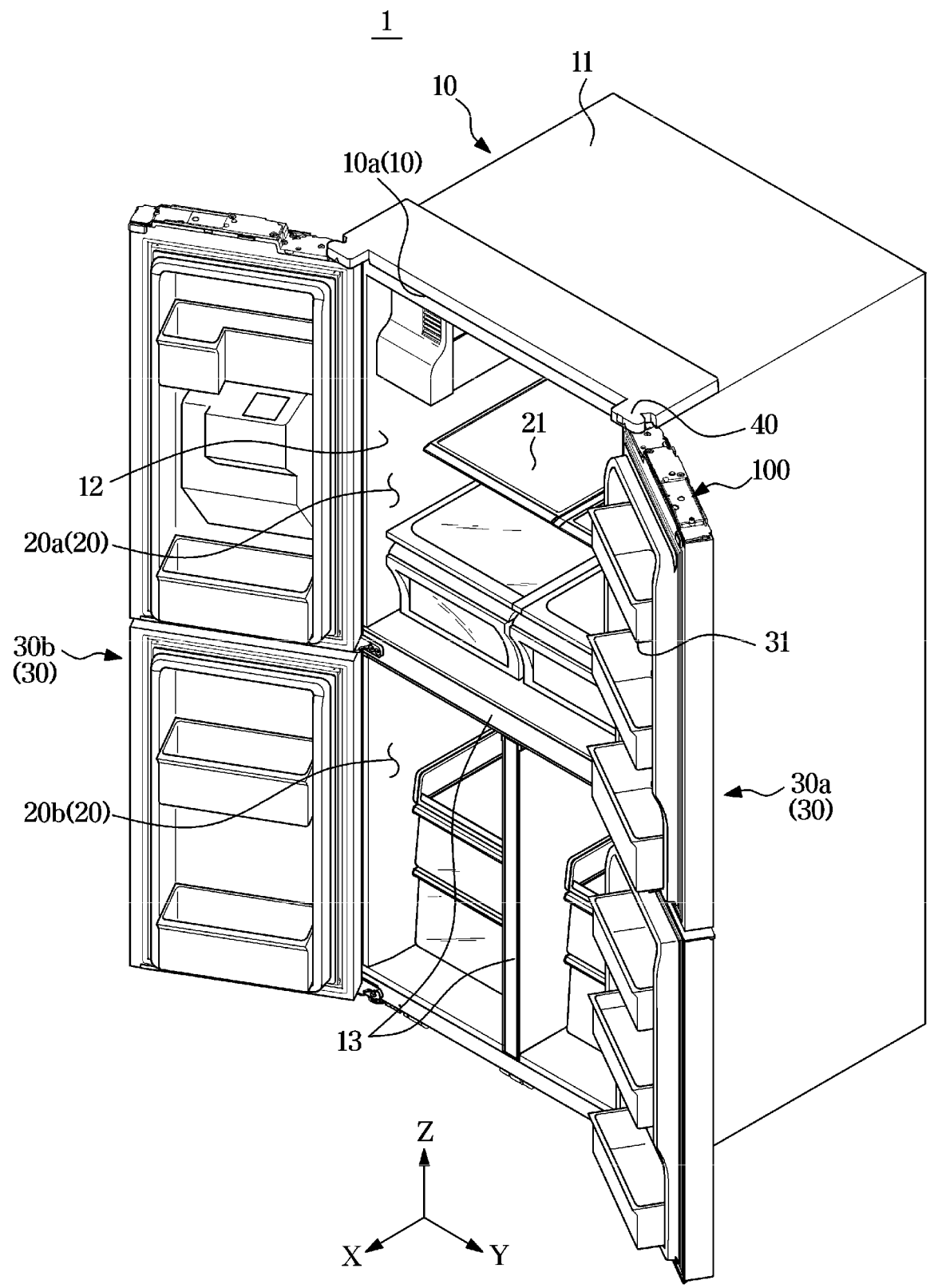
FIG. 1 is a view illustrating a refrigerator according to an embodiment of the disclosure.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front side", "rear side", "left side", "right side" and the like may be defined by the drawings, but the shape and the position of the component is not limited by the term.

Therefore, it is an aspect of the disclosure to provide a refrigerator capable of detecting a current position of a door and a control method thereof.

It is another aspect of the disclosure to provide a refrigerator capable of controlling a door opening and closing speed by detecting a current position of a door and a control method thereof.

It is another aspect of the disclosure to provide a refrigerator capable of, in response to an abnormal situation during operation of a door, stopping the operation of the door, and a control method thereof. Hereinafter an embodiment according to the disclosure will be described in detail with reference to the accompanying drawings.

FIG. 1 is a view illustrating a refrigerator according to an embodiment of the disclosure.

Referring to FIG. 1, a refrigerator 1 includes a housing 10 including a main body and a front surface that is partially open, a storage compartment 20 arranged inside the housing 10 and provided with an open front surface, and a door 30 rotatably coupled to the housing 10 to open and close the open front surface of the storage compartment 20.

The housing 10 includes an inner case 11 forming the storage compartment 20 and an outer case 12 forming an outer appearance. A cold air supply device (not shown) configured to supply cold air to the storage compartment 20 is arranged inside the housing 10.

The cold air supply device may include a compressor, a condenser, an expansion valve, an evaporator, a fan, a cold air duct, etc., and an insulating material (not shown) is foamed between the inner case 11 and the outer case 12 of the storage compartment 20 so as to prevent leakage of cold air of the storage compartment 20.

The storage compartment 20 may be divided into a refrigerating compartment 20a and a freezing compartment 20b by a partition wall 13. The refrigerating compartment 20a and the freezing compartment 20b may be opened and closed by a refrigerating compartment door 30a and a freezing compartment door 30b rotatably coupled to the main body. A plurality of door guards 31 in which food is stored may be installed on a rear surface of the door 30.

The door 30 may be opened and closed manually by a user, or may be opened and closed automatically by a door opening and closing device 100. The door opening and closing device 100 may include a drive motor 110 (refer to FIG. 3) provided therein, and may open and close the door 30 by using the power of the drive motor 110. The door 30 may be coupled to a hinge 40 so as to be rotatable about a hinge shaft 40a of the hinge 40 fixed to the housing 10. The hinges 40 provided on the left and right sides of the housing 10 on the same height may be integrally formed and at the same time, form a part of the housing front surface 10a. However, the disclosure is not limited thereto, and the hinges 40 may be separately provided on the left and right sides.

A plurality of shelves 21 may be provided inside the storage compartment 20 to partition the refrigerating compartment 20a and the freezing compartment 20b into a plurality of spaces, respectively. The shelf 21 may be detachably mounted on a protrusion (not shown) provided in the storage compartment 20.

Hereinafter the door opening and closing device 100 (also referred to as door opening and closing assembly) will be described in detail. The door 30 to be described below may include the refrigerating compartment door 30a and the freezing compartment door 30b. The door opening and closing device 100 may be provided to correspond to all or some doors of the refrigerator 1. The refrigerator 1 may include a plurality of door opening and closing devices 100. Contents to be described below relate to the door opening and closing device 100 for a door located on the right when the refrigerator 1 is viewed from the front, but the same may be applied to a door opening and closing device 100 for a door located on the left when the refrigerator 1 is viewed from the front.

The door opening and closing device 100 may be provided on one side of the door 30. Particularly, the door opening and closing device 100 may be arranged at an upper end of the door 30. However, the disclosure is not limited thereto. For example, the door opening and closing device 100 may be arranged at a lower end of the door 30.

Figure 2:
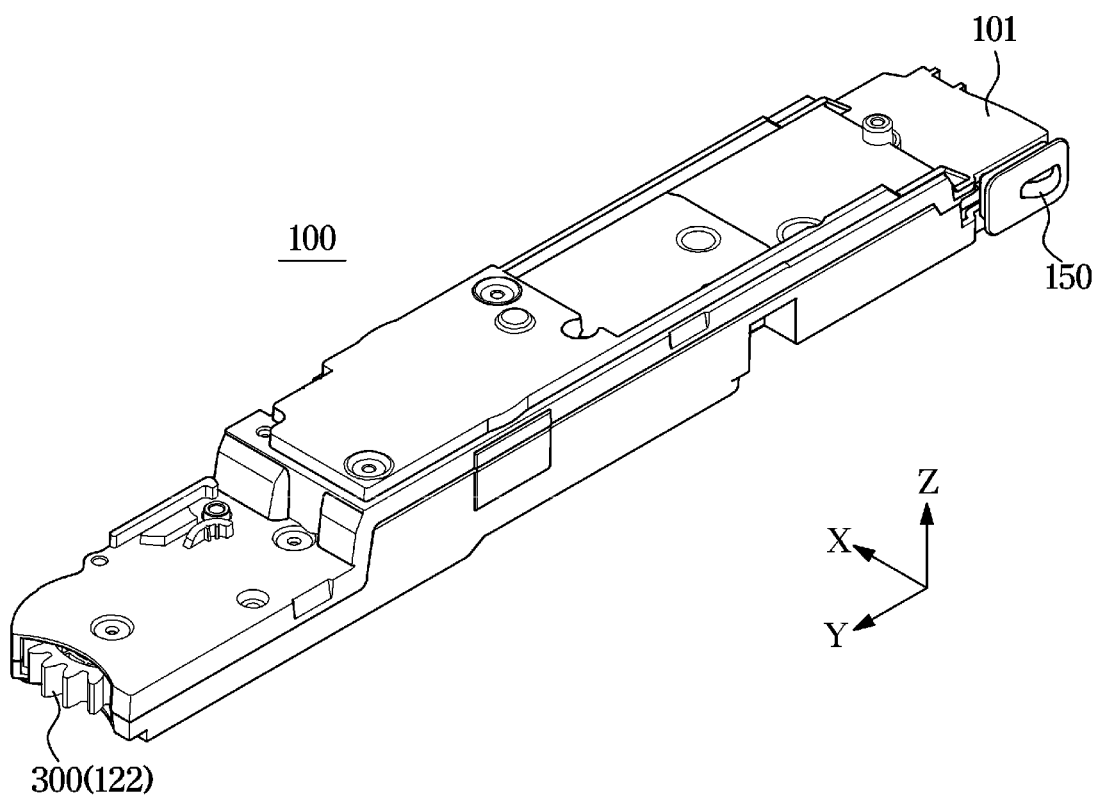
FIG. 2 is a perspective view illustrating a door opening and closing device of the refrigerator illustrated in FIG. 1.
Figure 3:
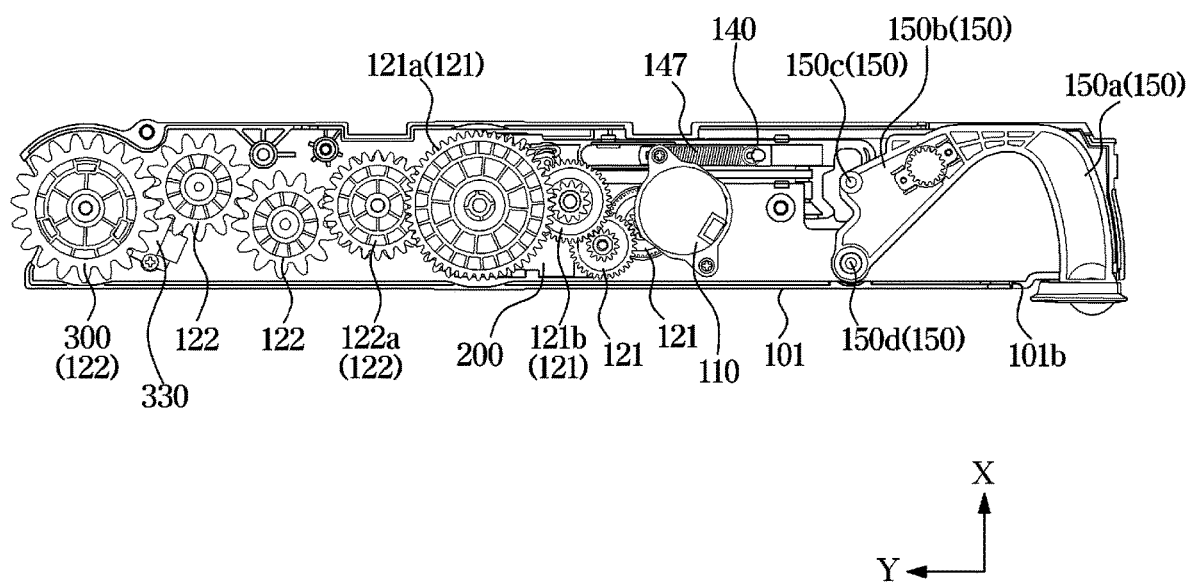
FIG. 3 is a top view illustrating the door opening and closing device illustrated in FIG. 2.
Figure 4:
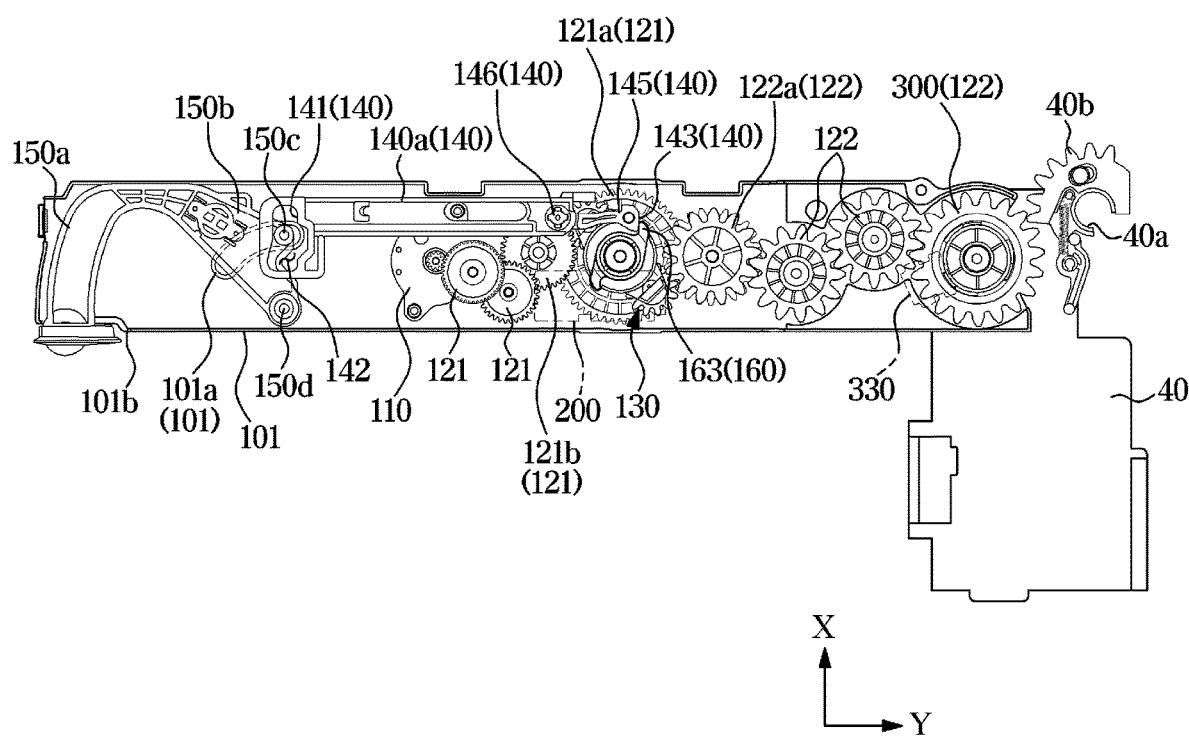
FIG. 4 is a bottom view illustrating the door opening and closing device illustrated in FIG. 2.
Figure 5:
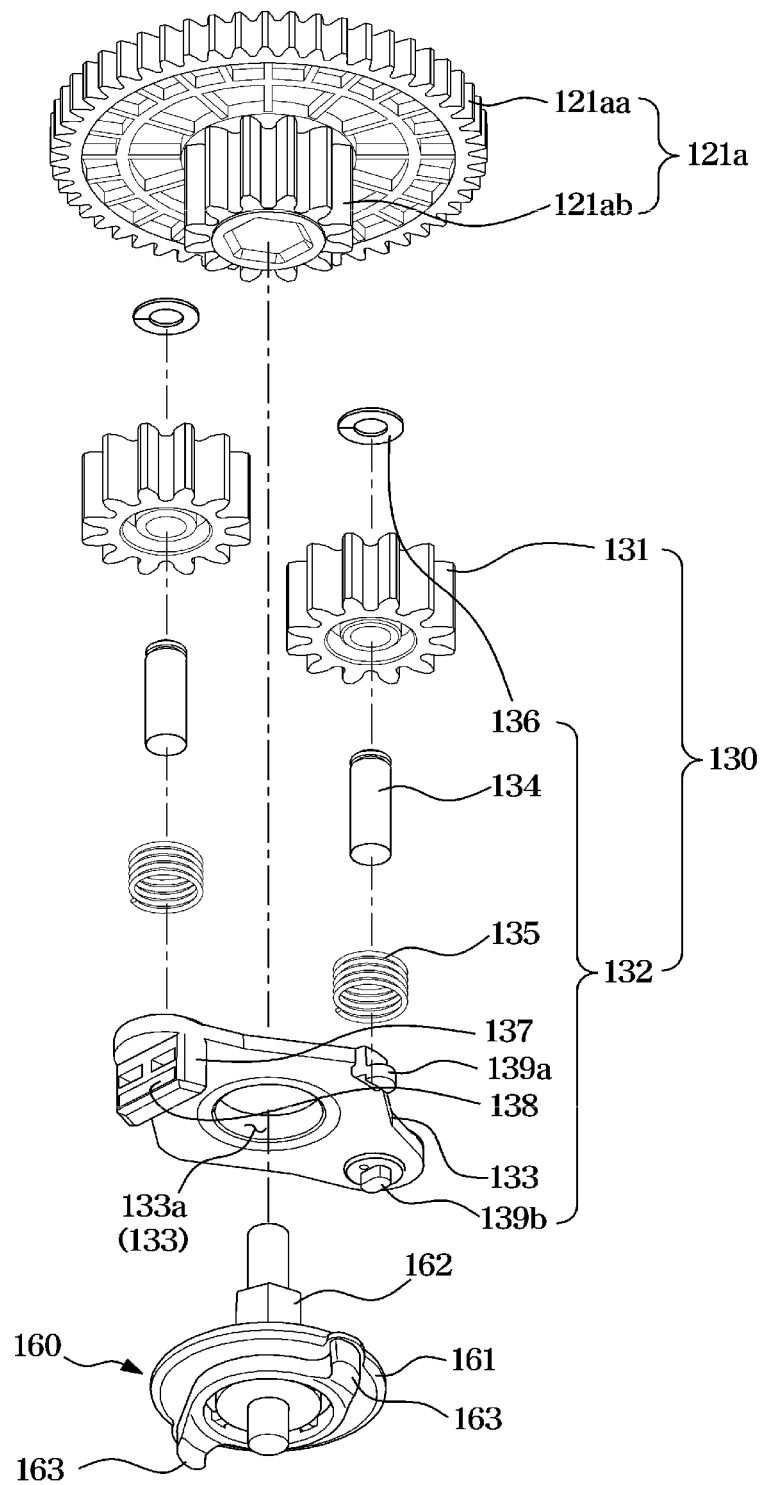
FIG. 5 is an exploded perspective view illustrating a part of the door opening and closing device illustrated in FIG. 3.

FIG. 2 is a perspective view illustrating a door opening and closing device of the refrigerator illustrated in FIG. 1. FIG. 3 is a top view illustrating the door opening and closing device illustrated in FIG. 2. FIG. 4 is a bottom view illustrating the door opening and closing device illustrated in FIG. 2. FIG. 5 is an exploded perspective view illustrating a part of the door opening and closing device illustrated in FIG. 3.

Hereinafter for convenience of description, it will be described based on the left door.

Referring to FIGS. 2 to 5, the door opening and closing device 100 may include a case 101 forming an exterior, the drive motor 110 provided inside the case 101 and configured to output power for opening and closing the door 100, and a plurality of gears 121, 122, and 131 arranged inside the case 101 and configured to transmit power of the drive motor 110 to the hinge shaft 40a.

An opening 101b may be provided at one side of the case 101 to allow a pusher 150a of a lever 150 to be described later to pass and to protrude to the outside of the case 101. The opening 101b is formed on a rear surface of the case 101 facing a front surface of the housing 10. The drive motor 110 may rotate in both directions, and may transmit power to a hinge gear 40b fixed to the hinge shaft 40a via the plurality of gears 121, 122, and 131. Meanwhile, the hinge 40 may include the hinge shaft 40a and the hinge gear 40b.

In this case, the hinge gear 40b may be firmly fixed to the hinge shaft 40a, and thus in response to the rotation of the gear 122, which interlocks with the hinge gear 40b, by the power of the drive motor 110, the gear 300 interlocking with the hinge gear 40b may be moved along teeth of the hinge gear 40b to rotate around the hinge shaft 40a, and the door opening and closing device 100 and the door 30 connected to the door opening and closing device 100 may rotate with respect to the hinge shaft 40a. The hinge-side gear 300 interlocking with the hinge gear 40b may be referred to as a final gear 300.

The door opening and closing device 100 may include a gear assembly 130 arranged between the drive motor 110 and the hinge 40 and intermittently connected to the hinge shaft 40b so as to allow the power of the drive motor 110 to be intermittently transmitted to the hinge gear 40b. With respect to the gear assembly 130, at least one gear for interlocking the drive motor 110 with the gear assembly 130 may correspond to a motor-side gear 121, and at least one gear for interlocking the gear assembly 130 with the hinge gear 40b may correspond to a hinge-side gear 122. That is, the motor-side gear 121 and the hinge-side gear 122 may be interlocked through the gear assembly 130, and the gear assembly 130 may intermit the power transmitted from the motor-side gear 121 to the hinge-side gear 122.

The gear assembly 130 may include a pair of clutch gears 131 connected to a center gear 121a, which is interlocked with the drive motor 110 as one of the motor-side gears 121, and revolving around the center gear 121a and a support frame 132 configured to rotate the clutch gear 131 along a circumference of the center gear 121a with respect to a rotation axis of the center gear 121a. The clutch gear 131 may correspond to a swing gear that interlocks with the center gear 121a and revolves around the center gear 121a.

The center gear 121a may include a first gear 121aa including a spur gear shape and a second gear 121ab including a spur gear shape having a smaller diameter than the first gear 121aa. The first gear 121aa and the second gear 121ab may be provided integrally such that a rotation axis thereof coincides with each other. The center gear 121a may receive power of the drive motor 110 from the motor-side gear 121b interlocking with the first gear 121aa and rotate about a central axis thereof as a rotation axis.

The rotation axis of the support frame 132 may be provided coaxially with the rotation axis of the center gear 121a. The rotation axis of the support frame 132 may correspond to a revolution axis of the clutch gear 131 revolving around the center gear 121a.

The clutch gear 131 may be respectively mounted at both ends of the support frame 132. Particularly, the support frame 132 may include a plate 133 including a through hole 133a formed therein, and a pair of clutch gear mounting shafts 134 arranged at both ends of the plate 133. The clutch gear mounting shaft 134 may penetrate the corresponding clutch gear 133 and thus the clutch gear 133 may be rotatably coupled to the clutch gear mounting shaft 134.

The pair of clutch gear mounting shafts 134 are arranged on the plate 133 and are arranged symmetrically with respect to the rotation axis of the support frame 132. Accordingly, the rotation axis of the pair of clutch gears 131 and the rotation axis of the support frame 132 may be arranged on one straight line.

The support frame 132 may include a pair of pressure springs 135. The pressure spring 135 may be penetrated by the clutch gear mounting shaft 134 and coupled to the clutch gear mounting shaft 134, and arranged between the plate 133 of the support frame 132 and the clutch gear 131. The pressure spring 135 may apply an elastic force to a direction in which the plate 133 and the clutch gear 131 are moved away from each other.

The support frame 132 may include a pressing member 136. The pressing member 136 may be arranged on an opposite side of the pressing spring 135 with respect to the clutch gear 131, and coupled to the clutch gear mounting shaft 134, and may press the clutch gear 131. Based on FIG. 5, because the clutch gear 131 is pressed upward by the pressing spring 135 and is in close contact with the pressing member 136, a load may be applied to a rotation of the clutch gear 131 with respect to the clutch gear mounting shaft 134.

The clutch gear 131 may interlock with the center gear 121a. Particularly, the clutch gear 131 may interlock with the second gear 121ab of the center gear 121a. Accordingly, the clutch gear 131 may receive the power of the drive motor 110 from the center gear 121a, and the clutch gear 131 may be interlocked with the drive motor 110 via the center gear 121a.

The clutch gear 131 may intermittently interlock with one gear 122a of the hinge-side gears 122. Accordingly, the clutch gear 131 may be connected to and interlocked with the hinge gear 40b via the hinge-side gear 122.

The door opening and closing device 100 may include a plurality of clutch detection sensors (not shown) configured to detect a position of the gear assembly 130 so as to determine whether the motor-side gear 121 and the hinge-side gear 122 are interlocked with each other.

Particularly, the plurality of clutch detection sensors may include a first clutch detection sensor and a second clutch detection sensor spaced apart from the first clutch detection sensor. The door opening and closing device 100 may include a printed circuit board 200 on which the first clutch detection sensor and the second clutch detection sensor are mounted. The clutch detection sensor may include various sensors configured to detect the position of the gear assembly 130, such as a hall sensor and an optical sensor.

In response to being horizontally arranged with a detection target 138 provided in the gear assembly 130, the clutch detection sensor may detect the detection target 138.

The support frame 132 may include the detection target 138 provided at one end of the plate 133 and corresponding to the clutch detection sensor. The clutch detection sensor may detect a magnetic field of the detection target 138 so as to detect a position of the detection target 138. The detection target 138 may be formed of a material having a magnetic force.

Particularly, the detection target 138 may be provided on the other side of the plate 133 opposite to one side of the plate 133 on which the clutch gear 131 is arranged. That is, the detection target 138 may be arranged under the clutch gear 131 based on FIG. 5. Particularly, the support frame 132 may include a detection target receiver 137 protruding from the other side of the plate 133, and the detection target 138 may be mounted to the detection target receiver 137.

The clutch gear 131 is provided in a pair, and thus the clutch gear 131 under which the detection target 138 is arranged may be referred to as a first clutch gear 131a, and the clutch gear 131 under which the detection target 138 is not arranged may be referred to as a second clutch gear 131b. The detection target 138 and the first clutch gear 131a may be arranged in a vertical direction. The detection target 138 and the first clutch gear 131a may be arranged in a direction of a rotation axis of the center gear 121a around which the first clutch gear 131a revolves. The detection target 138 and the first clutch gear 131a may be arranged in a direction of the rotation axis of the first clutch gear 131a. Together with the first clutch gear 131a, the detection target 138 may revolve around the center gear 121a in response to the rotation of the support frame 132.

Because the printed circuit board 200, on which the clutch detection sensor (not shown) is mounted, is arranged under the gear assembly 130, the clutch detection sensor and the detection target 138 may be arranged to face each other in the vertical direction according to a rotation position of the support frame 132, and the clutch detection sensor may detect the magnetic field of the detection target 138 facing each other. Because the detection target 138 and the first clutch gear 131a revolve around the rotation axis of the center gear 121a in a state in which the detection target 138 and the first clutch gear 131a are arranged side by side in the axial direction, the clutch detection sensor may detect the position of the first clutch gear 131a by detecting the detection target 138.

The door opening and closing device 100 may include the lever 150 provided in contact with the front surface 10a of the housing 10 to press and push the housing so as to move the door 30 to a direction in which the door 30 is open, a slider 140 configured to be slidable to transmit the power of the drive motor 110 to the lever 150, and an operation frame 160 configured to be rotated in conjunction with the center gear 121a and provided to press the slider 140 to allow the slider 140 to slide. The lever 150, the slider 140, and the operation frame 160 may be provided inside the case 101.

The operation frame 160 may include a disk 161 supporting the plate 133 of the support frame 132, an insertion shaft 162 protruding from approximately the center of one side of the disk 161 to form a rotation axis of the disk 161, and a pressing protrusion 163 provided at a position spaced apart from the rotation axis of the operation frame 160 to protrude from the other side of the disk 161. The pressing protrusion 163 may be provided symmetrically to the operation frame 160. That is, the pressing protrusions 163 may be provided in a pair.

Referring to FIG. 5, the insertion shaft 162 of the operation frame 160 may protrude to an upper side of the disk 161 to be inserted into the through hole 133a of the support frame 132, and the insertion shaft 162 passing through the through hole 133a may be inserted into and fixed to the center gear 121a. The insertion shaft 162 and the rotation axis of the center gear 121a may coincide with each other. Accordingly, the operation frame 160 may be coaxially rotated together with the center gear 121a. The operation frame 160 may be interlocked with the drive motor 110 via the center gear 121a. The center gear 121a, the operation frame 160, and the gear assembly 130 may be rotated in the same direction.

Figure 6:
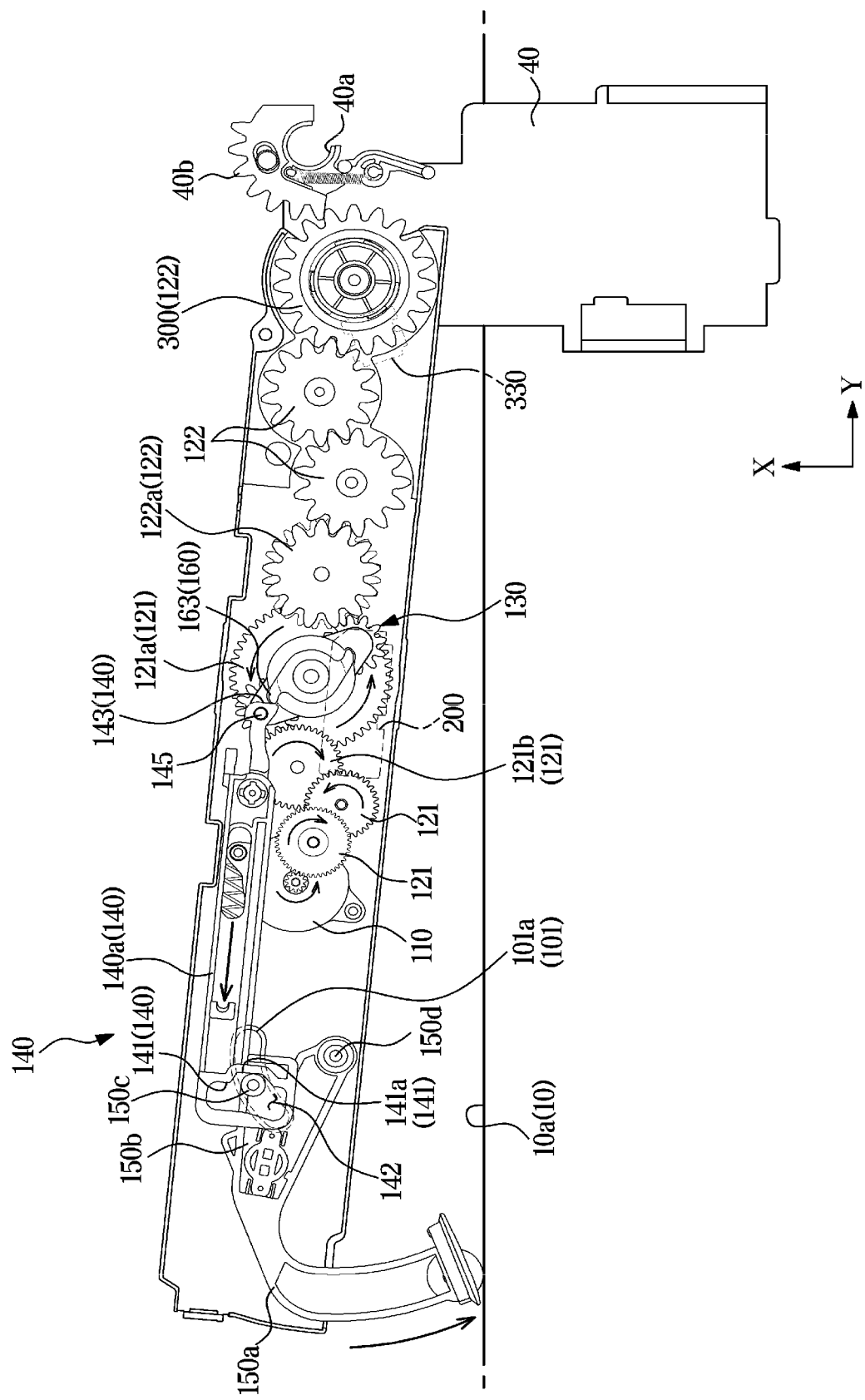
FIG. 6 is a bottom view illustrating a state in which a door is being separated from a housing by the door opening and closing device illustrated in FIG. 4.

The slider 140 may include an extension 140a extending in the left and right directions based on FIGS. 3, 4 and 6, a pressed portion 143 provided at one end of the operation frame 160 to be pressed by the pressing protrusion 163 of the operation frame 160, and a coupling groove 141 provided on the other end side of the extension 140a and into which a part of the lever 150 is inserted and coupled.

In addition, the slider 140 may include a slider bar 144 including the extension 140a and the coupling groove 141, and an intermittent member 145 rotatably coupled to one end of the slider bar 144 and including the pressed portion 143. The intermittent member 145 may selectively transmit the power of the motor 110, which is transmitted by the rotation of the center gear 121a and the operation frame 160, to the slider 140. A rotation shaft 146 may be formed at one end of the intermittent member 145 and thus the intermittent member 145 may be rotatably coupled to the slider bar 144, and the pressed portion 143 may be provided at the other end of the intermittent member 145.

The support frame 132 may include a first support protrusion 139a formed on one side of the plate 133. The first support protrusion 139a may be in contact with one surface of the intermittent member 145 to press the intermittent member 145. In response to being pressed by the first support protrusion 139a, the intermittent member 145 may be rotated about the rotation shaft 146.

The first support protrusion 139a may be arranged to allow a straight line connecting the rotation center of the support frame 132 to the first support protrusion 139a to be perpendicular to a straight line connecting the rotation center of the support frame 132 to the detection target receiver 137. The detection target receiver 137 is provided a magnet receiver. A lower surface of the first support protrusion 139a may be located lower than a lower surface of the plate 133.

The support frame 132 may include a second support protrusion 139b formed on the lower surface of the plate 133. The second support protrusion 139b may be in contact with one surface of the intermittent member 145 to stop the rotation of the gear assembly 130. In this case, one surface of the intermittent member 145 in contact with the first support protrusion 139a may be different from one surface of the intermittent member 145 in contact with the second support protrusion 139b.

The second support protrusion 139b may be arranged on a straight line connecting the rotation center of the support frame 132 to the detection target receiver 137. The second support protrusion 139b may be arranged under the second clutch gear 131b.

The lever 150 may include the pusher 150a provided in such a way that one end thereof is in contact with the housing 10 and in response to the open of the door 30, the one end thereof protrudes from the case 101 to push the housing 10 so as to separate the door 30 from the housing 10, and a body 150b bent from the other end of the pusher 150a and extended, provided with a rotation shaft 150d formed at one end thereof, and rotatably coupled to the case 101. Particularly, the pusher 150a may come into contact with and push the front surface 10a of the housing 10, but is not limited thereto. Therefore, the pusher 150a may come into contact with the other surface of the housing 10 or other members fixed to the housing.

The lever 150 may include a coupling protrusion 150c. The coupling protrusion 150c may protrude from the body 150b and one end thereof may be inserted into and coupled to the coupling groove 141 of the slider 140 and the other end thereof may be inserted into a guide groove 101a formed in the case 101, so as to allow movement of the coupling protrusion 150c to be guided. Particularly, at a position spaced apart from the rotation shaft 150d of the lever 150, the coupling protrusion 150c may be formed to protrude upward and downward from the body 150b of the lever 150. The pusher 150a, the body 150b, and the coupling protrusion 150c may be integrally formed with each other.

The slider 140 may be slid in response to the pressed portion 143 being pressed by the pressing protrusion 163 of the operation frame 160 provided to be rotated by receiving power from the drive motor 110. In response to the sliding of the slider 140, the lever 150 may push the housing 10 to allow the door 30 to be separated from the housing 10.

Figure 9:
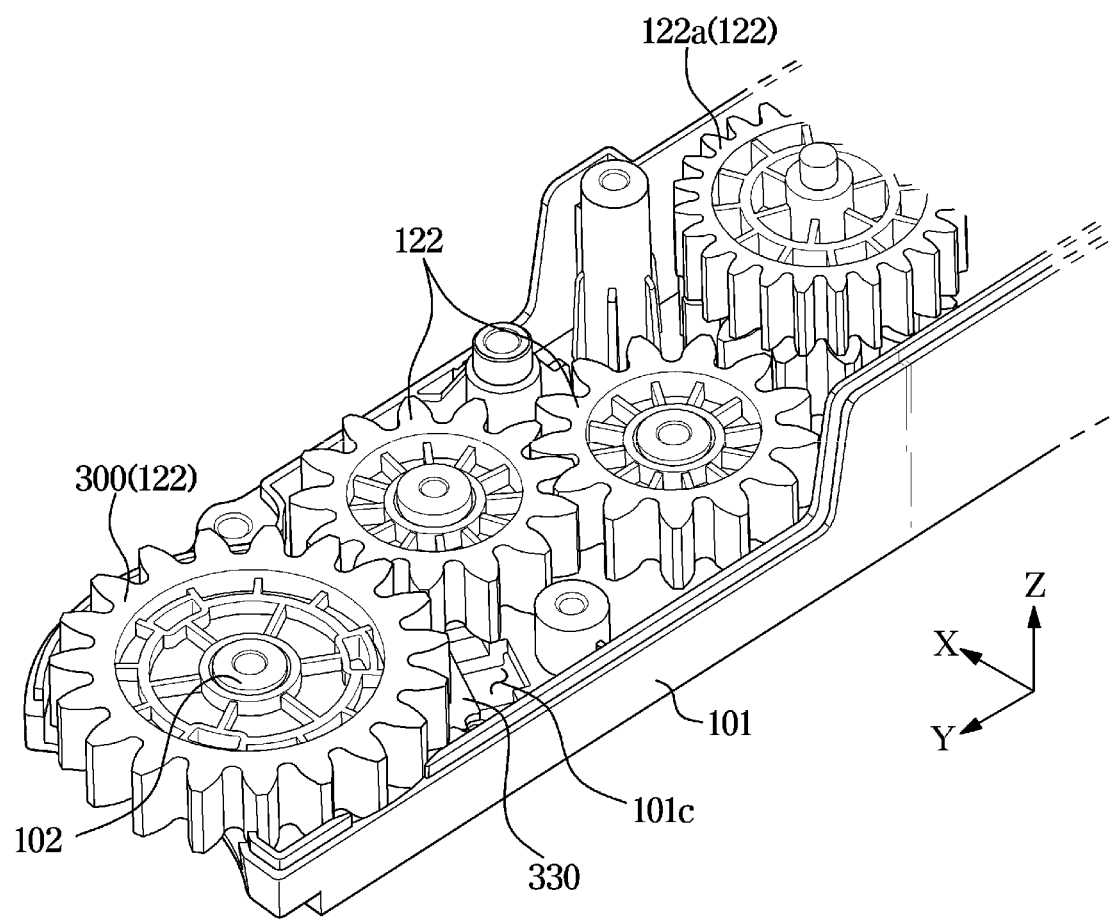
FIG. 9 is a perspective view illustrating some components in the door opening and closing device illustrated in FIG. 4.
Figure 10:
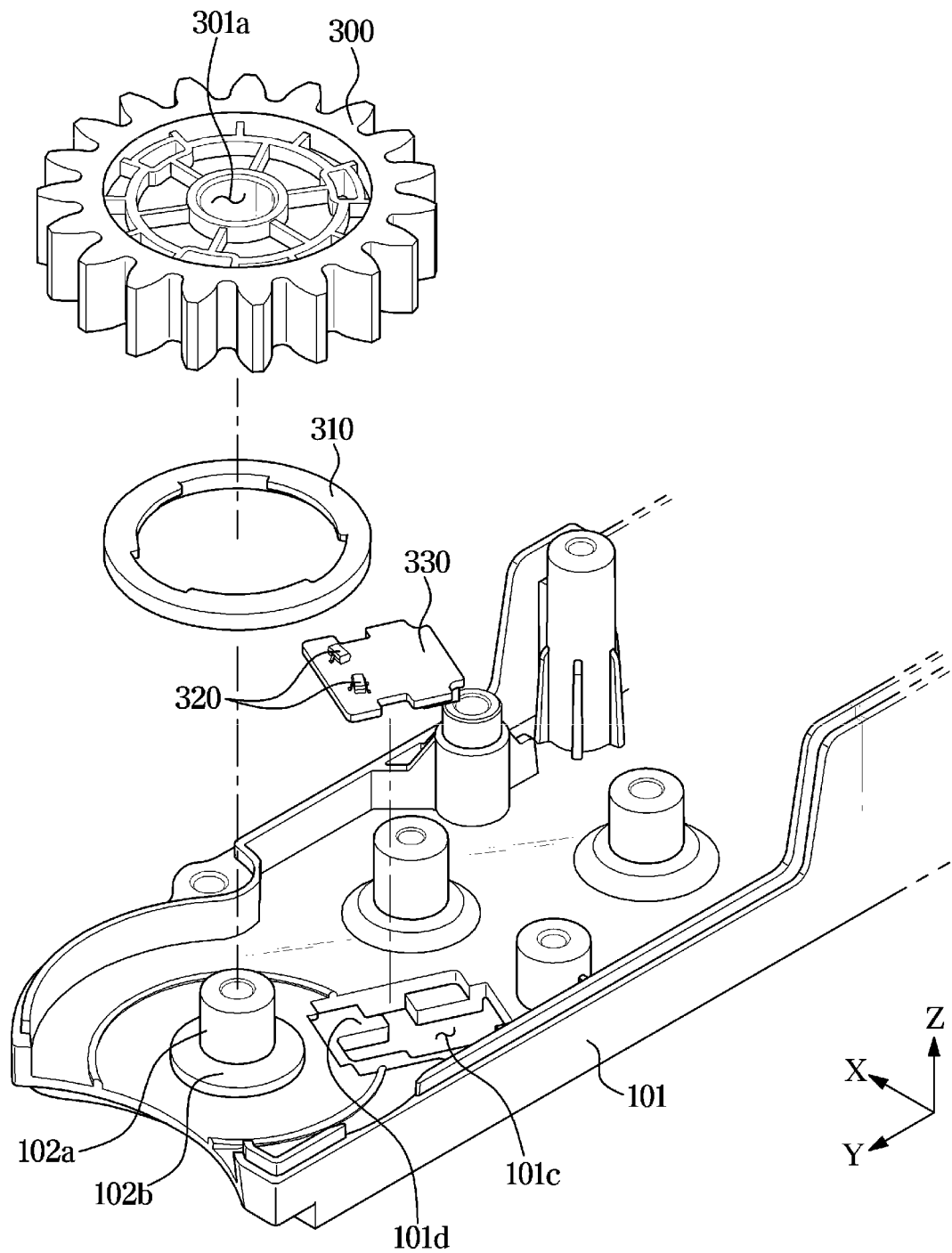
FIG. 10 is an exploded perspective view illustrating some components in the door opening and closing device illustrated in FIG. 9.

The door opening and closing device 100 according to an embodiment of the disclosure may include a door position sensor 320 configured to detect the rotation angle and/or position of the final gear 300 (refer to FIGS. 9 and 10). The door position sensor 320 may be electrically connected to a printed circuit board 330. The door position sensor 320 may be mounted on the printed circuit board 330 arranged under the final gear 300.

FIG. 6 is a bottom view illustrating a state in which a door is being opened by the door opening and closing device illustrated in FIG. 4.

In response to the pressed portion 143 not being pressed by the pressing protrusion 163, the lever 150 may be accommodated in the case 110 and not push the housing 10 as illustrated in FIGS. 3 and 4. Referring to FIG. 6, in response to the pressed portion 143 being pressed by the pressing protrusion 163, the slider 140 may be slid toward the lever 150, and an inner surface of the coupling groove 141 of the slider 140 may press the coupling protrusion 150c of the lever 150 and by a force applied to the coupling protrusion 150c, the movement of the lever 150 may be guided by the guide groove 101a and then rotated with respect to the rotation shaft 150d.

As mentioned above, as the slider 140, which is slid by the pressing protrusion 163, pushes the coupling protrusion 150c of the lever 150 so as to rotate the lever 150, the pusher 150a of the lever 150 may protrude to the outside of the case 101 through the opening 101b of the case 101 or may push the front surface 10a of the housing 10 to allow the door 30 to be separated from the housing 10.

Hereinafter the operation of the door opening and closing device 100 will be described in detail with reference to the drawings.

Figure 7:
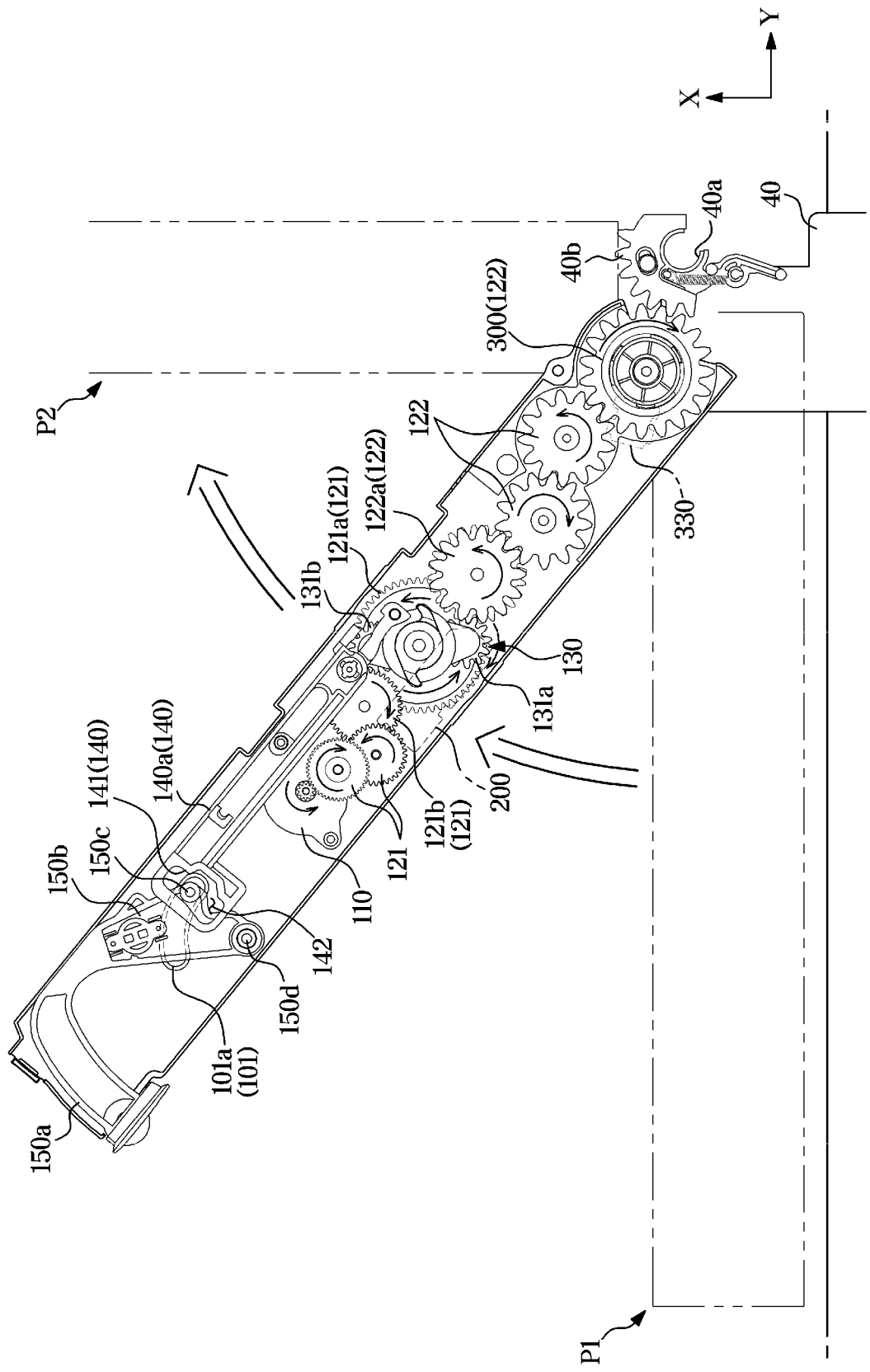
FIG. 7 is a bottom view illustrating a state in which the door is being opened by the door opening and closing device illustrated in FIG. 4.
Figure 8:
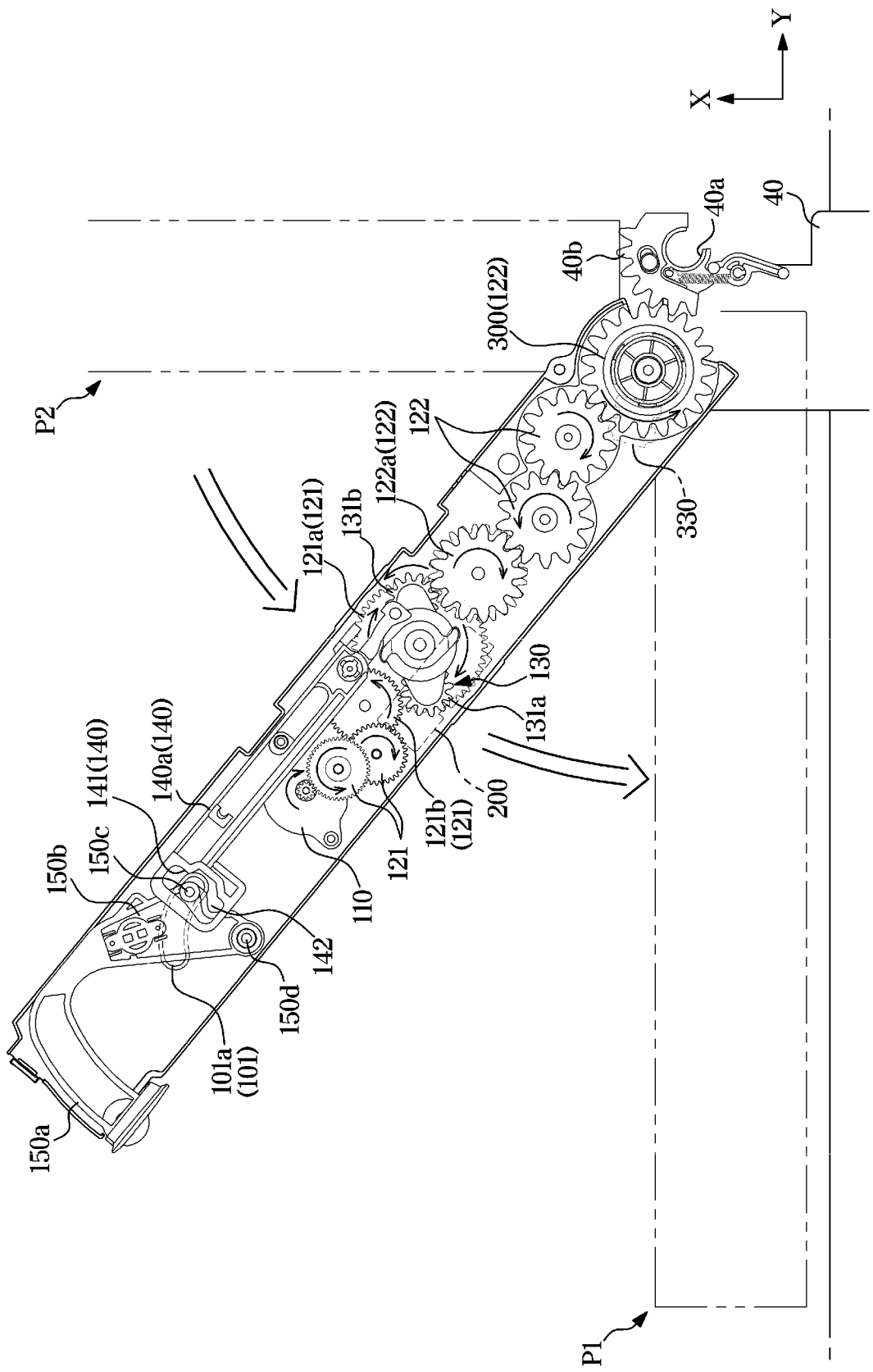
FIG. 8 is a bottom view illustrating a state in which the door is being closed by the door opening and closing device illustrated in FIG. 4.

FIG. 6 is a bottom view illustrating a state in which a door is being separated from a housing by the door opening and closing device illustrated in FIG. 4. FIG. 7 is a bottom view illustrating a state in which the door is being opened by the door opening and closing device illustrated in FIG. 4. FIG. 8 is a bottom view illustrating a state in which the door is being closed by the door opening and closing device illustrated in FIG. 4.

Referring to FIGS. 6 to 8, the door 30 may be rotated by the drive motor 110 of the door opening and closing device 100 coupled to the upper end and/or lower end of the door 30. In response to the rotation of the drive motor 110 in a first direction, the door 30 may be rotated in the first direction, and in response to the rotation of the drive motor 110 in a second direction, the door 30 may be rotated in the second direction. However, the disclosure is not limited thereto, and according to the number of hinge-side gears 122 and the number of motor-side gears 121, in response to the rotation of the drive motor 110 in the first direction, the door 30 may be rotated in the second direction, and in response to the rotation of the drive motor 110 in the second direction, the door 30 may be rotated in the first direction.

Hereinafter it is assumed that in response to the rotation of the drive motor 110 in the first direction corresponding to the counterclockwise direction based on FIGS. 6 to 8 illustrating that the door opening and closing device 100 is viewed from the bottom direction, the door 30 may be rotated in the direction in which the door 30 is opened, and in response to the rotation of the drive motor 110 in the second direction corresponding to the counterclockwise direction based on FIGS. 6 to 8 illustrating that the door opening and closing device 100 is viewed from the bottom direction, the door 30 may be rotated in the direction in which the door 30 is closed.

Figure 16:
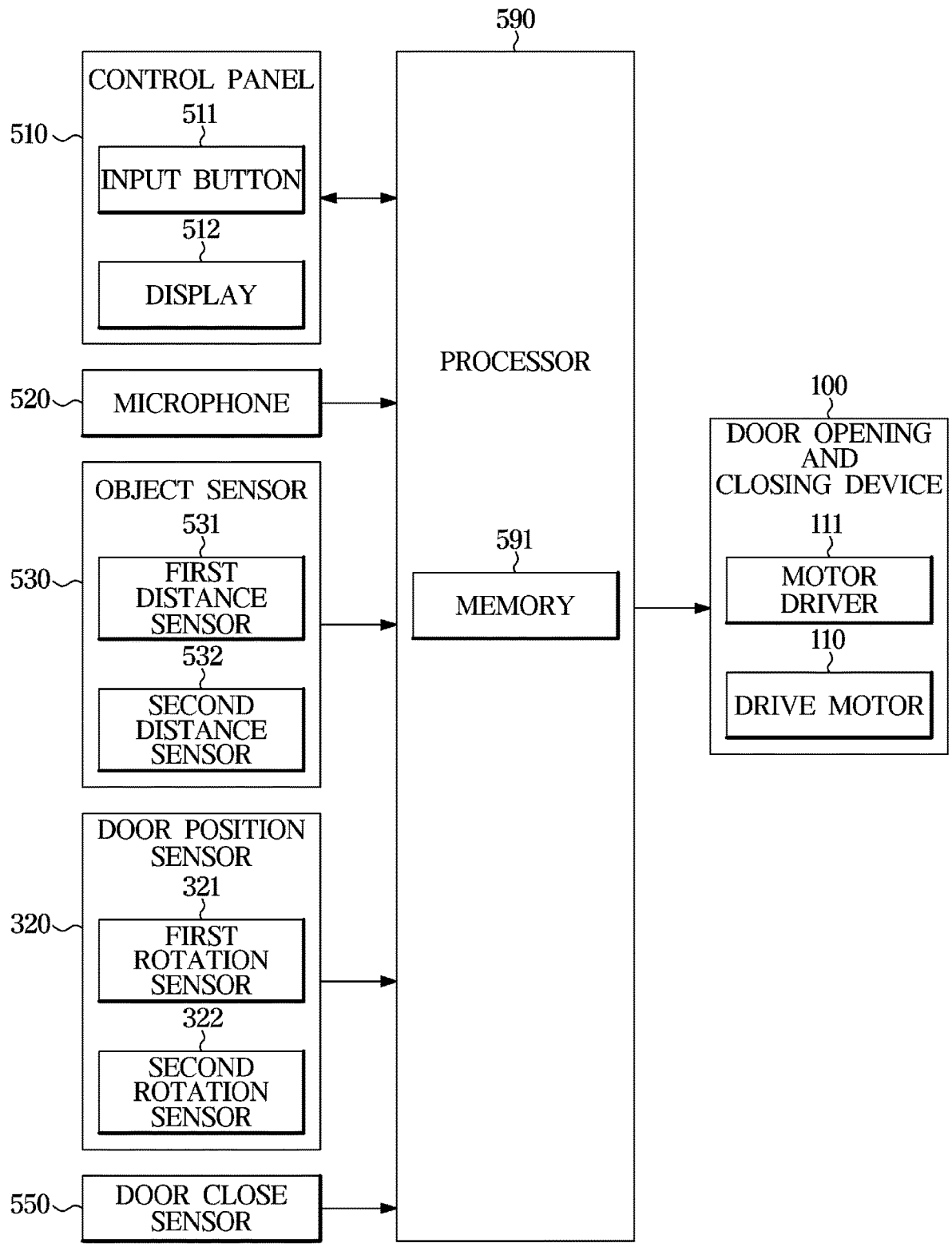
FIG. 16 is a view illustrating a configuration of the refrigerator according to an embodiment of the disclosure.

The rotation direction and speed of the drive motor 110 may be controlled by a processor 590 (refer to FIG. 16). The door opening and closing device 100 may directly or indirectly receive a control signal transmitted by the processor 590 (refer to FIG. 16). In addition, the processor 590 (refer to FIG. 16) may receive a detection signal that the clutch detection sensor transmits in response to detection of the detection target 138, and control the rotation of the drive motor 110 based on the detection signal. The processor 590 (refer to FIG. 16) may be arranged on the printed circuit board 200, or arranged at another position of the door opening and closing device 100, or arranged on the door 30, or arranged in the housing 10. The processor 590 (refer to FIG. 16) may wirelessly receive a control signal from a separate input device or a mobile terminal. However, the arrangement of the processor 590 (refer to FIG. 16) is not limited thereto.

The door 30 may be automatically moved to an open position P2, in which the door 30 opens the storage compartment 20, by the door opening and closing device 100. In this case, the open position P2 may correspond to a position of the door 30 in which the door 30 is rotated by a predetermined angle in the direction of opening the storage compartment 20 from a closed position P1 for closing the storage compartment 20. That is, the door 30 may be switched from the state in which the door 30 closes the storage compartment 20 to the open position P2 in which the door 30 opens the storage compartment 20. In other words, the open position P2 is not limited to that illustrated in FIGS. 6 to 8.

In response to the door 30 being in the closed position P1, the gear assembly 130 may be located in a neutral position. The neutral position corresponds to a position in which the first and second clutch gears 131a and 131b of the gear assembly 130 interlock only with the center gear 121a and do not interlock with the hinge-side gear 122a.

In response to the gear assembly 130 being in the neutral position, the detection target 138 is positioned between the plurality of clutch detection sensors and thus the detection target 138 is not detected by the plurality of clutch detection sensors. The plurality of clutch detection sensors may include a first clutch detection sensor (not shown) and a second clutch detection sensor (not shown). In other words, because the detection target 138 is not detected by any clutch detection sensor, the first clutch detection sensor (not shown) and the second clutch detection sensor (not shown) do not transmit detection signals. In this case, an area positioned between the first clutch detection sensor and the second clutch detection sensor may correspond to a neutral area.

In response to receiving the control signal from the processor 590 (refer to FIG. 16), the door opening and closing device 100 may rotate the door 30 from the closed position P1 to the open position P2. Particularly, the control signal of the processor 590 (refer to FIG. 16) may include an opening signal for rotating the door 30 from the closed position P1 to the open position P2 and a closing signal for rotating the door 30 from the open position P2 to the closed position P1. In response to receiving the opening signal from the processor 590 (refer to FIG. 16), the door opening and closing device 100 may rotate the door 30 from the closed position P1 to the open position P2.

In response to receiving the opening signal from the processor 590 (refer to FIG. 16), the door opening and closing device 100 may rotate the door 30 to the first direction. The power of the drive motor 110 may be transmitted to the motor-side gears 121, and the motor-side gear 121b interlocking with the center gear 121a may transmit the power of the drive motor 110 to the center gear 121a. Accordingly, the center gear 121a may be rotated by receiving a driving force from the drive motor 110.

In response to the rotation of the center gear 121a, the operation frame 160 rotatable together with the center gear 121a may be also rotated. In response to the rotation of the operation frame 160, the pressing protrusion 163 of the operation frame 160 may press the pressed portion 143 of the slider 140. Because the slider 140 is pressed by the pressing protrusion 163, the slider 140 may be slid toward the lever 150, and the lever 150 may protrude from the case 101 to separate the door 30 from the housing 10. In this case, one of the hinge-side gears 300 interlocks with the hinge gear 40b. In other words, at this time, the first clutch gear 131a may interlock with one of the hinge-side gears 122a, but is not limited thereto. Alternatively, the hinge-side gear 300 may be configured to be continuously connected to the hinge gear 40b regardless of the position of the door 30. A hinge-side gear 300 of the hinge-side gears interlocking with the hinge gear 40b may be referred to as the final gear 300.

Even after the door 30 is separated from the housing 10 by the lever 150, the drive motor 110 continues to rotate in the first direction. By the rotation of the drive motor 110, the gear assembly 130 may be moved from the neutral position to an interlocking position.

Particularly, due to the rotation of the center gear 121a, the pair of clutch gears 131 may revolve around the center gear 121a, and one of the pair of clutch gears 131 may be interlocked with the one hinge-side gear 122a of the hinge-side gears 122. In this case, in order that it is difficult for the respective clutch gears 131a and 131b to be rotated with respect to the clutch gear mounting shaft 134, the pressing spring 135 and the pressing member 136 may apply a load to the rotation of the clutch gears 131a and generate a torque for revolving the pair of clutch gears 131 around the rotation axis of the center gear 121a.

The interlocking position may include a first interlocking position in which the first clutch gear 131a of the gear assembly 130 interlocks with the center gear 121a and the hinge-side gear 122, and a second interlocking position in which the second clutch gear 131b of the gear assembly 130 interlocks with the center gear 121a and the hinge-side gear 122.

Further, while the gear assembly 130 is moved to the interlocking position, the slider 140 may return to a position before being pressed by the pressing protrusion 163, by the motor or the elastic member, and the lever 150 may be rotated by the motor or the elastic member and thus the pusher 150a of the lever 150 may be accommodated in the case 101. That is, the lever 150 and the slider 140 may return to the state in which the door 30 is in the closed position P1.

Referring to FIG. 7, in response to the drive motor 110 being rotated in the first direction by the opening signal of the processor 590 (refer to FIG. 16), the first clutch gear 131a may interlock with the center gear 121a and the hinge-side gear 122a, and the second clutch gear 131b may interlock only with the center gear 121a and may not interlock with other gears. That is, while the door 30 is being opened, the first clutch gear 131a transmits the power to the hinge-side gear 122a.

The gear assembly 130 in the first interlocking position may transmit the power of the drive motor 110 rotating in the first direction to the hinge-side gear 122, and the hinge-side gear 122 may transmit the power of the drive motor 110 to the hinge gear 40b. Particularly, the first clutch gear 131a may interlock with the hinge-side gear 122a so as to be interlocked with the rotation of the center gear 121a, thereby being rotated with respect to the clutch gear mounting shaft 134, and the hinge-side gear 122a interlocking with the first clutch gear 131a may be rotated in association with the rotation of the first clutch gear 131a, and the hinge-side gear 300 interlocking with the hinge gear 40b may be rotated around the hinge gear 40b fixed to the hinge shaft 40a. Accordingly, the door 30 may be rotated toward the open position P2 about the hinge shaft 40a. The drive motor 110 may be rotated in the first direction until the door 30 is positioned at the open position P2.

In response to the door 30 reaching the open position P2, the processor 590 (refer to FIG. 16) may control the drive motor 110 to position the gear assembly 130 to the neutral position. Particularly, the processor 590 (refer to FIG. 16) may determine that the door 30 reaches the open position P2 that is the opening of the door 30 is completed, based on the number of rotations of the drive motor 110, and the processor 590 may rotate the drive motor 110 to the second direction to prevent the first clutch detection sensor from transmitting the detection signal.

After the rotation of the door 30 for reaching the open position P2 is completed, the first clutch gear 131a may be separated from the hinge-side gear 300. Therefore, while the door 30 is manually closed by the user, it is possible to prevent that the drive motor 110 interlocks with the hinge gear 40b to act as a resistance, and thus the user can easily rotate the door 30 from the open position P2 to the closed position P1.

Referring to FIG. 8, in response to receiving the control signal from the processor 590 (refer to FIG. 16), the door opening and closing device 100 may rotate the door 30 from the open position P2 to the closed position P1. In response to receiving the closing signal from the processor 590 (refer to FIG. 16), the door opening and closing device 100 may rotate the door 30 from the open position P2 to the closed position P1.

In response to receiving the closing signal from the processor 590 (refer to FIG. 16), the door opening and closing device 100 may rotate the door 30 to the second direction. The power of the drive motor 110 may be transmitted to the motor-side gears 121, and the motor-side gear 121b interlocking with the center gear 121a may transmit the power of the drive motor 110 to the center gear 121a.

The drive motor 110 continues to rotate in the second direction. By the rotation of the drive motor 110, the gear assembly 130 may be moved from the neutral position to the interlocking position.

In response to the drive motor 110 being rotated in the second direction by the closing signal of the processor 590 (refer to FIG. 16), the second clutch gear 131b may interlock with the center gear 121a and the hinge-side gear 122a, and the first clutch gear 131a may interlock only with the center gear 121a and may not interlock with other gears. That is, while the door 30 is being closed, the second clutch gear 131b transmits the power to the hinge-side gear 122a.

The processor 590 (refer to FIG. 16) may receive a detection signal transmitted from the second clutch detection sensor, and the processor 590 (refer to FIG. 16) may determine that the gear assembly 130 is located at the second interlocking position. The processor 590 (refer to FIG. 16) may determine that the door 30 is rotated from the open position P2 to the closed position P1 while the detection signal of the second clutch detection sensor is being received.

The gear assembly 130 in the second interlocking position may transmit the power of the drive motor 110 rotating in the second direction to the hinge-side gear 122, and the hinge-side gear 122 may transmit the power of the drive motor 110 to the hinge gear 40b. Particularly, the second clutch gear 131b may interlock with the hinge-side gear 122a so as to be interlocked with the rotation of the center gear 121a, thereby being rotated with respect to the clutch gear mounting shaft 134, and the hinge-side gear 122a interlocking with the second clutch gear 131b may be rotated in association with the rotation of the second clutch gear 131b, and the hinge-side gear 300 interlocking with the hinge gear 40b may be rotated around the hinge gear 40b fixed to the hinge shaft 40a. Accordingly, the door 30 may be rotated toward the closed position P1 about the hinge shaft 40a. The drive motor 110 may be rotated in the second direction until the door 30 is positioned at the closed position P1.

In response to the door 30 reaching the closed position P1, the processor 590 (refer to FIG. 16) may control the drive motor 110 to position the gear assembly 130 to the neutral position. Particularly, the processor 590 (refer to FIG. 16) may identify that the door 30 reaches the closed position P1 that is the closing of the door 30 is completed, based on the number of rotations of the drive motor 110 and through a door close sensor 550 (refer to FIG. 16) configured to detect whether the door is positioned at the closed position. The processor 590 may rotate the drive motor 110 to the first direction to prevent the second clutch detection sensor from transmitting the detection signal.

Hereinbefore it has been described that the gear assembly 130 is positioned in the first interlocking position to open the door 30, and the gear assembly 130 is positioned in the second interlocking position to close the door 30 with reference to FIGS. 7 and 8.

However, the disclosure is not limited thereto, and the gear assembly 130 may be positioned in the second interlocking position to open the door 30, and the gear assembly 130 may be positioned in the first interlocking position to close the door 30.

The door position sensor 320 may detect the rotation angle or position of the door 30 and/or the final gear 300.

FIG. 9 is a perspective view illustrating some components in the door opening and closing device illustrated in FIG. 4. FIG. 10 is an exploded perspective view illustrating some components in the door opening and closing device illustrated in FIG. 9.

Referring to FIGS. 9 and 10, the door opening and closing device 100 according to an embodiment of the disclosure may include the hinge side gear 122 including the final gear 300, a magnet 310, the printed circuit board 330 on which the door position sensor is mounted, and a boss 102.

The final gear 300 may receive the power from the drive motor 110. The final gear 300 may receive the power and transmit the power to the hinge gear 40b. For example, the final gear 300 may be arranged at one end of the case 101 and interlock with the hinge gear 40b. The final gear 300 may be arranged at one end of the case 101 opposite to the one end of the case 101 in which the opening 101b is arranged. Accordingly, because the hinge gear 40b fixed to the hinge shaft 40a receives a rotational force, the door 30 may be opened or closed according to the driving of the drive motor 110. In other words, the power generated from the drive motor 110 may be transmitted to the final gear 300 through the motor side gear 121, the clutch gear 131, and the hinge side gear 122a interlocking with the clutch gear 131 in order. The final gear 300 may interlock with the hinge gear 40b to allow the door 30 to be opened and closed by the received power.

The magnet 310 may be accommodated in the final gear 300. The magnet 310 may interact with the door position sensor 320 mounted on the printed circuit board 330 to sense the rotation angle of the final gear 300. The magnet 310 may be formed in an annular shape. The magnet 310 may be arranged to face the door position sensor 320. However, although it has been described that the magnet 310 and the door position sensor 320 interact to sense the position of the final gear 300, the disclosure is not limited thereto. Alternatively, the door position sensor 320 may sense the position of the final gear 300 by itself without the magnet 310.

The printed circuit board 330 on which the door position sensor 320 is mounted may be arranged adjacent to the magnet 310. The printed circuit board 330 may be arranged on one side of the magnet 310. For example, the printed circuit board 330 may be arranged under the magnet 310. The printed circuit board 330 may be mounted to a mounting hole 101c of the case 101. The printed circuit board 330 may be arranged inside the case 101. The printed circuit board 330 may be supported by a supporter 102b of the case 101. The supporter 102b may support a lower surface of the printed circuit board 330.

The door position sensor 320 may detect the position and/or angle of the final gear 300 and thus detect the position and/or angle of the door 30. The door position sensor 320 may be arranged adjacent to the magnet 310 to detect the position and/or angle of the final gear 300. Because the door position sensor 320 is electrically connected to the printed circuit board 330, the door position sensor 320 may also be arranged on one side of the magnet 310. For example, the door position sensor 320 may be arranged under the magnet 310. The door position sensor 320 may be arranged to face the magnet 310. Accordingly, the door position sensor 320 may sense a change in the position and/or angle of the final gear 300 and the door by detecting a change in the polarity of the magnet 310. The door position sensor 320 may include various sensors such as a hall sensor and an optical sensor to detect the position and/or angle of the final gear 300.

The boss 102 may protrude into the inside of the case 101. The plurality of gears 121, 122, and 130 of the door opening and closing device 100 may be coupled to the boss 102. The boss 102 may be provided in plurality. Hereinafter only the boss 102 to which the final gear 300 is coupled will be described. The final gear 300 may be axially coupled to the boss 102. For example, a virtual rotation axis of the final gear 300 may coincide with the boss 102. The final gear 300 may be rotated clockwise or counterclockwise about the boss 102. The boss 102 may include a coupler 102a and the supporter 102b. The coupler 102a may be coupled to a shaft hole 300a of the final gear 300. For example, the coupler 102a and the shaft hole 300a of the final gear 300 may be axially coupled to each other with respect to the rotation axis of the final gear 300. The supporter 102b may be provided under the boss 102. The supporter 102b may be arranged under the coupler 102a. The supporter 102b may support the final gear 300. For example, the supporter 102b may be in contact with the lower surface of the final gear 300 to support the lower surface of the final gear 300. The supporter 102b may maintain a gap between the door position sensor 320 and the magnet 310. A height of the supporter 102b may vary depending on a required distance between the door position sensor 320 and the magnet 310.

Figure 11:
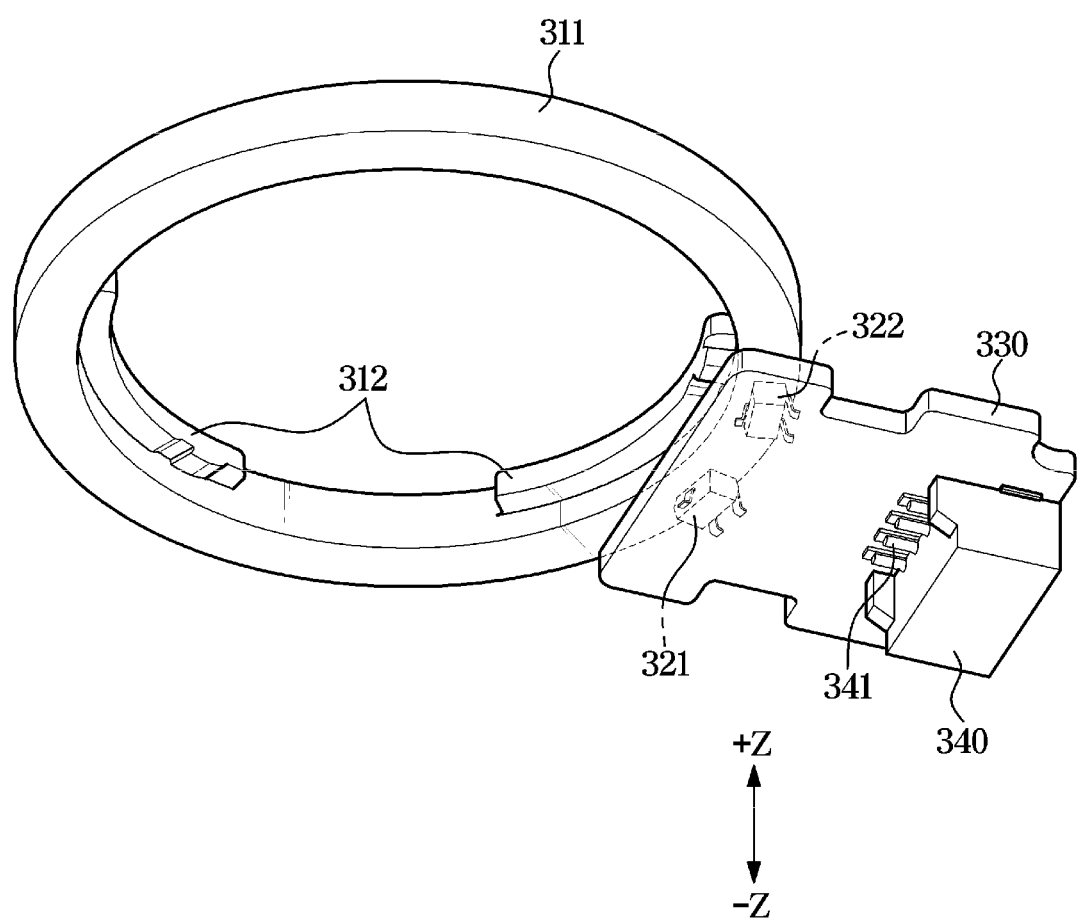
FIG. 11 is a bottom perspective view illustrating a positional relationship between a magnet and a door position sensor in the door opening and closing device illustrated in FIG. 9.
Figure 12:
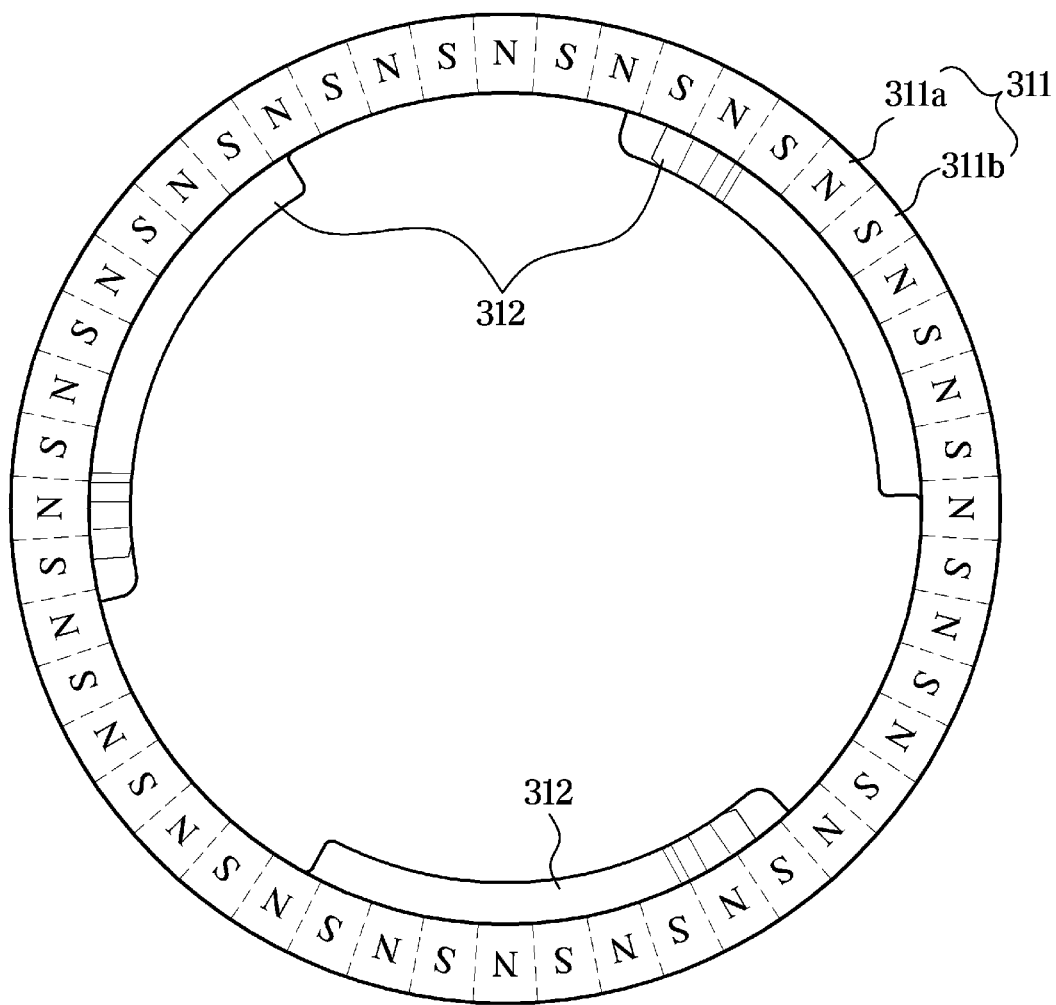
FIG. 12 is a plan view illustrating the magnet in the door opening and closing device illustrated in FIG. 9.

FIG. 11 is a bottom perspective view illustrating a positional relationship between the magnet 310 and the door position sensor 320 in the door opening and closing device 100 illustrated in FIG. 9. FIG. 12 is a plan view illustrating the magnet 310 in the door opening and closing device 100 illustrated in FIG. 9.

Referring to FIGS. 11 and 12, according to an embodiment of the disclosure, the magnet 310 may include a magnetic member 311 and an inner protrusion 312. The magnetic member 311 may include an N-pole 311A and a S pole 311B. The N-pole 311A and the S pole 311B may be alternately arranged in the magnetic member 311. The inner protrusion 312 may protrude toward the inner side of the magnet 310 from the magnetic member 311 to allow the magnet 310 to be received in the final gear 300. The inner protrusion 312 may interfere with a prevention protrusion 304 of the final gear 300 to be described later. Accordingly, the magnet 310 may be received in the final gear 300 not to be separated from the final gear 300.

The door position sensor 320 may be arranged between the magnet 310 and the printed circuit board 330. For example, the door position sensor 320 may be arranged between the magnetic member 311 and the printed circuit board 330. The door position sensors 320 may be provided in plurality. The plurality of door position sensors 320 may include a first rotation sensor 321 and a second rotation sensor 322.

Because the magnet 310 is accommodated in the final gear 300, in response to the rotation of the final gear 300 by receiving power, the magnet 310 may also be rotated. In this case, the door position sensor 320 may detect a change in the N pole 311A and the S pole 311B of the magnetic member 311, and detect the rotation angle of the final gear 300 and/or the magnet 310 based on the detected change.

According to an embodiment of the disclosure, the door opening and closing device 100 may further include a connector 340. On the lower surface of the printed circuit board 330, the connector 340 may be coupled to the printed circuit board 330. The connector 340 may be electrically connected to the printed circuit board 330. For example, the connector 340 may be electrically connected to the printed circuit board 330 through a terminal 341. The terminal 341 may be connected to a main board (not shown) provided in the housing 10 through an electric wire (not shown).

Figure 13:
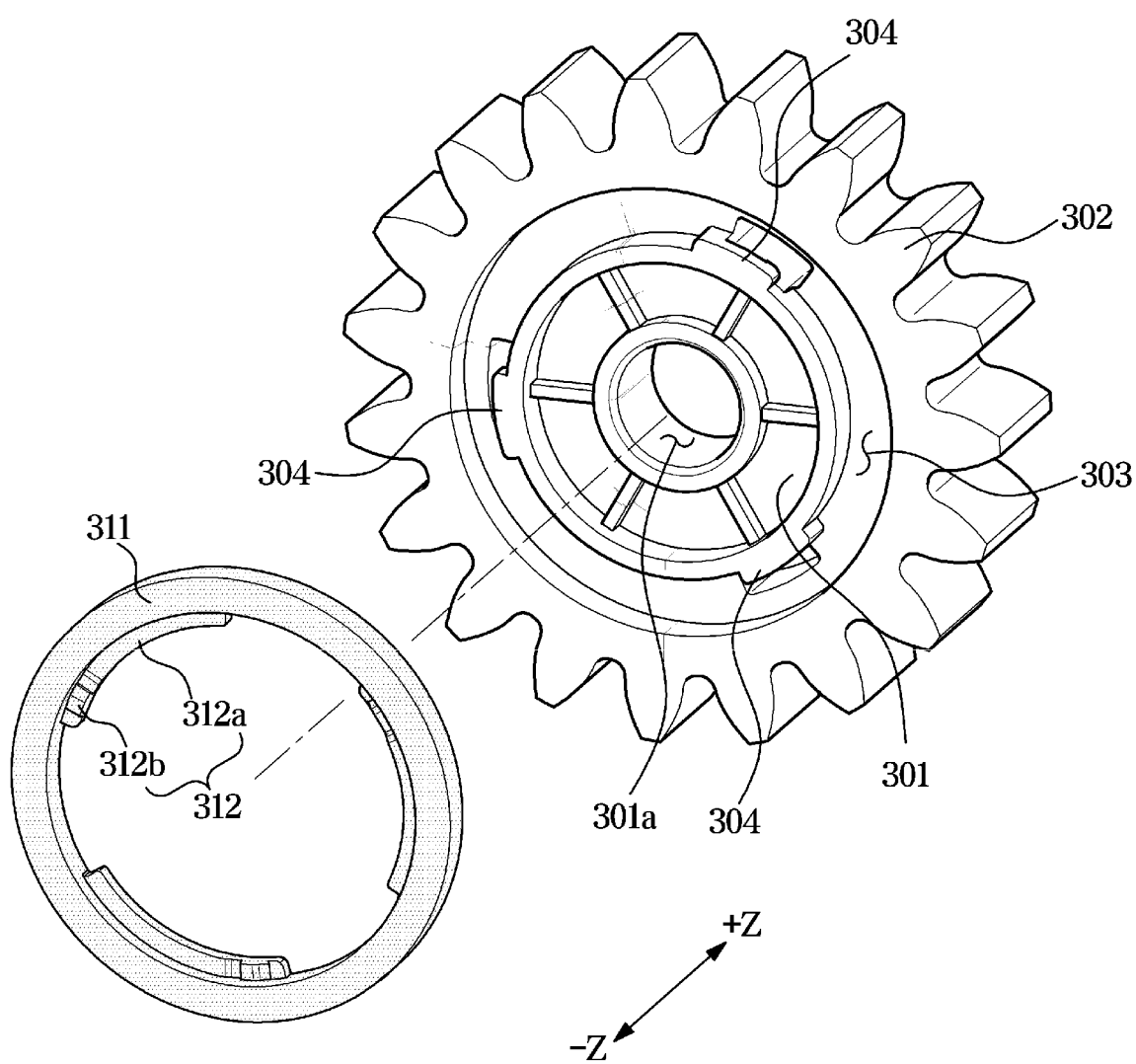
FIG. 13 is a perspective view illustrating a coupling relationship between the magnet and a gear in the door opening and closing device illustrated in FIG. 9.
Figure 14:
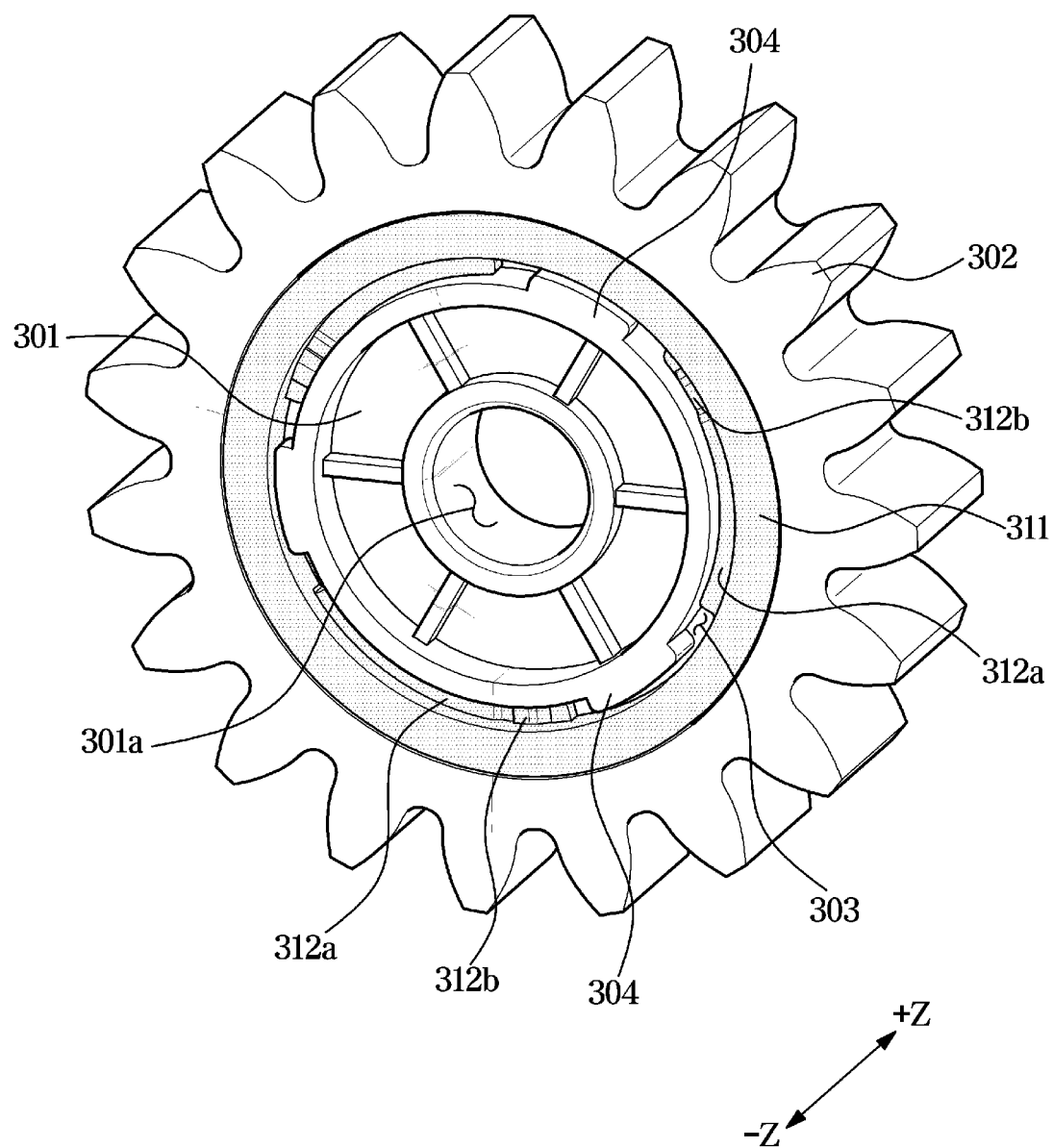
FIG. 14 is a perspective view illustrating the coupling relationship between the magnet and the gear in the door opening and closing device illustrated in FIG. 9.
Figure 15:
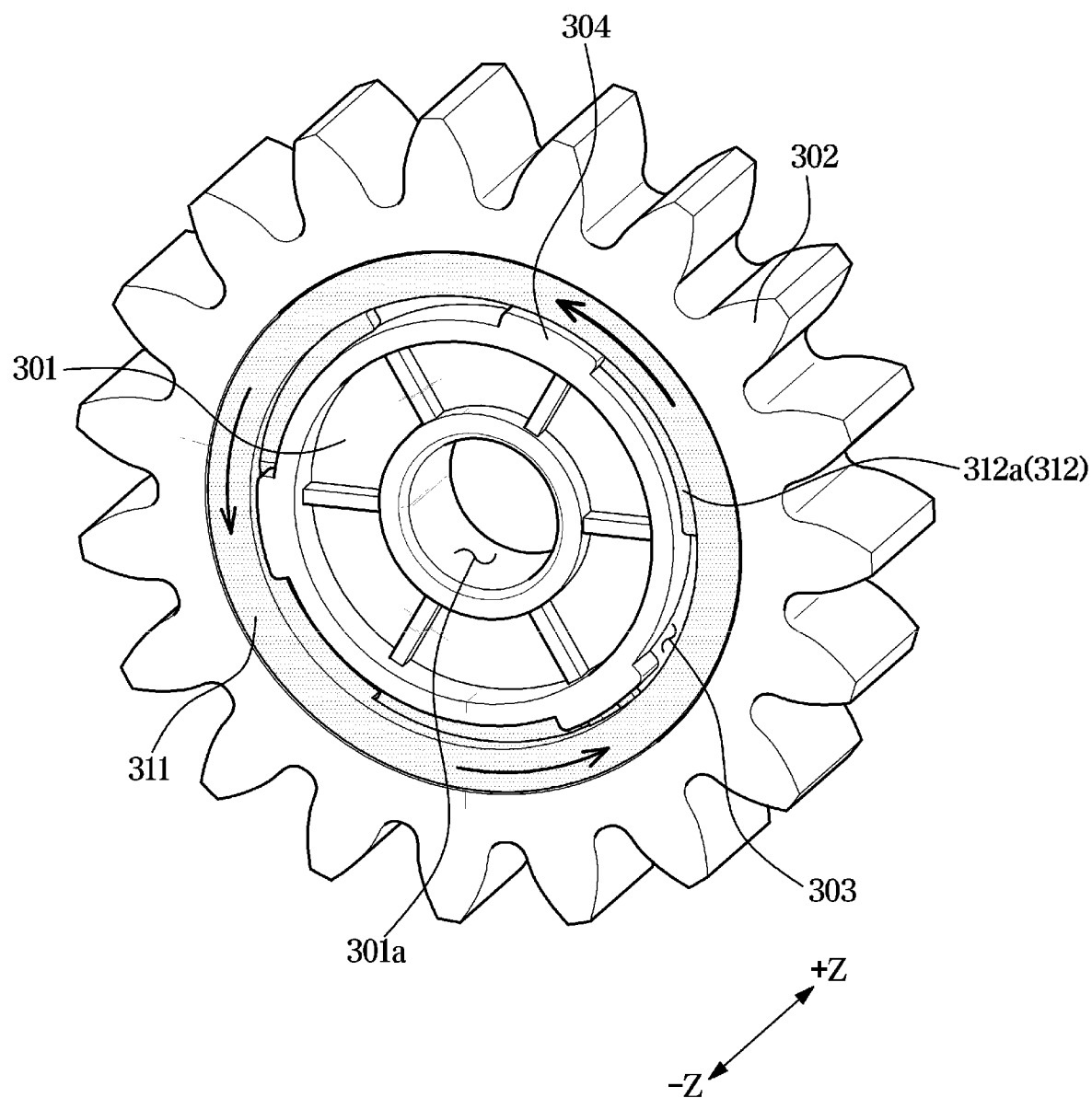
FIG. 15 is a perspective view illustrating the coupling relationship between the magnet and the gear in the door opening and closing device illustrated in FIG. 9.

FIGS. 13 to 15 are perspective views illustrating a coupling relationship between the magnet 310 and a gear in the door opening and closing device illustrated in FIG. 9.

Referring to FIGS. 13 to 15, according to an embodiment of the disclosure, the magnet 310 may include the magnetic member 311 and the inner protrusion 312. The inner protrusion 312 may include a base 312a and an interrupter 312b. The interrupter 312b may be interfered by the prevention protrusion 304 of the final gear 300. Accordingly, the magnet 310 may be accommodated in the final gear 300, and it is possible to prevent the magnet 310 from being separated to the outside of the final gear 300.

According to an embodiment of the disclosure, the final gear 300 may include a central portion 301, a tooth 302, a recess 303, and the prevention protrusion 304. A coupling hole 301a of the final gear 300 may be formed in the central portion 301.

The tooth 302 may be formed on an outside of the final gear 300. For example, the tooth 302 may protrude radially from an outer circumference of the final gear 300. The tooth 302 may correspond to a teeth of a gear. The tooth 302 may include a plurality of teeth. The recess 303 may be formed between the central portion 301 and the tooth 302. The recess 303 may be recessed to allow the magnet 310 to be accommodated in the final gear 300. The magnet 310 may be accommodated in the final gear 300.

The prevention protrusion 304 may protrude to the outside of the central portion 301. For example, the prevention protrusion 304 may extend radially from the outer circumference of the central portion 301. The prevention protrusion 304 may interfere with the inner protrusion 312 to prevent the magnet 310 from being separated toward the outside of the final gear 300 in a state in which the magnet 310 is accommodated in the final gear 300. For example, the prevention protrusion 304 may interfere with the interrupter 312b. In the state in which the magnet 310 is accommodated in the final gear 300, the inner protrusion 312 may be arranged above the prevention protrusion 304. In other words, in response to the magnet 310 being accommodated in the final gear 300, the prevention protrusion 304 may be arranged under the inner protrusion 312 to support the inner protrusion 312. The prevention protrusion 304 may be in contact with a part of the inner protrusion 312. The prevention protrusion 304 may be in contact with the interrupter 312b.

Hereinafter a process in which the magnet 310 is accommodated after being inserted into the final gear 300 will be described.

Referring to FIG. 13, the magnet 310 may be arranged in a Z direction so as to be coupled to the final gear 300. For example, the magnet 310 and the final gear 300 may be arranged in the vertical direction. The magnet 310 may be inserted from a lower side of the final gear 300 toward an upper side of the final gear 300. The magnet 310 may be inserted from a lower side of the recess 303 toward the recess 303.

FIG. 14 is a view illustrating a state in which the magnet 310 is inserted into the recess 303. In the state in which the magnet 310 is inserted into the recess 303, the inner protrusion 312 of the magnet 310 may not interfere with the prevention protrusion 304 of the final gear 300.

Referring to FIG. 15, the magnet 310 may be inserted into the recess 303 and then rotated so as to be accommodated in the final gear 300. With respect to the bottom surface of the final gear 300 and the magnet 310, the magnet 310 may be rotated counterclockwise within the recess 303. In response to the rotation of the magnet 310, the prevention protrusion 304 and the inner protrusion 312 may interfere with each other. For example, the prevention protrusion 304 and the interrupter 312b may interfere with each other. The prevention protrusion 304 and the interrupter 312b may be in contact with each other. Accordingly, the magnet 310 may be accommodated in the final gear 300. In the state in which the magnet 310 is accommodated in the final gear 300, the prevention protrusion 304 may be arranged under the inner protrusion 312 to support the inner protrusion 312. The prevention protrusion 304 may prevent the magnet 310 from being separated from the final gear 300. Although the drawing illustrates that the magnet 310 is rotated counterclockwise, the disclosure is not limited thereto. Alternatively, the magnet 310 may be rotated clockwise and accommodated in the recess 303 of the final gear 300.

Figure 17:
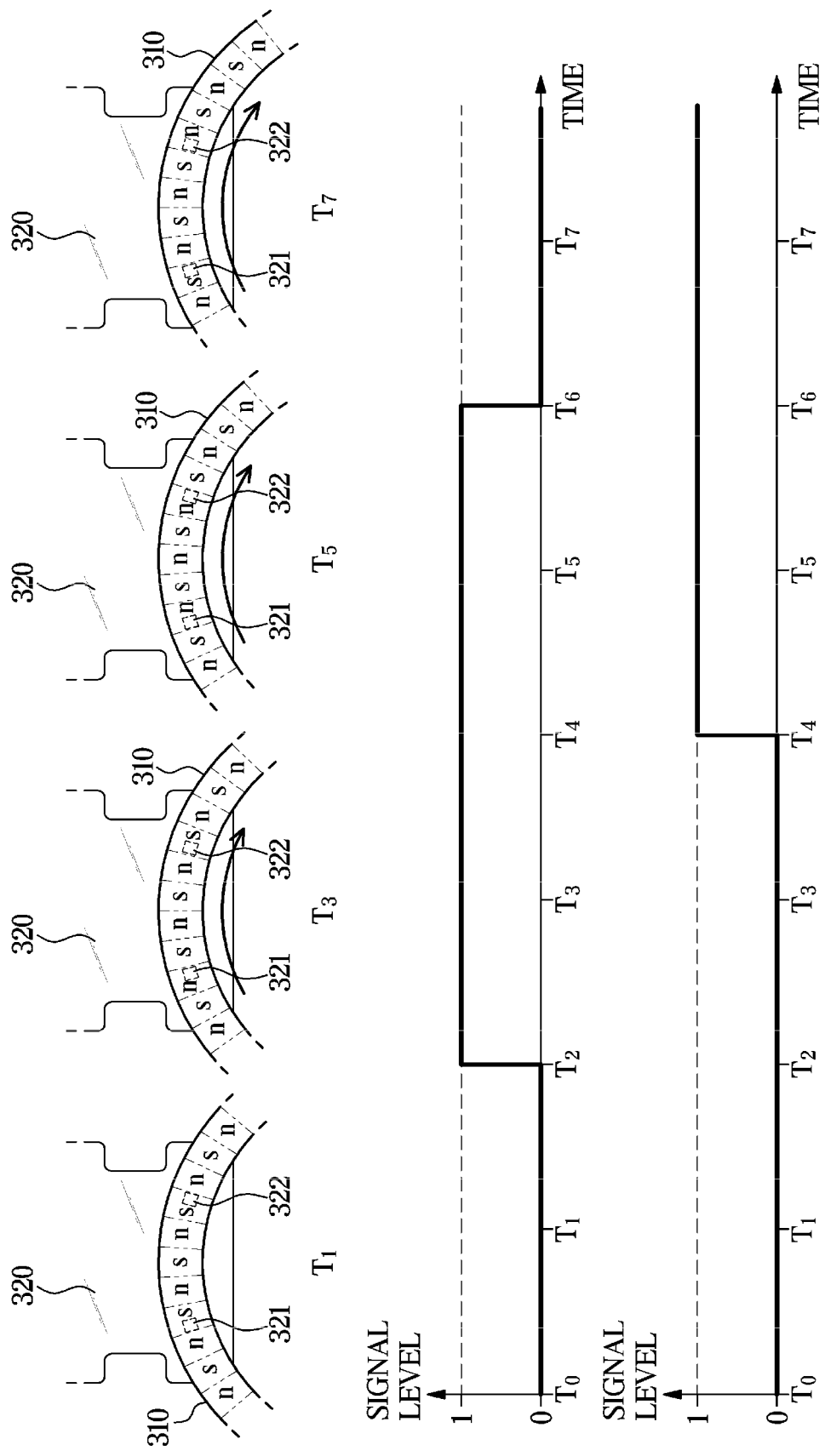
FIG. 17 is a view illustrating operation of the door position sensor illustrated in FIG. 16.

FIG. 16 is a view illustrating a configuration of the refrigerator according to an embodiment of the disclosure. FIG. 17 is a view illustrating operation of the door position sensor illustrated in FIG. 16.

Figure 18:
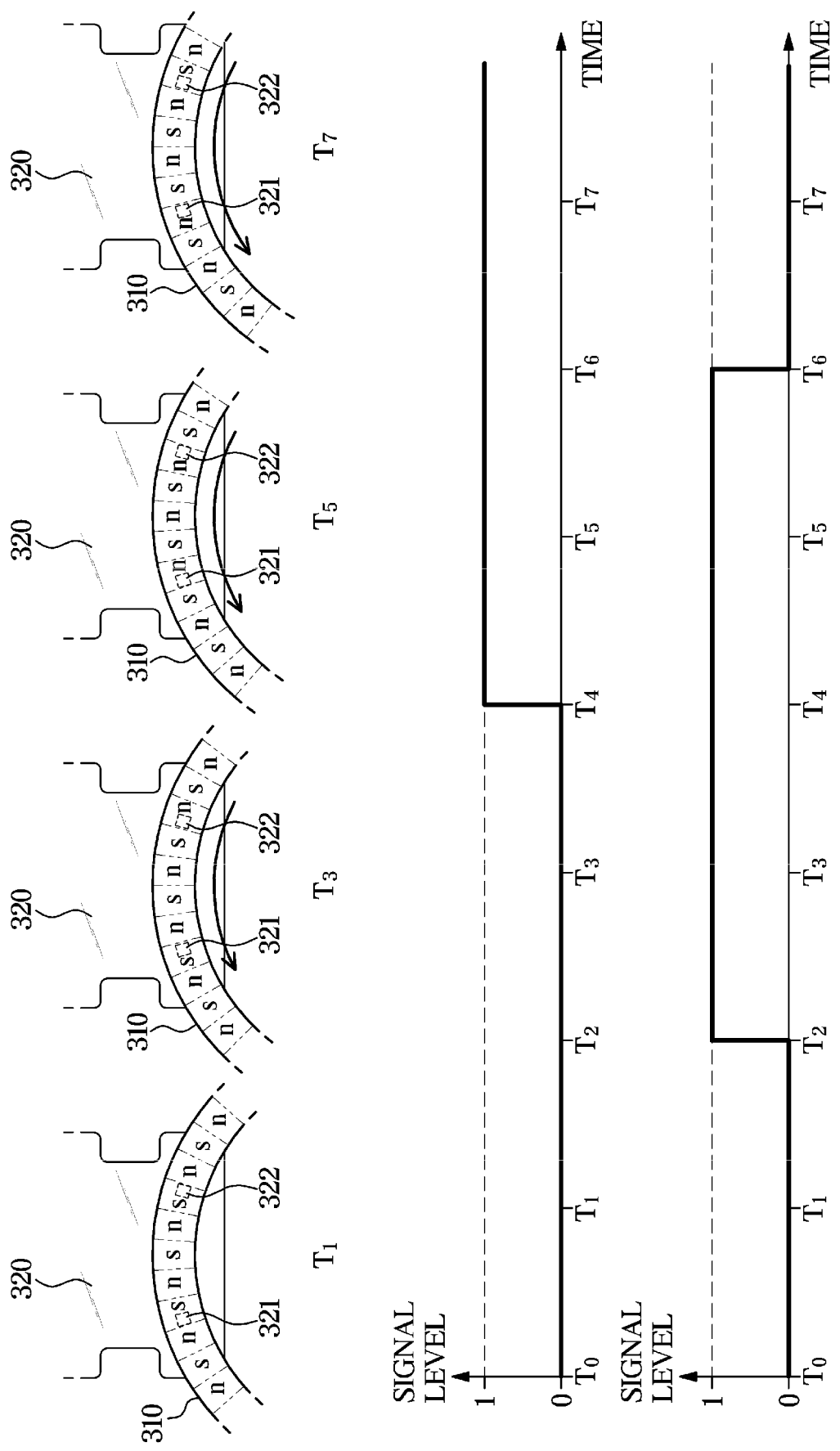
FIG. 18 is a view illustrating the operation of the door position sensor illustrated in FIG. 16.

Referring to FIGS. 16, 17 and 18, the refrigerator 1 may include a control panel 510, a microphone 520, an object sensor 530, the door position sensor 320, the door close sensor 550, the door opening and closing device 100, and the processor 590.

The control panel 510 may provide a user interface for interaction with the user. The control panel 510 may be provided in the housing 10 or may be provided in the door 30. For example, the control panel 510 may be arranged outside the refrigerating compartment door 30a.

The control panel 510 may include an input button 511 and/or a display 512.

The input button 511 may obtain a user input related to the operation of the refrigerator 1. For example, the input button 511 may obtain a user input (or user command) for opening the door 30. For example, the input button 511 may obtain a refrigeration target temperature for controlling the temperature of the refrigerating compartment 20a or a freezing target temperature for controlling the temperature of the freezing compartment 20b.

The input button 511 may provide an electrical signal (user input signal, e.g., a voltage signal or a current signal) corresponding to a user input to the processor 590. The processor 590 may identify the user input based on processing the user input signal.

The input button 511 may include a tact switch, a push switch, a slide switch, a toggle switch, a micro switch, or a touch switch.

The display 512 may obtain operation information of the refrigerator 1 from the processor 590 and may display the operation information of the refrigerator 1. For example, the display 512 may indicate opening or closing of door 30. For example, the display 512 may display the measured temperature of the refrigerating compartment 20a or the measured temperature of the freezing compartment 20b.

Further, the display 512 may display a user input obtained in relation to the operation of the refrigerator 1. For example, the display 512 may display a user input for opening the door 30. For example, the display 512 may display the refrigeration target temperature of the refrigerating compartment 20a or the freezing target temperature of the refrigerating compartment 20b obtained through the input button 511.

The display 512 may include a liquid crystal display (LCD) panel, a light emitting diode (LED) panel, or the like.

The microphone 520 may obtain a sound wave (e.g., voice or sound) and convert the obtained sound wave into an electrical signal (voice signal, e.g., a current signal or a voltage signal). For example, the microphone 520 may obtain the users voice and convert the voice into an electrical signal.

The microphone 520 may provide the electrical signal (voice signal) to the processor 590. The processor 590 may identify a user input by voice based on processing the voice signal.

The object sensor 530 may identify whether an object (e.g., a user) is located in the vicinity of the refrigerator 1, and may identify a distance to the object. For example, the object sensor 530 may identify whether a user is located in front of the refrigerator 1 (e.g., in front of the door) and identify a distance to the user. Without applying a force to the door 30 to open the door 30, the user may open the door 30 through motion by the object sensor 530.

The object sensor 530 may include a first distance sensor 531 and a second distance sensor 532.

The first distance sensor 531 may be installed on one side of the door 30. The first distance sensor 531 may transmit at least one of infrared rays, ultrasonic waves, and radio waves toward the front of the refrigerator 1, and receive at least one of infrared rays, ultrasonic waves, or radio waves that is reflected from an object (e.g., a user) located in front of the refrigerator 1.

For example, the first distance sensor 531 may identify a distance between the first distance sensor 531 and the object based on an intensity of at least one of received infrared rays, ultrasonic waves, and radio waves. For example, the first distance sensor 531 may identify the distance between the first distance sensor 531 and the object based on a difference (or phase difference) between a transmission time of at least one of infrared rays, ultrasonic waves, or radio waves and a reception time of at least one of infrared rays, ultrasonic waves or radio waves.

The first distance sensor 531 may provide the processor 590 with first distance data corresponding to the distance between the first distance sensor 531 and the object.

The second distance sensor 532 may be installed on the other side of the door 30. The second distance sensor 532 may transmit at least one of infrared rays, ultrasonic waves, and radio waves toward the front of the refrigerator 1, and may receive at least one of infrared rays, ultrasonic waves, or radio waves that is reflected from an object (e.g., a user) located in front of the refrigerator 1.

For example, the second distance sensor 532 may be substantially the same as the first distance sensor 531, and the second distance sensor 532 may provide the processor 590 with second distance data corresponding to the distance between the second distance sensor 532 and the object.

The processor 590 may identify whether an object (e.g., a user) is located in front of the refrigerator 1 and/or identify a distance to the object based on the first distance data and/or the second distance data.

The first distance sensor 531 and the second distance sensor 532 may be arranged at lower ends of the left and right doors 30, respectively. For example, the first distance sensor 531 may be arranged at the lower end of the left door in the drawing, and the second distance sensor 532 may be arranged at the lower end of the right door in the drawing. However, the number and positions of the distance sensors 531 and 532 are not limited thereto.

The first distance sensor 531 and the second distance sensor 532 may include at least one of an infrared sensor, a lidar sensor, an ultrasonic sensor, and a radar sensor.

The door position sensor 320 may be installed on the door of the refrigerator 1 and detect the rotation of the door 30. For example, the door position sensor 320 may identify a rotational displacement and/or rotational direction of the door 30.

The door position sensor 320 may include the first rotation sensor 321 and/or the second rotation sensor 322.

For example, each of the first rotation sensor 321 and the second rotation sensor 322 may include a hall sensor configured to detect a magnetic field and/or a polarity of the magnetic field by the magnet 310. As described above, in response to the opening or closing of the door 30, the magnet 310 may be rotated with respect to the body of the door 30. In this case, the magnet 310 may be formed in a substantially ring shape, and the N pole and the S pole may be alternately arranged along the circumference of the ring. The first rotation sensor 321 and the second rotation sensor 322 fixed to the body of the door 30 may detect a change in the magnetic field (e.g., a change in the polarity of the magnetic field) due to the rotation of the magnet 310.

The first rotation sensor 321 and the second rotation sensor 322 may be arranged on substantially the same plane. The first rotation sensor 321 and the second rotation sensor 322 may be arranged in the vicinity of the magnet 310 to detect a magnetic field by the magnet 310.

Each of the first rotation sensor 321 and the second rotation sensor 322 may provide the processor 590 with an electrical signal (rotation detection signal, e.g., a current signal or a voltage signal) corresponding to the detected polarity of the magnet 310.

For example, each of the first rotation sensor 321 and the second rotation sensor 322 may transmit a "0" signal ("0" signal) to the processor 590 based on the detection of the S pole of the magnet 310. In addition, each of the first rotation sensor 321 and the second rotation sensor 322 may transmit a "1" signal ("1" signal) to the processor 590 based on the detection of the N pole of the magnet 310.

In response to the rotation of the magnet 310 alternately arranged at the N pole and the S pole along the circumference, the first rotation sensor 321 and the second rotation sensor 322 may alternately output a "0" signal (low level signal) and "1" signal (high level signal).

The processor 590 may identify the rotation and rotation direction of the magnet 310 (i.e., opening or closing of the door) based on the output signal of the first rotation sensor 321 and the output signal of the second rotation sensor 322.

The door close sensor 550 may detect that the door 30 is closed, and may provide the processor 590 with an electrical signal (a door closing signal) corresponding to the closing of the door 30.

For example, the door close sensor 550 may include a micro switch or a reed switch.

As described above, the door opening and closing device 100 may automatically open or close the door 30 according to the control of the processor 590.

The door opening and closing device 100 may include a motor drive 111 and the drive motor 110. Further, the door opening and closing device 100 may further include the plurality of gears provided to transmit the rotation of the drive motor 110 to the hinge of the refrigerator 1.

The motor drive 111 may receive a target speed command or a target torque command from the processor 590, and may provide a driving current corresponding to the target speed command or the target torque command to the drive motor 110. For example, the motor drive 111 may apply a pulse width-modulated driving voltage to the drive motor 110 to provide a driving current to the drive motor 110.

For example, the motor drive 111 may control the driving current provided to the drive motor 110 based on a difference between the target speed and the measured speed of the drive motor 110. The motor drive 111 may increase a duty ratio of the pulse width-modulated driving voltage to increase the driving current in response to the measured speed of the drive motor 110 being less than the target speed. Further, the motor drive 111 may reduce the duty ratio of the pulse width-modulated driving voltage to reduce the driving current in response to the measured speed of the drive motor 110 being greater than the target speed.

In addition, the motor drive 111 may control the duty ratio of the pulse width-modulated driving voltage based on a target torque. For example, the motor drive 111 may apply a driving voltage having a duty ratio of 100% to the drive motor 110 in response to receiving a maximum torque command from the processor 590.

The drive motor 110 may generate a torque for opening the door 30 or closing the door 30.

The drive motor 110 may include a stator fixed to the body of the door 30 and a rotor rotatable with respect to the stator. The rotor may be connected to a rotation shaft of the drive motor 110. The rotor may be rotated through magnetic interaction with the stator, and the rotation of the rotor may be transmitted to the plurality of gears through the rotation shaft.

The drive motor 110 may include a brushless direct current motor (BLDC Motor) or a permanent magnet synchronous motor (PMSM) that facilitates control of the rotation speed.

The processor 590 may be mounted on a printed circuit board provided inside the door 30 or on a printed circuit board provided inside the housing 10.

The processor 590 may be operatively or electrically connected to the control panel 510, the microphone 520, the object sensor 530, the door position sensor 320, the door close sensor 550 and/or the door opening and closing device 100.

The processor 590 may process an output signal of the control panel 510, the microphone 520, the object sensor 530, the door position sensor 320, or the door close sensor 550, and output a control signal for controlling the door opening and closing device 100.

The processor 590 may include a memory 591 configured to store or memorize a program (a plurality of instructions) or data for processing a signal and providing a control signal. The memory 191 may include volatile memories such as Static Random Access Memory (S-RAM) and Dynamic Random Access Memory (D-RAM), and non-volatile memory such as Read Only Memory (ROM), and Erasable Programmable Read Only Memory (EPROM). The memory 591 may be provided integrally with the processor 590 or provided as a semiconductor device separated from the processor 590.

The processor 590 may further include a processing core (e.g., an arithmetic circuit, a memory circuit, and a control circuit) configured to process a signal and output a control signal based on the program or data stored in the memory 591.

The processor 590 may process a user input signal of the control panel 510 and identify the user input. For example, the processor 590 may identify a user input for opening the door 30 or a user input for closing the door 30. The processor 590 may control the door opening and closing device 100 to open or close the door 30 based on a user input signal of the control panel 510.

Further, the processor 590 may control the door opening and closing device 100 to independently open or close the left door and the right door based on a user input signal of the control panel 510. For example, the processor 590 may control the door opening and closing device 100 to selectively open the left door based on a user input signal for opening the left door. In addition, the processor 590 may control the door opening and closing device 100 to selectively open the right door based on a user input signal for opening the right door.

The processor 590 may process a voice signal of the microphone 520 and identify a user input based on the voice. For example, the processor 590 may identify a voice for opening the door 30 or a voice for closing the door 30. The processor 590 may control the door opening and closing device 100 to open or close the door 30 based on the voice signal of the microphone 520.

The processor 590 may control the door opening and closing device 100 to independently open or close the left door and the right door based on the users voice signal from the microphone 520. For example, the processor 590 may control the door opening and closing device 100 to selectively open the left door based on a user voice signal for opening the left door. In addition, the processor 590 may control the door opening and closing device 100 to selectively open the right door based on a user voice signal for opening the right door.

The processor 590 may process the first distance data and the second distance data of the object sensor 530, and identify whether the user is located in front of the refrigerator 1 and/or the distance to the user in front of the refrigerator 1.

The processor 590 may identify a user relative position using trilateration. The processor 590 may identify the user relative position based on a predetermined distance between the first distance sensor 531 and the second distance sensor 532, a first distance based on the first distance data, and a second distance based on the second distance data. For example, the processor 590 may identify whether the user is located on the front left side of the refrigerator 1 or on the front right side of the refrigerator 1. Further, the processor 590 may identify the shortest distance between the user and the front surface of the refrigerator 1 and/or the shortest distance between the user and a center line that passes through the center of the refrigerator 1 and is perpendicular to the front surface of the refrigerator 1.

The processor 590 may control the door opening and closing device 100 to open or close the door 30 based on whether the user is located in front of the refrigerator 1 and/or the position of the user in the front of the refrigerator 1.

For example, in response to determining that the user interferes with the opening or closing of the door 30, the processor 590 may not open or close the door 30. Further, the processor 590 may output an audio message indicating that the door may be opened or closed.

Alternatively, in response to determining that the user interferes with the opening or closing of the door 30, the processor 590 may open or close the door 30 within a range in which the user does not interfere with the opening or closing of the door 30. In other words, the processor 590 may partially open or close the door 30. In response to determining that the user does not interfere with the opening or closing of the door 30, the processor 590 may fully open or close the door 30 that is partially opened or partially closed.

The processor 590 may process the output signal of the door position sensor 320 and identify the angle of the door 30 (e.g., an angle between a direction pointed by the closed door and a direction pointed by the open door). In addition, the processor 590 may identify the direction in which the door 30 is rotated (whether the door is being opened or closed).

As illustrated in FIG. 17, in response to the magnet 310 being rotated clockwise due to the rotation of the door 30, the first rotation sensor 321 and the second rotation sensor 322 may detect a magnetic field by the S pole of the magnet 310 at time T1. At time T1, the first rotation sensor 321 and the second rotation sensor 322 may provide "0" signal to the processor 590.

The magnet 310 may be rotated clockwise. At time T3, the first rotation sensor 321 may detect a magnetic field by the N pole of the magnet 310 and the second rotation sensor 322 may detect a magnetic field by the S pole of the magnet 310. At time T3, the first rotation sensor 321 may provide "1" signal to the processor 590, and the second rotation sensor 322 may provide "0" signal to the processor 590.

As mentioned above, the output signal of the first rotation sensor 321 may be changed from "0" signal to "1" signal by the rotation of the magnet 310. For example, at approximately time T2, the first rotation sensor 321 may pass near a boundary between the S pole and the N pole of the magnet 310, and the output signal of the first rotation sensor 321 may be changed from "0" signal to "1" signal.

The magnet 310 may be further rotated clockwise. At time T5, the first rotation sensor 321 and the second rotation sensor 322 may detect a magnetic field by the N pole of the magnet 310. At time T5, the first rotation sensor 321 and the second rotation sensor 322 may provide "1" signal to the processor 590.

As mentioned above, the output signal of the second rotation sensor 322 may be changed from "0" signal to "1" signal by the rotation of the magnet 310. For example, at approximately time T4, the second rotation sensor 322 may pass near a boundary between the S pole and the N pole of the magnet 310, and the output signal of the second rotation sensor 322 may be changed from "0" signal to "1" signal.

The magnet 310 may be further rotated clockwise. At time T7, the first rotation sensor 321 may detect a magnetic field by the S pole of the magnet 310 and the second rotation sensor 322 may detect a magnetic field by the N pole of the magnet 310. At time T7, the first rotation sensor 321 may provide "0" signal to the processor 590, and the second rotation sensor 322 may provide a low-level signal to the processor 590.

As mentioned above, the output signal of the first rotation sensor 321 may be changed from "1" signal to "0" signal by the rotation of the magnet 310. For example, at approximately time T6, the first rotation sensor 321 may pass near a boundary between the N pole and the S pole of the magnet 310, and the output signal of the first rotation sensor 321 may be changed from "1" signal to "0" signal.

While the magnet 310 is rotated clockwise, the pair of the output signal of the first rotation sensor 321 and the output signal of the second rotation sensor 322 may be sequentially changed such as (0, 0), (1, 0), (1, 1), and (0, 1).

The processor 590 may detect the rotation of the magnet 310 based on a change in at least one of the output signals of the first and second rotation sensors 321 and 322. In addition, the processor 590 may identify an angle (rotational displacement) at which the magnet 310 is rotated based on a change in at least one of the output signals of the first and second rotation sensors 321 and 322. In other words, the processor 590 may detect the rotation of the door 30 based on a change in at least one of the output signals of the first and second rotation sensors 321 and 322.

For example, 24 N poles and 24 S poles may be alternately arranged along the circumference of the magnet 310. In other words, 48 poles (N poles or S poles) may be arranged along the circumference of the magnet 310. A single pole may occupy about 7.5 degrees.

While the output signal of the first rotation sensor 321 and the output signal of the second rotation sensor 322 is changed in a sequence of (0, 0), (1, 0), (1, 1), (0, 1) for a single cycle, the first rotation sensor 321 and the second rotation sensor 322 may pass through a single N pole and a single S pole, respectively. Accordingly, while the magnet 310 is rotated by approximately 15 degrees, the first rotation sensor 321 and the second rotation sensor 322 may provide four pairs of output signals to the processor 590. In other words, while the door 30 is rotated by approximately 15 degrees, the first rotation sensor 321 and the second rotation sensor 322 may provide four pairs of output signals to the processor 590.

The processor 590 may identify that the door 30 is rotated approximately 3.75 degrees based on a change in at least one of the output signal of the first rotation sensor 321 or the output signal of the second rotation sensor 322.

In addition, the processor 590 may identify an angle at which the door 30 is rotated, based on the number of changes in at least one of the output signal of the first rotation sensor 321 or the output signal of the second rotation sensor 322.

As illustrated in FIG. 18, in response to the counterclockwise rotation of the magnet 310 caused by the rotation of the door 30, the first rotation sensor 321 and the second rotation sensor 322 may detect a magnetic field by the S pole of the magnet 310 at time T1 and provide "0" signal to the processor 590.

At time T3 in which the magnet 310 is rotated counterclockwise, the first rotation sensor 321 may detect a magnetic field by the S pole of the magnet 310 and provide "0" signal to the processor 590. In addition, the second rotation sensor 322 may detect a magnetic field by the N pole of the magnet 310 and provide "1" signal to the processor 590.

At time T5 in which the magnet 310 is further rotated counterclockwise, the first rotation sensor 321 and the second rotation sensor 322 may detect the magnetic field by the N pole of the magnet 310, and provide "1" signal to the processor 590.

At time T7 in which the magnet 310 is rotated counterclockwise, the first rotation sensor 321 may detect the magnetic field by the N pole of the magnet 310 and provide "1" signal to the processor 590. In addition, the second rotation sensor 322 may detect the magnetic field by the S pole of the magnet 310 and provide "0" signal to the processor 590.

While the magnet 310 is rotated counterclockwise, the pair of the output signal of the first rotation sensor 321 and the output signal of the second rotation sensor 322 may be changed in the sequence of (0, 0), (0, 1), (1, 1), (1, 0). As described above, while the magnet 310 is rotated clockwise, the pair of the output signal of the first rotation sensor 321 and the output signal of the second rotation sensor 322 may be changed in the sequence of (0, 0), (1, 0), (1, 1), (0, 1).

As mentioned above, while the magnet 310 is rotated clockwise, the output signal of the first rotation sensor 321 may be first changed, and then the output signal of the second rotation sensor 322 may be changed. On the other hand, while the magnet 310 is rotated counterclockwise, the output signal of the second rotation sensor 322 may be first changed, and then the output signal of the first rotation sensor 321 may be changed.

In other words, while the magnet 310 is rotated clockwise, a phase of the output signal of the first rotation sensor 321 may precede a phase of the output signal of the second rotation sensor 322. Further, while the magnet 310 is rotated counterclockwise, the phase of the output signal of the second rotation sensor 322 may precede the phase of the output signal of the first rotation sensor 321.

The processor 590 may identify whether the magnet 310 is rotated clockwise or counterclockwise, based on the change in the output signal of the first rotation sensor 321 and the second rotation sensor 322. For example, the processor 590 may identify whether the magnet 310 is rotated clockwise or counterclockwise, based on the comparison between the phase of the output signal of the first rotation sensor 321 and the phase of the output signal of the second rotation sensor 322.

The processor 590 may identify whether the door 30 is being opened or closed based on the comparison between the phase of the output signal of the first rotation sensor 321 and the phase of the output signal of the second rotation sensor 322.

While the door 30 is being opened, the processor 590 may identify an angle of the door 30 by accumulating the number of changes in at least one of the output signal of the first rotation sensor 321 or the output signal of the second rotation sensor 322.

In addition, while the door 30 is being closed, the processor 590 may identify an angle of the door 30 by subtracting the number of changes in at least one of the output signal of the first rotation sensor 321 or the output signal of the second rotation sensor 322.

The processor 590 may process the output of the door close sensor 550 and identify that the door 30 is closed. Further, the processor 590 may initialize the angle of the door 30 to "O" degree based on the identification that the door 30 is closed. The angle of the door 30 may be defined as an angle between a direction pointed by the closed door 30 and a direction pointed by the open door 30. Accordingly, the "angle" of the closed door 30 may be "0" degrees.

The processor 590 may control the motor drive 111 to control a rotation speed (i.e., an opening speed) of the door 30, which is being opened, based on the angle of the door 30. For example, the processor 590 may control the rotation speed of the door 30 to allow the door 30 to be naturally opened to a target angle.

The processor 590 may control the motor drive 111 to control a rotation speed (i.e., a closing speed) of the door 30, which is being closed, based on the angle of the door 30. For example, the processor 590 may control the rotation speed of the door to allow the door 30 to be naturally closed.

Accordingly, the refrigerator may automatically open or close the door 30, and further identify the position (rotation angle) of the door 30 while opening or closing the door 30. In addition, the refrigerator may control opening or closing of the door based on the identified angle of the door 30.

The processor 590 may identify interference or a back torque applied to the door 30 based on the change in the angle of the door 30. The processor 590 may control the motor drive 111 to stop rotation of the door 30 in response to the interference or the back torque applied to the door 30.

As mentioned above, the refrigerator may identify that the door is stopped by the user or an obstacle while opening or closing the door 30, and the refrigerator may stop driving the door 30 based on the fact that the door 30 is stopped. Accordingly, the refrigerator may prevent or suppress overheating of the drive motor 110 or the motor drive 111 to drive the door 30. In addition, the user can easily stop opening and closing the door 30 of the refrigerator even while the door 30 of the refrigerator is being automatically opened or closed.

In addition, the refrigerator may identify that the door 30 is being closed or opened by the user while opening or closing the door 30, and the refrigerator may stop the driving of the door 30 based on a back force applied on the door 30. Accordingly, the refrigerator may prevent or suppress overheating of the drive motor 110 or the motor drive 111 to drive the door 30. In addition, the user can easily stop opening and closing the door 30 of the refrigerator even while the door 30 of the refrigerator is being automatically opened or closed.

Figure 19:
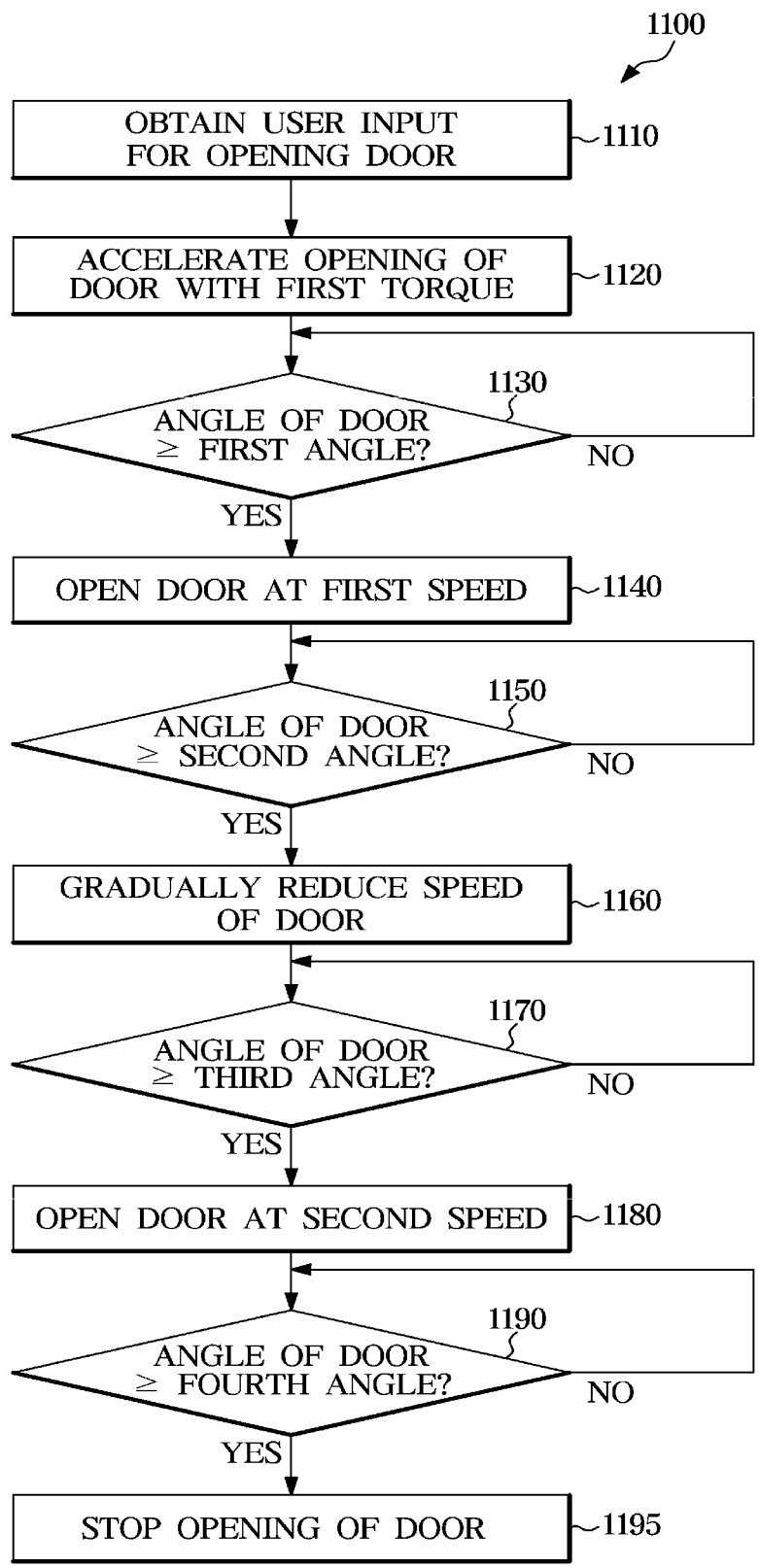
FIG. 19 is a flowchart illustrating a method in which the refrigerator opens the door according an embodiment of the disclosure.

FIG. 19 is a flowchart illustrating a method in which the refrigerator opens the door according an embodiment of the disclosure. FIGS. 20 to 23 are views illustrating an example in which the refrigerator controls a speed of opening the door according to an angle of the door according to the method illustrated in FIG. 19.

A method 1100 in which the refrigerator 1 opens the door 30 will be described with reference to FIGS. 19 to 23.

The refrigerator 1 may obtain a user input for opening the door 30 (1110).

The processor 590 may identify a user input for opening the door 30 based on an output signal received from the control panel 510, the microphone 520, or the object sensor 530.

For example, the control panel 510 may obtain a user input for opening the door 30 through the input button 511. The processor 590 may identify the user input for opening the door 30 based on a user input signal of the control panel 510.

For example, the microphone 520 may obtain a user voice for opening the door 30 and may convert the user voice into an electrical voice signal. The processor 590 may identify a user input for opening the door 30 based on the voice signal of the microphone 520. By using the microphone 520, the user may open the door 30 through voice without applying a force to the door 30. The processor 590 may compare the acquired voice signal with a reference voice signal for opening the door 30, and in response to a degree of similarity, which is between the obtained voice signal and the reference voice signal, exceeding a reference value, the processor 590 may identify the user input for opening the door 30. Further, the processor 590 may include a voice recognition engine configured to identify a natural language, and may identify a user input for opening the door 30 using the voice recognition engine.

For example, the object sensor 530 may obtain a user motion for opening the door 30. The object sensor 530 may provide the processor 590 with first distance data and second distance data that is changed according to a users motion. The processor 590 may identify the user motion based on the first distance data and the second distance data. The processor 590 may compare the user motion with a reference motion for opening the door 30, and in response to a degree of similarity, which is between the obtained user motion and a reference motion, exceeding a reference value, the processor 590 may identify a user input for opening the door 30.

The refrigerator 1 may accelerate the opening of the door 30 with a first torque (1120).

The processor 590 may control the motor drive 111 to allow the drive motor 110 to apply the first torque to the door 30 so as to open the door 30. For example, the processor 590 may control the motor drive 111 to provide a driving voltage having a duty ratio of substantially 100% (e.g., a duty ratio of 99%) to the drive motor 110 so as to open the door 30.

By the first torque (e.g., a torque by a driving voltage having a duty ratio of substantially 100%), the door 30 may be opened by overcoming the load that maintains the door 30 in the closed state. Further, as illustrated in FIG. 20, the rotation speed of the door 30 may be increased. In other words, the opening of the door 30 may be accelerated.

The refrigerator 1 may identify whether the angle of the door 30 (e.g., the angle between the direction pointed by the closed door and the direction pointed by the open door) is greater than or equal to a first angle Θ1 while the door 30 is being opened (1130).

The processor 590 may obtain an output signal of the door position sensor 320 while the door 30 is being opened. For example, the processor 590 may obtain a pair of an output signal of the first rotation sensor 321 and an output signal of the second rotation sensor 322 while the door 30 is being opened. In addition, the processor 590 may identify whether the door 30 is opened based on the comparison between the phase of the output signal of the first rotation sensor 321 and the phase of the output signal of the second rotation sensor 322.

The processor 590 may identify the angle of the door 30 based on the output signal of the door position sensor 320. For example, the processor 590 may identify the rotation angle of the door 30 (e.g., 3.75 degrees rotation*the number of changes in at least one output signal) based on the accumulated or subtracted number of changes in the at least one of the output signals of the first and second rotation sensors 321 and 322. The processor 590 may identify the angle of the door 30 by accumulating the rotation angle of the door 30.

The processor 590 may compare the identified angle of the door 30 with the first angle Θ1 and may identify whether the angle of the door 30 is greater than or equal to the first angle Θ1. The first angle Θ1 may be an angle between 5 degrees and 20 degrees.

In addition, the processor 590 may identify whether the accumulated or subtracted number of changes in the at least one of the output signals of the first and second rotation sensors 321 and 322 is greater than or equal to a first number of times corresponding to the first angle Θ1.

In response to the angle of the door 30 being less than the first angle Θ1 (no in 1130), the refrigerator 1 may continue to accelerate the opening of the door 30 with the first torque.

In response to the angle of the door 30 being greater than or equal to the first angle Θ1 (yes in 1130), the refrigerator 1 may open the door 30 at a first speed V1 (1140).

The processor 590 may control the motor drive 111 to allow the door 30 to be rotated at the first speed V1 in the first direction (opening direction), based on the angle of the door 30 being greater than or equal to the first angle Θ1. For example, the processor 590 may provide a target speed command corresponding to the first speed V1 to the motor drive 111 to control the rotation speed of the door 30.

In this case, the first speed V1 may correspond to a speed at which the door 30 is naturally opened by the user. The first speed V1 may be set experimentally or empirically.

Accordingly, as illustrated in FIG. 21, in response to the angle of the door 30 being greater than or equal to the first angle Θ1, the door 30 may be opened at the first speed V1.

In the above description, it has been described that the refrigerator 1 rotates the door 30 at the first speed V1 based on the angle of the door 30 reaching the first angle. However, the door opening operation of the refrigerator 1 is not limited thereto.

For example, the rotation speed of the door 30 in response to the angle of the door 30 reaching the first angle Θ1 may be greater than the first speed V1. In order that the rotation speed of the door 30 is naturally changed, the refrigerator 1 may reduce the torque of the drive motor 110 to allow the rotation speed of the door 30 to reach the first speed V1 after the angle of the door 30 reaches the first angle Θ1.

For example, the rotation speed of the door 30 in response to the angle of the door 30 reaching the first angle Θ1 may be less than the first speed V1. In order that the rotation speed of the door 30 is naturally changed, the refrigerator 1 may increase the torque of the drive motor 110 to allow the rotation speed of the door 30 to reach the first speed V1 after the angle of the door 30 reaches the first angle Θ1.

For example, while accelerating the opening of the door 30 with the first torque, the refrigerator 1 may rotate the door 30 at the first speed V1 based on the rotation speed of the door 30 reaching the first speed V1. An angle of the door 30 in response to the rotation speed of the door 30 reaching the first speed V1 may be approximately the first angle Θ1.

For example, while accelerating the opening of the door 30 with the first torque, the refrigerator 1 may rotate the door 30 at a predetermined speed based on the angle of the door 30 reaching the first angle Θ1. A rotation speed of the door 30 in response to the angle of the door 30 reaching the first angle Θ1 may be approximately the first speed V1.

The refrigerator 1 may identify whether the angle of the door 30 is greater than or equal to a second angle Θ2 while the door 30 is being opened (1150).

The processor 590 may compare an angle of the door 30, which is identified based on the output of the door position sensor 320, with the second angle Θ2 and may identify whether the angle of the door 30 is greater than or equal to the second angle Θ2. The second angle Θ2 may be an angle between 30 degrees and 50 degrees.

In addition, the processor 590 may identify whether the accumulated or subtracted number of changes in the at least one of the output signals of the first and second rotation sensors 321 and 322 is greater than or equal to a second number of times corresponding to the second angle Θ2.

In response to the angle of the door 30 being less than the second angle Θ2 (no in 1150), the refrigerator 1 may continue to open the opening of the door 30 at the first speed V1.

In response to the angle of the door 30 being greater than or equal to the second angle Θ2 (yes in 1150), the refrigerator 1 may gradually or stepwise reduce the speed of the door 30 (1160).

The processor 590 may control the motor drive 111 to allow the rotation speed (opening speed) of the door 30 to be gradually or stepwise reduced, based on the angle of the door 30 being greater than or equal to the second angle Θ2. For example, in order to control the rotation speed of the door 30, the processor 590 may provide the motor drive 111 with a target speed command for gradually or stepwise reducing from the first speed V1. For example, the processor 590 may control the motor drive 111 to allow the drive motor 110 to apply the first torque to the door 30, thereby decelerating the door 30. In other words, the processor 590 may control the motor drive 111 to provide the drive motor 110 with a driving voltage having a predetermined duty ratio to decelerate the door 30.

Accordingly, as illustrated in FIG. 22, in response to the angle of the door 30 being greater than or equal to the second angle Θ2, the rotation speed of the door 30 may be reduced gradually or stepwise.

As mentioned above, by gradually or stepwise reducing the rotation speed (opening speed) of the door 30, the door 30 may be maximally and naturally opened without bounding.

The refrigerator 1 may identify whether the angle of the door 30 is greater than or equal to a third angle Θ3 while the door 30 is being opened (1170).

The processor 590 may compare the angle identified by the output of the door position sensor 320 with the third angle Θ3, and may identify whether the angle of the door 30 is greater than or equal to the third angle Θ3. The third angle Θ3 may be greater than the first angle Θ1 and the second angle Θ2. The third angle Θ3 may be an angle between 80 degrees and 100 degrees.

In addition, the processor 590 may identify whether the accumulated or subtracted number of changes in the at least one of the output signals of the first and second rotation sensors 321 and 322 is greater than or equal to a third number of times corresponding to the third angle Θ3.

In response to the angle of the door 30 being less than the third angle Θ3 (no in 1170), the refrigerator 1 may continue to gradually reduce the speed of the door 30.

In response to the angle of the door 30 being greater than or equal to the third angle Θ3 (yes in 1170), the refrigerator 1 may open the door 30 at the second speed V2 (1180).

Based on the angle of the door 30 being greater than or equal to the third angle Θ3, the processor 590 may control the motor drive 111 to allow the door 30 to be rotated at the second speed V2 in the first direction (closing direction). For example, the processor 590 may provide the motor drive 111 with a target speed command corresponding to the second speed V2 so as to control the rotation speed of the door 30.

In this case, the second speed V2 may be less than the first speed V1. The second speed V2 may correspond to a speed that allows the door 30 to smoothly reach a maximum opening angle (e.g., an angle between 110 and 130 degrees). The second speed V2 may be set experimentally or empirically.

Accordingly, as illustrated in FIG. 23, in response to the angle of the door 30 being greater than or equal to the third angle Θ3, the door 30 may be opened at the second speed V2. In other words, the door 30 may be opened at a relatively slow speed.

In the above description, it has been described that the refrigerator 1 rotates the door 30 at the second speed V2 based on the angle of the door 30 reaching the third angle Θ3. However, the door opening operation of the refrigerator 1 is not limited thereto.

For example, the rotation speed of the door 30 in response to the angle of the door 30 reaching the third angle Θ3 may be greater than the second speed V2. In order that the rotation speed of the door 30 is naturally changed, the refrigerator 1 may reduce the torque of the drive motor 110 to allow the rotation speed of the door 30 to reach the second speed V2 after the angle of the door 30 reaches the third angle Θ3.

For example, the rotation speed of the door 30 in response to the angle of the door 30 reaching the third angle Θ3 may be less than the second speed V2. In order that the rotation speed of the door 30 is naturally changed, the refrigerator 1 may increase the torque of the drive motor 110 to allow the rotation speed of the door 30 to reach the second speed V2 after the angle of the door 30 reaches the third angle Θ3.

For example, while gradually reducing the rotation speed of the door 30, the refrigerator 1 may rotate the door 30 at the second speed V2 based on the rotation speed of the door 30 reaching the second speed V2. An angle of the door 30 in response to the rotation speed of the door 30 reaching the second speed V2 may be approximately the third angle Θ3.

For example, while gradually reducing the rotation speed of the door 30, the refrigerator 1 may rotate the door 30 at a predetermined speed based on the angle of the door 30 reaching the third angle Θ3. A rotation speed of the door 30 in response to the angle of the door 30 reaching the third angle Θ3 may be approximately the second speed V2.

The refrigerator 1 may identify whether the angle of the door 30 is greater than or equal to a fourth angle Θ4 while the door 30 is being opened (1190).

The processor 590 may compare an angle of the door 30, which is identified based on the output of the door position sensor 320, with the fourth angle Θ4 and may identify whether the angle of the door 30 is greater than or equal to the fourth angle Θ4. The fourth angle Θ4 may be greater than the first angle Θ1, the second angle Θ2, and the third angle Θ3. The fourth angle Θ4 may be an angle between 110 degrees and 130 degrees.

In addition, the processor 590 may identify whether the accumulated or subtracted number of changes in the at least one of the output signals of the first and second rotation sensors 321 and 322 is equal to or greater than a fourth number of times corresponding to the fourth angle Θ4.

In response to the angle of the door 30 being less than the fourth angle Θ4 (no in 1190), the refrigerator 1 may continue to open the opening of the door 30 at the second speed V2.

In response to the angle of the door 30 being greater than or equal to the fourth angle Θ4 (yes in 1190), the refrigerator 1 may terminate the opening of the door 30.

The processor 590 may control the motor drive 111 to stop rotation (opening of the door) of the door 30 based on the angle of the door 30 being greater than or equal to the fourth angle Θ4.

As described above, the refrigerator 1 may control the speed at which the door 30 is opened depending on the angle of the door 30. Accordingly, the refrigerator 1 may naturally open the door 30 without bounding, just as the user opens the door 30.

Figure 24:
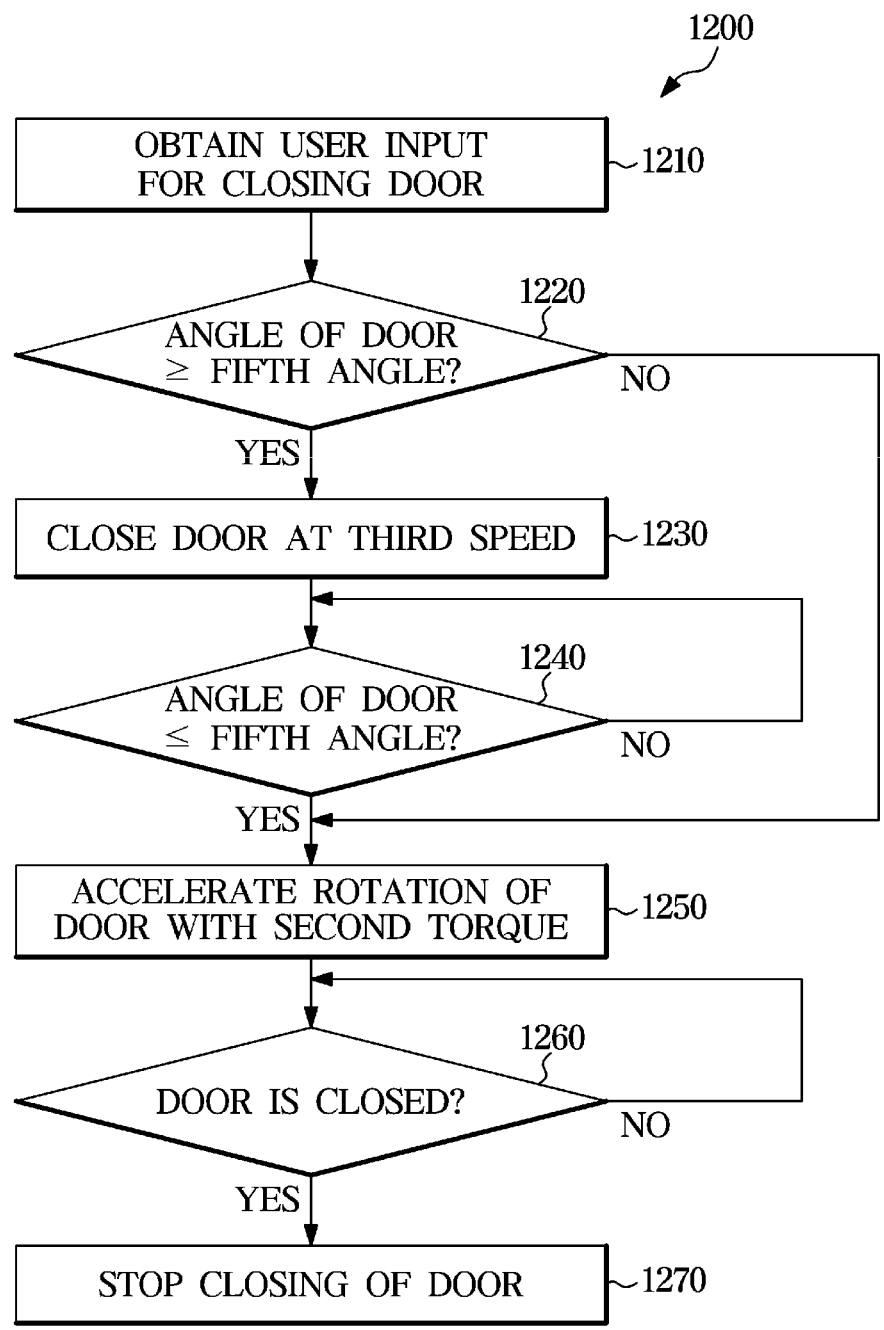
FIG. 24 is a flowchart illustrating a method in which the refrigerator closes the door according an embodiment of the disclosure.

FIG. 24 is a flowchart illustrating a method in which the refrigerator closes the door according an embodiment of the disclosure. FIGS. 25 and 26 are views illustrating an example in which the refrigerator controls a speed of closing the door according to an angle of the door according to the method illustrated in FIG. 24.

A method 1200 in which the refrigerator 1 closes the door 30 will be described with reference to FIGS. 24 to 26.

The refrigerator 1 may obtain a user input for closing the door 30 (1210).

The processor 590 may identify a user input for closing the door 30 based on an output signal received from the control panel 510, the microphone 520, or the object sensor 530.

The operation 1210 may be substantially the same as the operation 1110 illustrated in FIG. 19.

The refrigerator 1 may identify whether the angle of the door 30 (e.g., the angle between the direction pointed by the closed door and the direction pointed by the open door) is greater than or equal to a fifth angle Θ5 (1220).

The processor 590 may identify whether the door 30 is being opened or closed based on a comparison between the phase of the output signal of the first rotation sensor 321 and the phase of the output signal of the second rotation sensor 322.

In addition, while the door 30 is being opened, the processor 590 may accumulate the number of changes in at least one of the output signals of the first and second rotation sensors 321 and 322, and while the door 30 is being closed, the processor 590 may subtract the number of changes in at least one of the output signals of the first and second rotation sensors 321 and 322. Accordingly, the processor 590 may identify the angle of the door 30.

The processor 590 may compare the angle of the door 30, which is identified from the output signals of the first and second rotation sensors 321 and 322, with the fifth angle Θ5, and may identify whether the angle of the door 30 is greater than or equal to the fifth angle Θ5. The fifth angle Θ5 may be an angle between 30 degrees and 50 degrees.

In addition, the processor 590 may identify whether the accumulated or subtracted number of changes in the at least one of the output signals of the first and second rotation sensors 321 and 322 is greater than or equal to a fifth number of times corresponding to the fifth angle Θ5.

In response to the angle of the door 30 being greater than or equal to the fifth angle Θ5 (yes in 1220), the refrigerator 1 may close the door 30 at a third speed V3 (1230).

Based on the angle of the door 30 being greater than or equal to the fifth angle 35, the processor 590 may control the motor drive 111 to allow the door 30 to be rotated at the third speed V3 in the second direction (closing direction). For example, the processor 590 may provide the motor drive 111 with a target speed command corresponding to the third speed V3 so as to control the rotation speed of the door 30.

In this case, the third speed V3 may be less than the first speed V1. The third speed V3 may correspond to a speed that allows the door 30 to be safely closed. The third speed V3 may be set experimentally or empirically.

Accordingly, as illustrated in FIG. 25, in response to the angle of the door 30 being greater than or equal to the fifth angle Θ5, the door 30 may be closed at the third speed V3. In other words, the door 30 may be closed at a relatively slow speed.

The refrigerator 1 may identify whether the angle of the door 30 is less than or equal to the fifth angle Θ5 while the door 30 is being closed (1240).

The operation 1240 may be substantially the same as the operation 1220.

In response to the angle of the door 30 being greater than the fifth angle Θ5 (no in 1240), the refrigerator 1 may continue to close the door 30 at the third speed V3.

In response to the angle of the door 30 being less than the fifth angle Θ5 in the operation 1220 (no in 1220) or in response to the angle of the door 30 being less than or equal to the fifth angle Θ5 in the operation 1240 (yes in 1240), the refrigerator 1 may accelerate the opening of the door 30 with the second torque (1250).

The processor 590 may control the motor drive 111 to allow the drive motor 110 to apply a second torque to the door 30 to close the door 30. For example, the processor 590 may control the motor drive 111 to provide a driving voltage having a duty ratio of substantially 100% (e.g., a duty ratio of 99%) to the drive motor 110 so as to close the door 30.

By the second torque, the door 30 may be closed. Further, as illustrated in FIG. 26, the rotation speed of the door 30 may be increased. In other words, the closing of the door 30 may be accelerated.

The refrigerator 1 identifies whether the door 30 is closed (1260).

The processor 590 may identify whether the door 30 is closed, based on whether the accumulated or subtracted number of changes in at least one of the output signals of the first and second rotation sensors 321 and 322 reaches "0" (zero).

Alternatively, the processor 590 may identify whether the door 30 is closed based on an output signal of the door close sensor 550.

In response to the door 30 not being closed (no in 1260), the refrigerator 1 may continue to close the door 30.

In response to the door 30 being closed (yes in 1260), the refrigerator 1 may terminate closing of the door 30.

The processor 590 may control the motor drive 111 to stop rotation (closing of the door) of the door 30 based on the closing of the door 30.

As described above, the refrigerator 1 may control the closing speed of the door 30 depending on the angle of the door 30. Accordingly, the refrigerator 1 may close the door 30 naturally and stably, just as the user closes the door 30.

Figure 27:
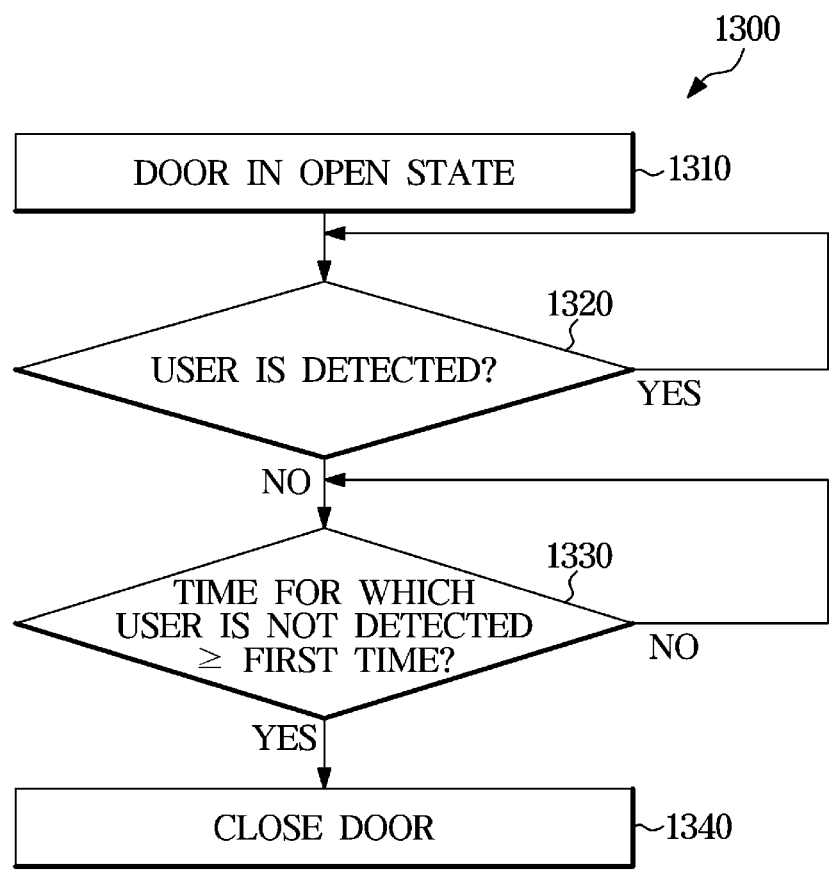
FIG. 27 is a flowchart illustrating a method in which the refrigerator closes the door according an embodiment of the disclosure.

FIG. 27 is a flowchart illustrating a method in which the refrigerator closes the door according an embodiment of the disclosure.

A method 1300 in which the refrigerator 1 closes the door 30 is described with reference to FIG. 27.

The door 30 of the refrigerator 1 may be in the open state (1310).

The door 30 may be opened automatically in response to a user input, or may be opened by a user.

The refrigerator 1 may identify whether a user is detected in the front of the refrigerator 1 (1320).

The object sensor 530 may provide the processor 590 with first and second distance data corresponding to a distance to an object located in front of the refrigerator 1 (e.g., in front of the door).

The processor 590 may identify whether an object is located in front of the refrigerator 1 based on the first and second distance data obtained from the object sensor 530 and identify a distance to the object. For example, in response to detecting a new object that is not previously detected in front of the refrigerator 1, the processor 590 may identify the new object as a user.

In response to a user being detected from the front of the refrigerator 1 (yes in 1320), the refrigerator 1 may maintain the door 30 in the open state.

In response to a user not being detected from the front of the refrigerator 1 (no in 1320), the refrigerator 1 may identify whether a time, for which the user is not detected, is greater than or equal to a first period of time (1330).

The processor 590 may include a timer, and may start counting up or counting down of the timer in response to the user not being detected from the front of the refrigerator 1.

The processor 590 may compare the time counted by the timer with the first period of time. The first period of time may be set as a time that confirms a fact that the user is out of a range in which the user can use the refrigerator 1. The first period of time may be experimentally or empirically. For example, the first period of time may be set to a time between 1 minutes and 3 minutes.

In response to the time, for which the user is not detected, being less than the first period of time (no in 1330), the refrigerator 1 may maintain the door 30 in the open state.

In response to the time, for which the user is not detected, being greater than or equal to the first period of time (yes in 1330), the refrigerator 1 may close the door (1340).

The processor 590 may start closing the door 30 based on the time, for which the user is not detected, being greater than or equal to the first period of time.

The operation 1340 may be substantially the same as the operation 1220, the operation 1230, the operation 1240, the operation 1250, the operation 1260, and the operation 1270 illustrated in FIG. 24.

As described above, the refrigerator 1 may automatically close the door 30 in response to the door 30 opened for the first period of time without the user being detected. Accordingly, it is possible to prevent the food stored in the refrigerating compartment 20a or the freezing compartment 20b from being damaged due to the door 30 being left in the open state. In addition, it is possible to prevent an increase in power consumption due to excessive operation of the refrigerator 1.

Figure 28:
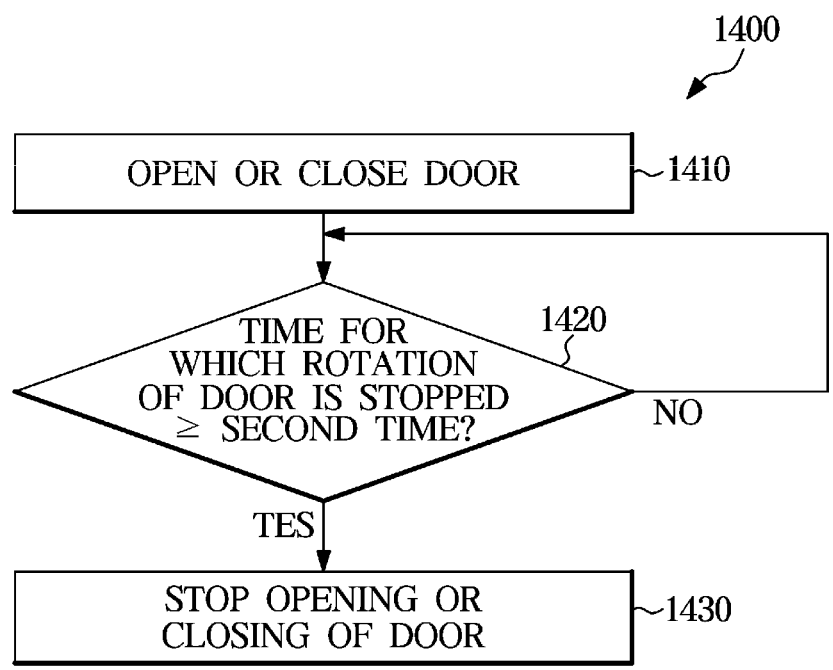
FIG. 28 is a flowchart illustrating operation in response to rotation stop of the door of the refrigerator according to an embodiment of the disclosure.

FIG. 28 is a flowchart illustrating operation in response to rotation stop of the door of the refrigerator according to an embodiment of the disclosure.

An operation 1400 in response to the rotation stop of the door 30 of the refrigerator 1 is described with reference to FIG. 28.

The refrigerator 1 may open or close the door 30 (1410).

The processor 590 may control the motor drive 111 to open or close the door 30 in response to a user input or in response to the door being opened for a long time. For example, the processor 590 may provide a target speed command to the motor drive 111 to allow the door 30 to be rotated at a predetermined speed, or a target torque command (or target duty ratio command) to the motor drive 111 to accelerate the door 30 to a predetermined torque.

The motor drive 111 may apply a driving voltage to the drive motor 110 in response to a control command of the processor 590.

The refrigerator 1 may identify whether a time, for which the rotation of the door 30 is stopped, is greater than or equal to a second period of time (1420).

The processor 590 may control the motor drive 111 to rotate the door 30 (i.e., to open or close the door), and the motor drive 111 may apply a driving voltage to the drive motor 110 so as to provide a torque to the door 30. Due to the torque of the drive motor 110, the door 30 may be rotated (opened or closed).

The processor 590 may detect the rotation of the door 30 based on an output signal of the door position sensor 320.

In this case, the user may stop the door 30. Alternatively, an object arranged in the vicinity of the door 30 may interfere with the rotation of the door 30. Accordingly, the door 30 may be stopped, and the door position sensor 320 may output a constant signal that does not change.

As described above, the door position sensor 320 may include the first rotation sensor 321 and the second rotation sensor 322, and by the rotation (opening or closing) of the door 30, the first rotation sensor 321 and the second rotation sensor 322 may output an output signal that is changed alternately.

In this case, the processor 590 may identify that the door 30 is stopped based on the fact that the output signals of the first rotation sensor 321 and the second rotation sensor 322 do not change.

The processor 590 may include a timer and may start counting up or counting down of the timer in response to identifying the stop of the door 30.

The processor 590 may compare the time counted by the timer with the second period of time. The second period of time may be set as a time that confirms a fact that the door 30 is stopped. The second period of time may be experimentally or empirically. For example, the second period of time may be set to a time between 0.1 seconds and 2 seconds.

In response to the time, for which the rotation of the door 30 is stopped, being less than the second period of time (no in 1420), the refrigerator 1 may continue to open or close the door 30.

In response to the time, for which the rotation of the door 30 is stopped, being greater than or equal to the second period of time (yes in 1420), the refrigerator 1 may stop the rotation of the door 30 (opening or closing the door) (1430).

The processor 590 may control the motor drive 111 to stop the drive motor 110 from providing the torque to the door 30. For example, the processor 590 may control the motor drive 111 to stop applying a driving voltage to the drive motor 110.

Thereafter, the refrigerator 1 may close the door in response to the user not being detected for a predetermined period of time.

As described above, the refrigerator 1 may stop driving the door 30 based on the fact that rotation of the door 30 is not detected while the door 30 is being driven. Accordingly, it is possible to prevent the drive motor 110 or the motor drive 111 from being overheated to drive the door 30. In addition, it is possible to allow the user to easily stop the door 30 that is being automatically opened or closed.

Figure 29:
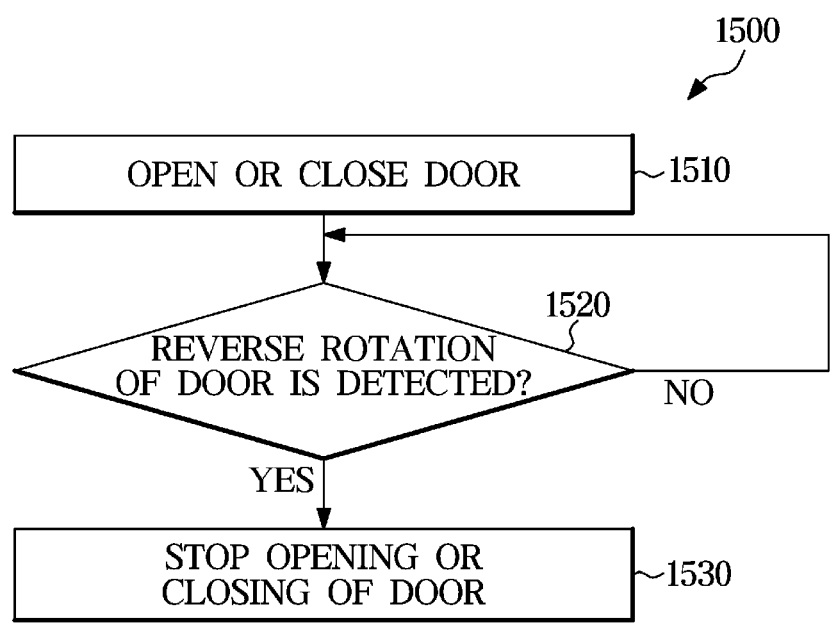
FIG. 29 is a flowchart illustrating operation in response to reverse rotation of the door of the refrigerator according to an embodiment of the disclosure.

FIG. 29 is a flowchart illustrating operation in response to reverse rotation of the door of the refrigerator according to an embodiment of the disclosure.

An operation 1500 in which the refrigerator 1 responds to the reverse rotation of the door 30 is described with reference to FIG. 29.

The refrigerator 1 may open or close the door 30 (1510).

The operation 1510 may be substantially the same as the operation 1410 illustrated in FIG. 28.

The refrigerator 1 may identify whether the reverse rotation of the door 30 is detected (1520).

The processor 590 may control the motor drive 111 to allow the drive motor 110 to open or close the door 30. Due to the torque of the drive motor 110, the door 30 may be opened or closed.

The processor 590 may identify whether the door 30 is being opened or closed based on an output signal of the door position sensor 320.

In this case, the user may close the door 30 that is being opened. Accordingly, while controlling the motor drive 111 to open the door 30, the processor 590 may identify that the door 30 is being closed based on the output signal of the door position sensor 320. For example, it is defined that the door position sensor 320 outputs a sequence of output signals of (0, 0), (1, 0), (1, 1), (0, 1) while the door 30 is being opened, but the processor 590 may receive a sequence of consecutive output signals of (0, 0), (0, 1), (1, 1), (1, 0) from the door position sensor 320.

As mentioned above, in response to identifying that the door 30 is being closed while the processor 590 controls the motor drive 111 to open the door 30, the processor 590 may identify reverse rotation of the door 30.

In addition, the user may open the door 30 that is being closed. Accordingly, the processor 590 may identify that the door 30 is being opened based on the output signal of the door position sensor 320 while controlling the motor drive 111 to close the door 30. For example, it is defined that the door position sensor 320 outputs a sequence of output signals of (0, 0), (0, 1), (1, 1), (1, 0) while the door 30 is being closed, but the processor 590 may receive a sequence of consecutive output signals of (0, 0), (1, 0), (1, 1), (0, 1) from the door position sensor 320.

As mentioned above, in response to identifying that the door 30 is being opened while the processor 590 controls the motor drive 111 to close the door 30, the processor 590 may identify reverse rotation of the door 30.

In response to the reverse rotation of the door 30 not being identified (no in 1520), the refrigerator 1 may continue to open or close the door 30.

In response to the reverse rotation of the door 30 being identified (yes in 1520), the refrigerator 1 may stop opening or closing the door 30 (1530).

The operation 1530 may be substantially the same as the operation 1430 illustrated in FIG. 28.

The refrigerator 1 may resume opening or closing the door 30. For example, the refrigerator 1 may resume opening or closing the door in response to the reverse rotation not being detected for a predetermined of time and in response to the user not being located within the movement range of the door 30. Further, the refrigerator 1 may close the door in response to the user not being detected for a predetermined period of time.

As mentioned above, the refrigerator 1 may stop driving of the door 30 based on the detection of the reverse rotation of the door 30 while driving the door 30. Accordingly, it is possible to the drive motor 110 or the motor drive 111 from being overheated to drive the door 30. Further, it is possible to allow the user to easily close or open the door 30 that is being automatically opened or closed.

Figure 30:
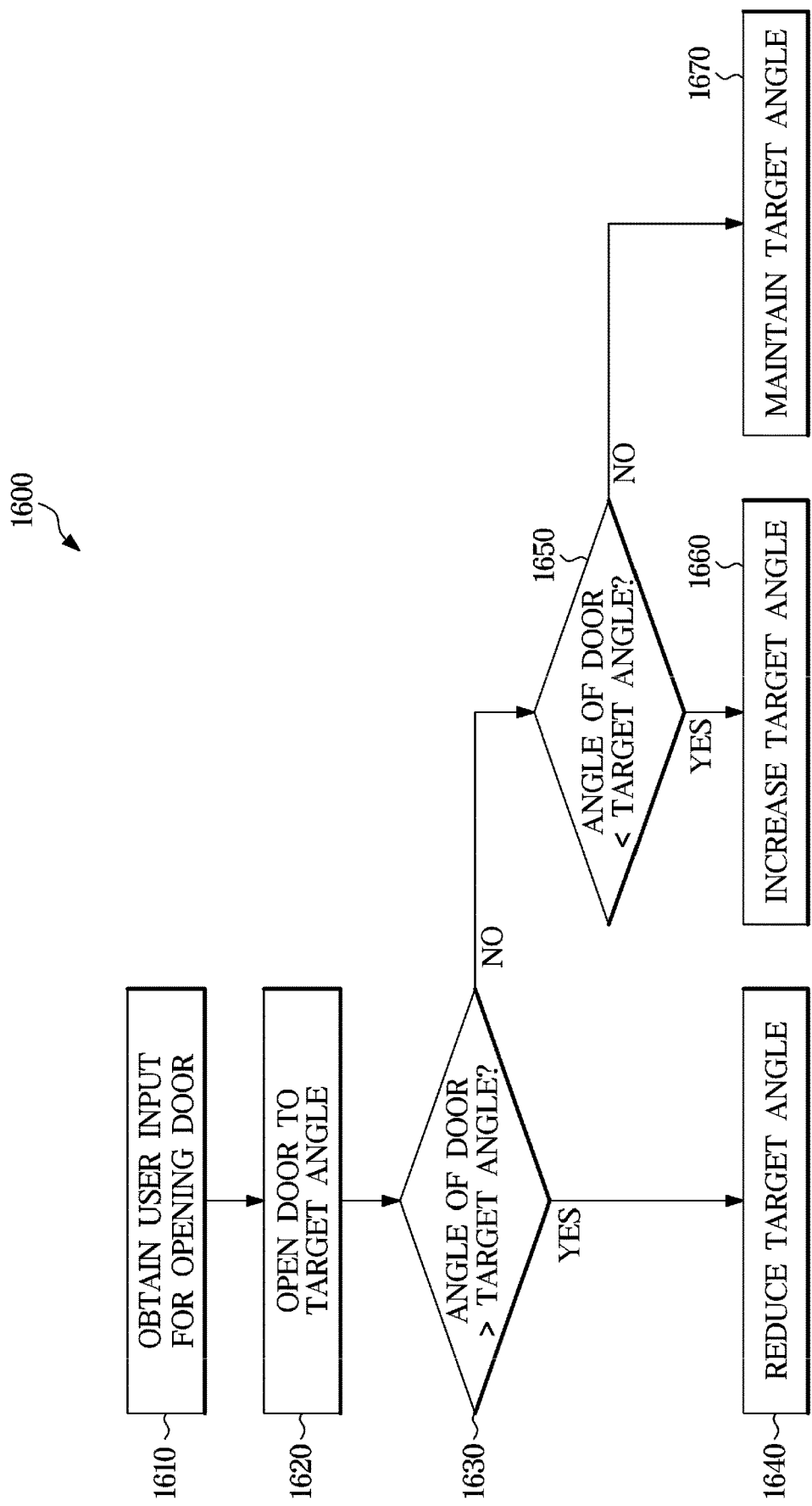
FIG. 30 is a flowchart illustrating a method in which the refrigerator resets a position in which the door is a fully opened according to an embodiment of the disclosure.
Figure 31:
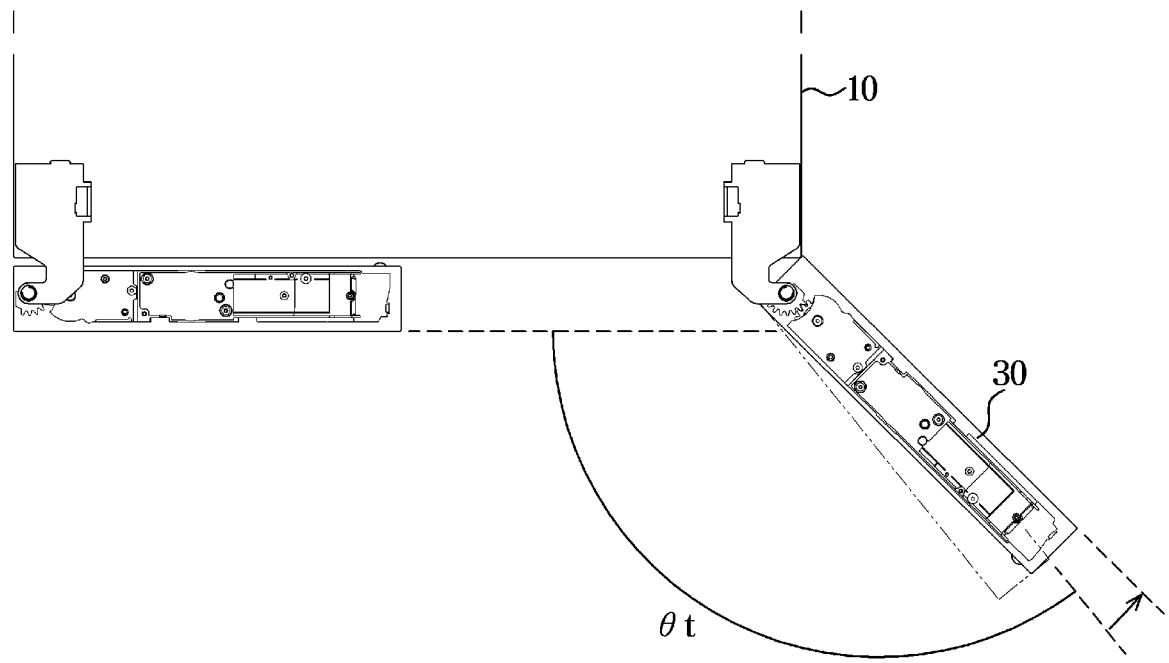
FIG. 31 is a view illustrating an example of resetting the fully opened position of the door according to the method illustrated in FIG. 30.
Figure 32:
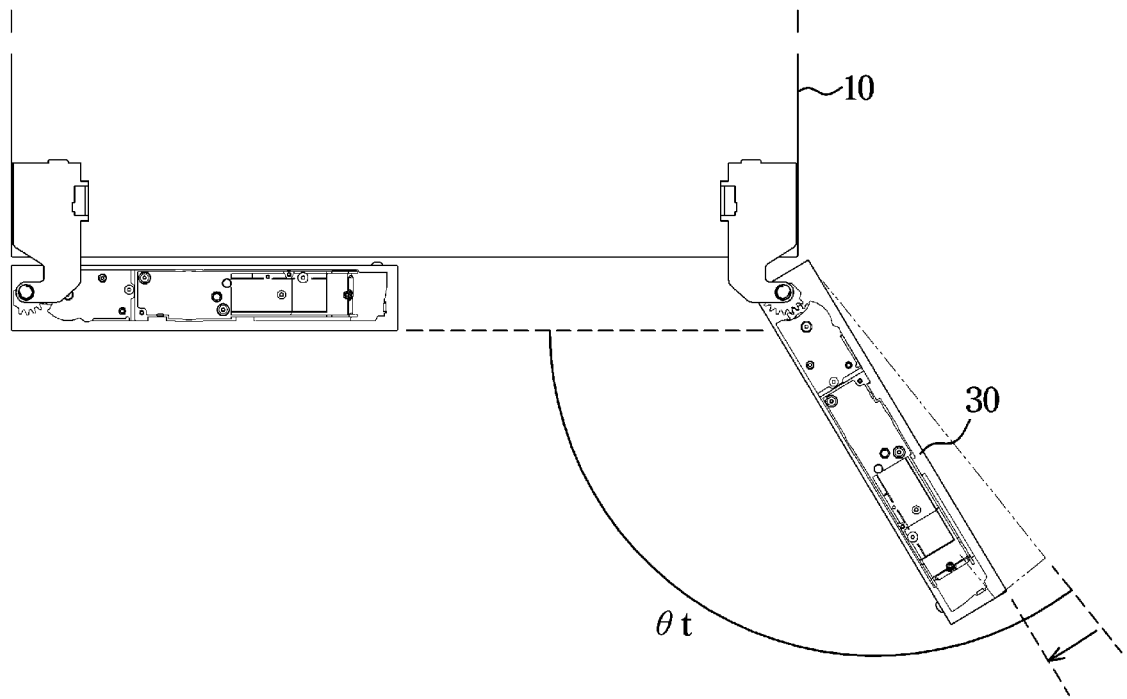
FIG. 32 is a view illustrating an example of resetting the fully opened position of the door according to the method illustrated in FIG. 30.

FIG. 30 is a flowchart illustrating a method in which the refrigerator resets a position in which the door is a fully opened according to an embodiment of the disclosure. FIGS. 31 and 32 are views illustrating an example of resetting the fully opened position of the door according to the method illustrated in FIG. 30.

A method 1600 in which the refrigerator 1 resets the fully opened position of the door 30 is described with reference to FIGS. 30 to 32.

The refrigerator 1 may obtain a user input for opening the door 30 (1610).

The operation 1610 may be the same as the operation 1110 illustrated in FIG. 19.

The refrigerator 1 may open the door 30 to a target angle $\Theta t$ (1620).

The processor 590 may control the motor drive 111 to open the door 30, and apply a driving voltage to the drive motor 110 to allow the motor drive 111 to generate a torque to open the door 30.

While controlling the motor drive 111 to open the door 30, the processor 590 may identify an angle of the door 30 (e.g., an angle between a direction pointed by the closed door and a direction pointed by the open door) based on the output signal of the door position sensor 320.

The processor 590 may compare the angle of the door 30 with the target angle $\Theta t$, and identify whether the angle of the door 30 is greater than or equal to the target angle Θt. The processor 590 may identify that the door 30 is fully opened based on the angle of the door 30 being greater than or equal to the target angle Θt.

The refrigerator 1 may identify whether the angle of the fully-opened door 30 is greater than the target angle Θt (1630).

The processor 590 may identify the angle of the fully-opened door 30. For example, the processor 590 may identify the angle of the door 30 at a position in which the door 30 is fully opened, based on the accumulated or subtracted number of changes in the at least one of the output signals of the first and second rotation sensors 321 and 322.

The processor 590 may compare the angle of the fully-opened door 30 with the target angle Θt, and identify whether the angle of the fully opened door 30 is greater than the target angle Θt. For example, the processor 590 may compare a target number of times corresponding to the target angle Θt with the accumulated or subtracted number of changes in the at least one of the output signals of the first and second rotation sensors 321 and 322, and identify whether the accumulated or subtracted number of times is greater than the target number of times.

Even after the supply of torque is stopped, the door 30 may be additionally rotated due to the inertia of the door 30. Accordingly, an angle Θt which the door 30 is stopped may be greater than the target angle Θt.

In response to the angle of the fully-opened door 30 being greater than the target angle Θt (yes in 1630), the refrigerator 1 may reduce the target angle (1640).

The processor 590 may reduce the target angle Θt based on the angle of the fully-opened door 30 being greater than the target angle Θt as illustrated in FIG. 31. For example, the processor 590 may reduce the target number of times based on the accumulated or subtracted number of times being greater than the target number of times. The processor 590 may reduce the target number of time by "1". Accordingly, the target angle Θt may be reduced by 3.75 degrees.

In response to the angle of the fully-opened door 30 not being greater than the target angle Θt (no in 1630), the refrigerator 1 may identify whether the angle of the fully-opened door 30 is less than the target angle Θt (1650).

The processor 590 may identify whether the angle of the fully-opened door 30 is less than the target angle Θt. For example, the processor 590 may identify whether the accumulated or subtracted number of changes in the at least one of the output signals of the first and second rotation sensors 321 and 322 is less than the target number of times.

Through the operation 1640, the target angle Θt may be reduced. In this case, due to a change in the food accommodated in the door 30, that is, a change in inertia of the door 30, an angle Θt which the door 30 additionally is rotated after the supply of torque is stopped may be reduced. Accordingly, the angle Θt which the door 30 is stopped may be less than the target angle Θt.

In response to the angle of the fully-opened door 30 being less than the target angle Θt (yes in 1650), the refrigerator 1 may increase the target angle (1660).

The processor 590 may increase the target angle Θt based on the angle of the fully-opened door 30 being less than the target angle Θt as illustrated in FIG. 32. For example, the processor 590 may reduce the target number of times based on the accumulated or subtracted number of times being less than the target number of times. The processor 590 may increase the target number of times by "1". Accordingly, the target angle Θt may be increased by 3.75 degrees.

In response to the angle of the fully-opened door 30 not being less than the target angle Θt (no in 1650), the refrigerator 1 may maintain the target angle (1670).

The processor 590 may not change the target angle in response to the angle of the fully-opened door 30 being the same as the target angle Θt.

As described above, the refrigerator 1 may identify whether the fully-opened door 30 is located at a target position and adjust the target angle to allow the door 30 to be located at the target position. Accordingly, the refrigerator 1 may stop the door 30 at a predetermined position without bounding.

Figure 33:
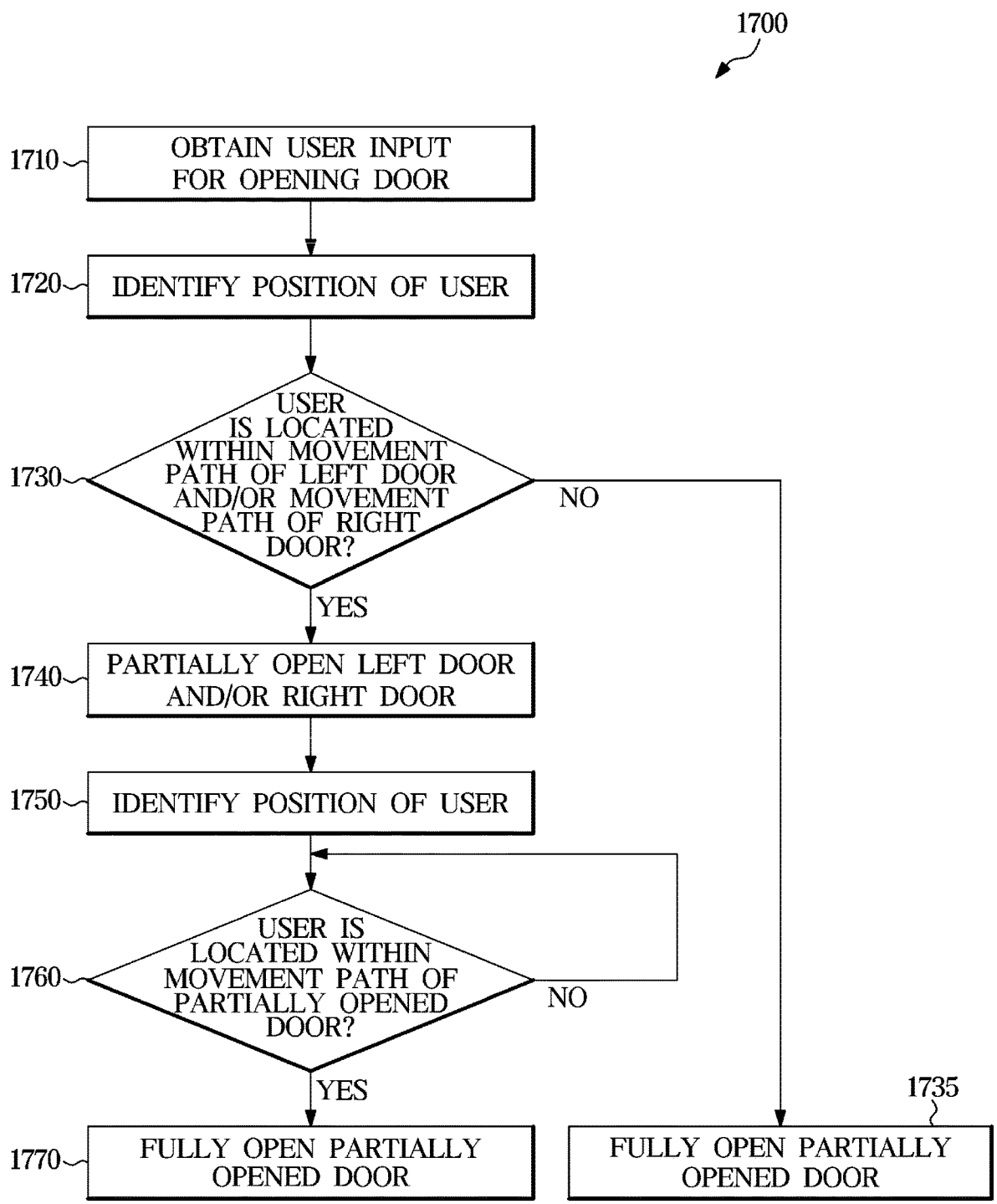
FIG. 33 is a flowchart illustrating a method in which the refrigerator partially opens the door according to a user position according to an embodiment of the disclosure.
Figure 34:
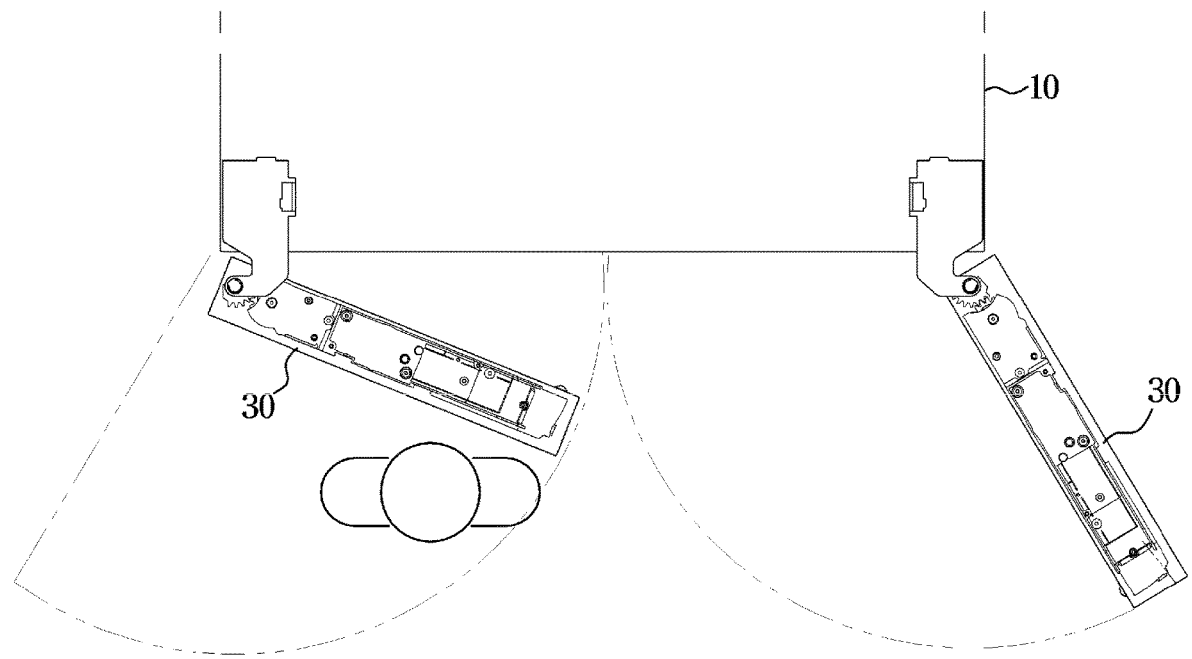
FIG. 34 is a view illustrating an example in which the refrigerator partially opens the door according to a user position according to the method illustrated in FIG. 33.
Figure 35:
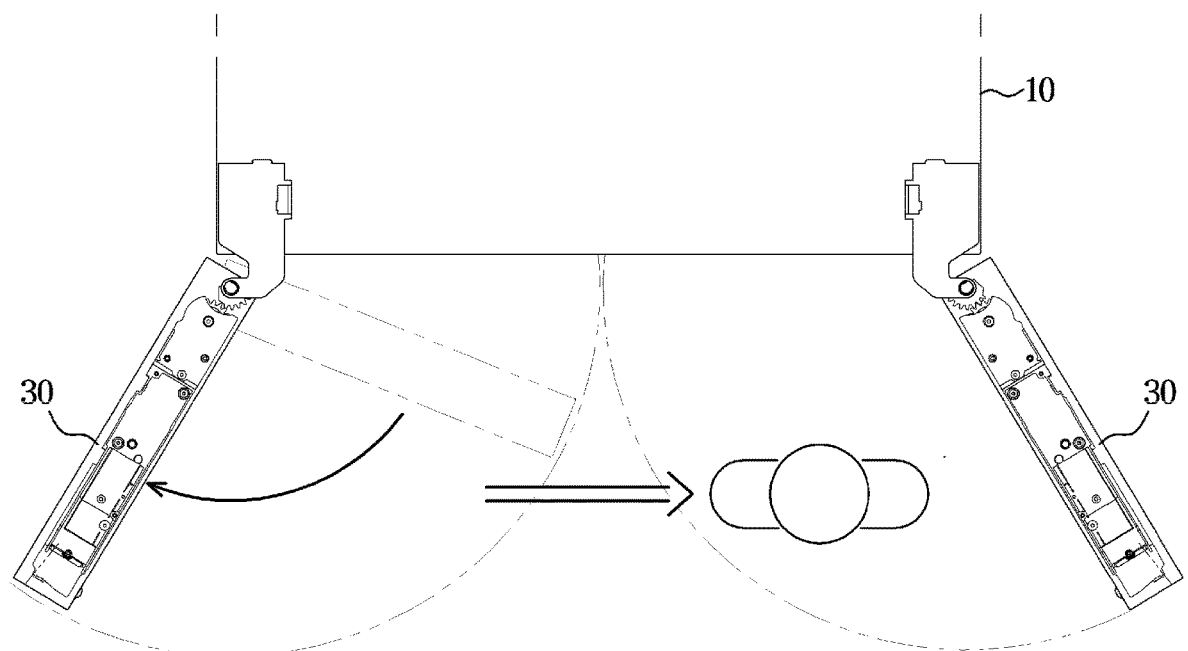
FIG. 35 is a view illustrating an example in which the refrigerator partially opens the door according to a user position according to the method illustrated in FIG. 33.

FIG. 33 is a flowchart illustrating a method in which the refrigerator partially opens the door according to a user position according to an embodiment of the disclosure. FIGS. 34 and 35 are views illustrating an example in which the refrigerator partially opens the door according to a user position according to the method illustrated in FIG. 33.

A method 1700 in which the refrigerator 1 partially opens the door according to a user position will be described with reference to FIGS. 33 to 35.

The refrigerator 1 may obtain a user input for opening the door 30 (1710).

The operation 1710 may be the same as the operation 1110 illustrated in FIG. 19.

The refrigerator 1 may identify the position of the user (1720).

The object sensor 530 may provide the processor 590 with first and second distance data corresponding to a distance to an object located in front of the refrigerator 1 (e.g., in front of the door).

The processor 590 may identify whether an object is located in front of the refrigerator 1 based on the first and second distance data obtained from the object sensor 530, and identify a position of the object.

For example, the processor 590 may identify a user relative position using trilateration. The processor 590 may identify the user relative position based on a predetermined distance between the first distance sensor 531 and the second distance sensor 532, a first distance based on the first distance data, and a second distance based on the second distance data.

The refrigerator 1 may identify whether the user is located within a movement path of the left door or a movement path of the right door (1730).

The processor 590 may identify whether the user is located on the movement path of the left door for opening the left door, based on the relative position of the user. For example, the processor 590 may identify whether the user relative coordinates are located within an area indicating the movement path of the left door.

Further, the processor 590 may identify whether the user is located on the movement path of the right door for opening the right door. For example, the processor 590 may identify whether the user relative coordinates are located within an area indicating the movement path of the right door.

In response to the user not being located within the movement path of the left door and the movement path of the right door (no in 1730), the refrigerator 1 may fully open both the left door and the right door (1735).

The processor 590 may control the door opening and closing device 100 to open the door 30 to a predetermined maximum opening angle (e.g., an angle between 110 and 130 degrees). Further, the processor 590 may control the door opening and closing device 100 to adjust the opening speed of the door 30 based on the rotation angle of the door 30 (while the door 30 is being opened).

In response to the user being located within the movement path of the left door and/or the movement path of the right door (yes in 1730), the refrigerator 1 may partially open the left door and/or the right door (1740).

The processor 590 may control the door opening and closing device 100 to open the left door and/or the right door to an angle Θt which left door and/or the right door does not come into contact with the user.

For example, as illustrated in FIG. 34, the user may be positioned in front of the left door. In other words, the user may be located on a path where the left door is opened. The processor 590 may identify that the user is located within the movement path of the left door, and may control the door opening and closing device 100 to partially open the left door. Further, the processor 590 may fully open the right door that does not interfere with the user.

As mentioned above, based on the position of the user, the processor 590 may partially open the left door, partially open the right door, or partially open the left door and the right door.

Thereafter, the refrigerator 1 may re-identify the position of the user (1750).

The operation 1750 may be the same as the operation 1720.

The refrigerator 1 may identify whether the user is located within a movement path of the partially-opened door (1760).

The processor 590 may identify whether the user is located within a movement path for opening the partially-opened door, based on the user relative position. For example, in response to the left door being partially opened, the processor 590 may identify whether the user is located within a movement path for opening the left door. In addition, in response to the right door being partially opened, the processor 590 may identify whether the user is located within a movement path for opening the right door.

In response to the user being located within the movement path of the partially-opened door (yes in 1760), the refrigerator 1 may maintain the door at a partially opened state.

In response to the user not being located within the movement path of the partially-opened door (no in 1760), the refrigerator 1 may fully open the partially-opened door (1770).

After confirming that the door is partially opened, the user can move to the position to allow the door to be fully opened. For example, as illustrated in FIG. 35, the user positioned in front of the left door may confirm that the left door is partially opened, and the user can move to the right door. Accordingly, the user can deviate from the path for opening the left door.

In response to the user deviating from the movement path of the partially-opened door, the processor 590 may control the door opening and closing device 100 to open the door 30 to the predetermined maximum opening angle (e.g., an angle between 110 and 130 degrees).

As described above, depending on the position of the user, the refrigerator 1 may open or close the left door and the right door independently of each other.

Figure 36:
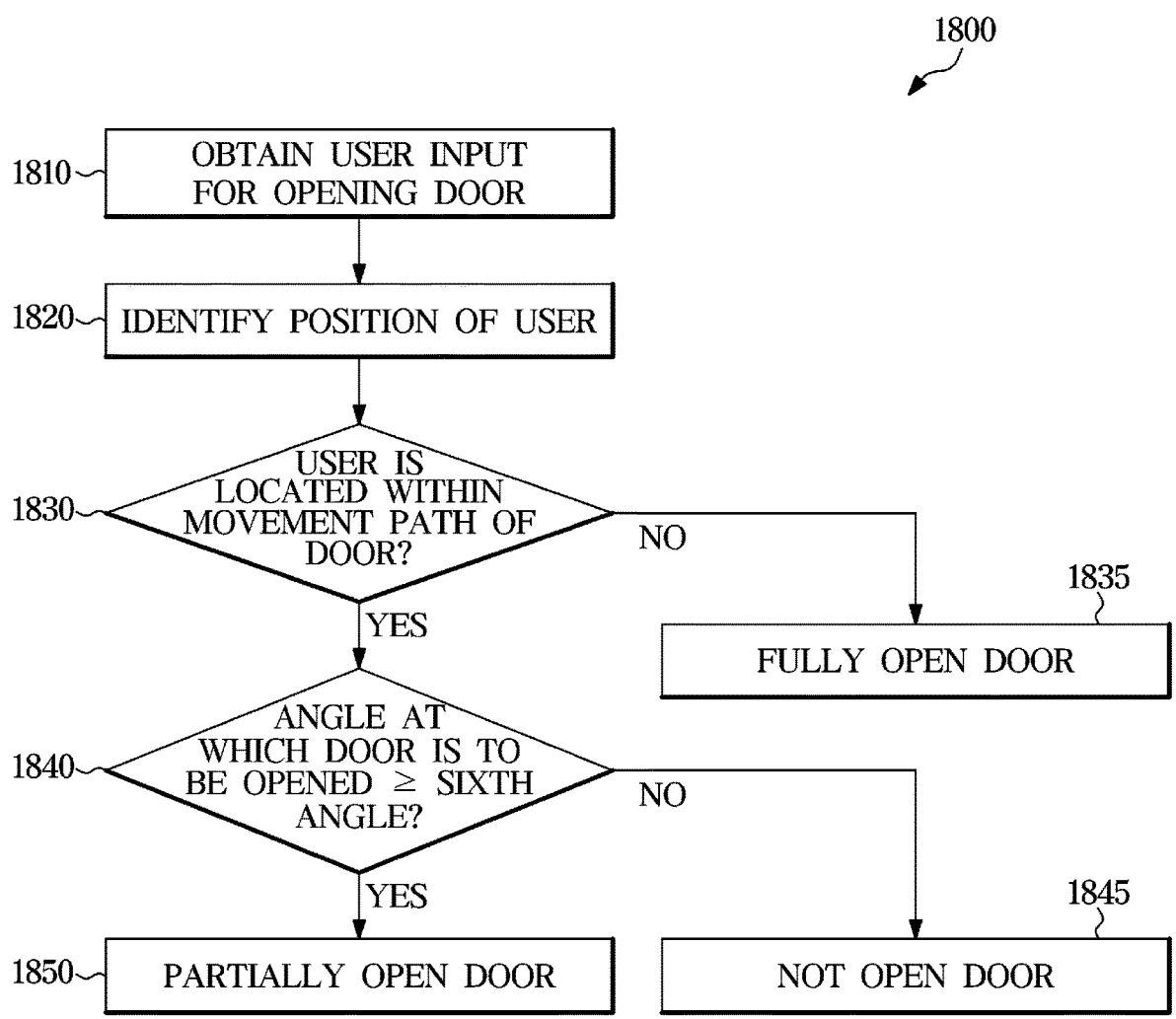
FIG. 36 is a flowchart illustrating a method in which the refrigerator controls opening of the door at a user position according to an embodiment of the disclosure.
Figure 37:
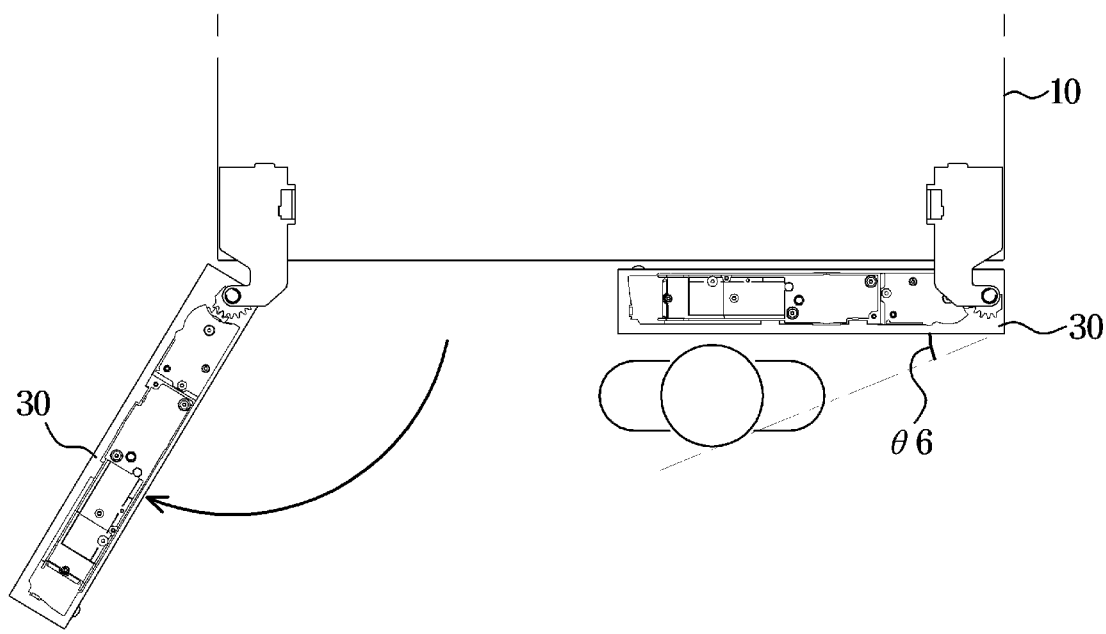
FIG. 37 is a view illustrating an example in which the refrigerator controls opening of the door at a user position according to the method illustrated in FIG. 36.
Figure 38:
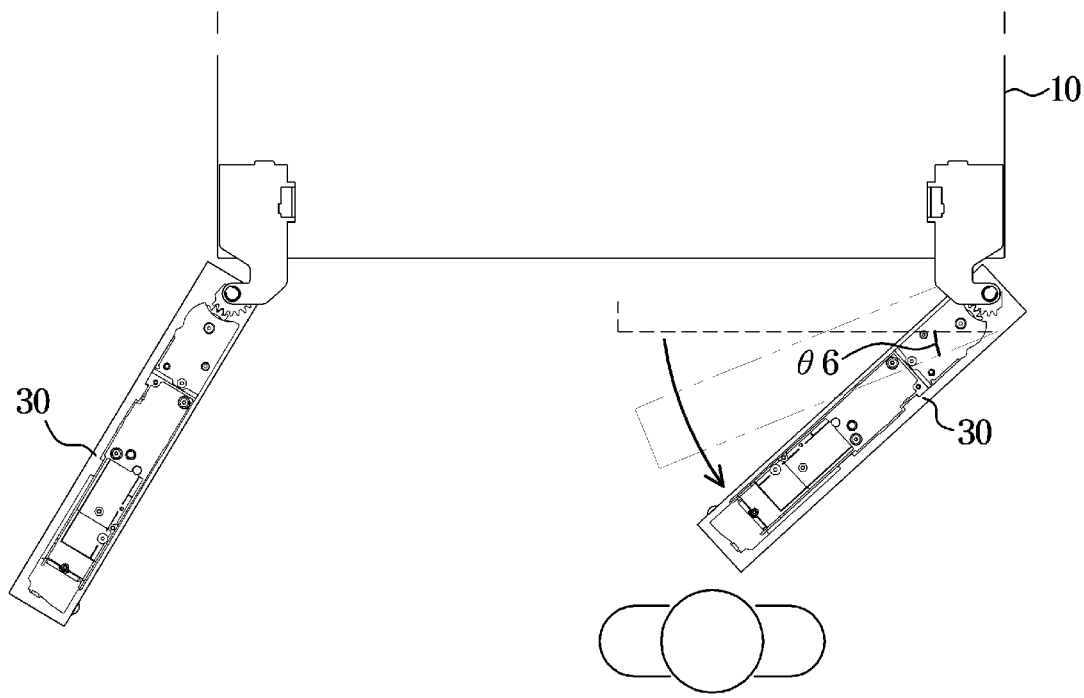
FIG. 38 is a view illustrating an example in which the refrigerator controls opening of the door at a user position according to the method illustrated in FIG. 36.

FIG. 36 is a flowchart illustrating a method in which the refrigerator controls opening of the door at a user position according to an embodiment of the disclosure. FIGS. 37 and 38 are views illustrating an example in which the refrigerator controls opening of the door at a user position according to the method illustrated in FIG. 36.

A method 1800 in which the refrigerator 1 partially opens the door according to a user position will be described with reference to FIGS. 36 to 38.

The refrigerator 1 may obtain a user input for opening the door 30 (1810).

The operation 1810 may be the same as the operation 1110 illustrated in FIG. 19.

The refrigerator 1 may identify a user position (1820) and identify whether the user is located within the movement path of the door (1830). In response to the user not being located within the movement path of the door (no in 1830), the refrigerator 1 may fully open both the left door and the right door (1835).

The operations 1820, 1830, and 1835 may be the same as the operations 1720, 1730, and 1735 illustrated in FIG. 33.

In response to the user being located within the movement path of the door (yes in 1830), the refrigerator 1 may identify whether the angle Θt which the door 30 is to be opened is greater than or equal to a sixth angle Θ6 (1840).

The processor 590 may identify a user relative position based on the first distance data and the second distance data of the object sensor 530. For example, the processor 590 may identify coordinates of the user in a coordinate system in which the center of the front surface of the refrigerator 1 is the origin.

The processor 590 may identify an angle between a straight line defined by the front surface of the refrigerator 1 and a straight line extending from the rotation axis of the door (left door or right door) to the user, based on the user relative position. In other words, the processor 590 may identify a rotation angle (or an opening angle) of the door in response to the door being in contact with the user. Alternatively, the processor 590 may identify an angle Θt which the door is maximally opened without contacting the user.

The processor 590 may compare the maximum opening angle with the sixth angle Θ6. The sixth angle Θ6 may be set based on a maximum angle Θt which the door 30 is opened and stopped by the door opening and closing device 100. For example, the sixth angle Θ6 may be an angle between the first angle Θ1 and twice the first angle Θ1 illustrated in FIG. 20.

In response to the angle, at which the door 30 is to be opened, being less than the sixth angle Θ6 (no in 1840), the refrigerator 1 may not open the door 30 (1845).

For example, as illustrated in FIG. 37, in response to the angle, at which the door 30 is to be opened, being less than the sixth angle Θ6, the door 30 opened by the door opening and closing device 100 may collide with the user.

Accordingly, the processor 590 may not open the door 30 and may output an audio message or an image message indicating that it is impossible to open the door 30.

In response to the angle, at which the door 30 is to be opened, being greater than or equal to the sixth angle Θ6 (yes in 1840), the refrigerator 1 may partially open the door 30 (1850).

For example, as illustrated in FIG. 38, in response to the angle, at which the door 30 is to be opened, being greater than or equal to the sixth angle Θ6, the door 30 opened by the door opening and closing device 100 may be partially opened without colliding with the user.

The processor 590 may control the door opening and closing device 100 to allow the door 30 to be partially opened without colliding with the user. For example, the processor 590 may control the motor drive 111 to allow the drive motor 110 to apply the first torque to the door 30 so as to open the door 30. Thereafter, the processor 590 may control the motor drive 111 to control the rotation speed of the drive motor 110 so as to allow the door 30 to be stopped without colliding with the user.

As described above, the refrigerator 1 may partially open the door 30 and the door 30 without colliding with the user, according to the user position.

As is apparent from the above description, a refrigerator and a control method thereof may detect a current position of a door using a door position sensor.

A refrigerator and a control method thereof may control an opening or closing speed of a door using a processor.

A refrigerator and a control method thereof may stop opening or closing of a door using a processor.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium. For example, "non-transitory storage medium" may include a buffer in which data is temporarily stored.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturers server, the application store's server, or the relay servers memory.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
   a housing;
   a door configured to be rotatably couplable to the housing by a hinge shaft and a hinge gear fixed to the hinge shaft; and
   a door opening and closing assembly provided at an end of the door to control opening of the door and closing of the door, the door opening and closing assembly comprises,
   a drive motor;
   a final gear to receive power from the drive motor and to transmit the power to the hinge shaft, the final gear being arranged at an end of the door opening and closing assembly to interlock with the hinge gear to thereby allow the opening of the door and the closing of the door according to the received power;
   a magnet configured to have a same rotation axis as the final gear, the magnet including a plurality of N-poles alternating with a plurality of S-poles around a circumference of the magnet; and
   a door position sensor arranged on a side of the final gear to sense rotation of the magnet to thereby detect a rotation angle of the final gear.

2. The refrigerator of claim 1, wherein
the magnet is formed in an annular shape to be accommodated in the final gear.

3. The refrigerator of claim 2, wherein
the door position sensor is arranged under the magnet to face the magnet so as to detect a change in polarity of the magnet in response to power transmitted to the hinge shaft by the final gear.

4. The refrigerator of claim 2, wherein
the door opening and closing assembly further comprises a case in which the drive motor, the final gear and the door position sensor are accommodated,
wherein the final gear includes:
   a central portion couplable to the case with respect to a rotation axis of the final gear,
   a tooth formed to protrude outwardly from the central portion to interlock with the hinge gear,
   a recess formed in an annular shape between the central portion and the tooth to accommodate the magnet, and
   a prevention protrusion formed to protrude from the central portion to the tooth to prevent the magnet from being separated from the recess.

5. The refrigerator of claim 4, wherein
the magnet is accommodated in the recess by being coupled to the final gear, and the magnet comprises an inner protrusion formed to protrude toward an inside of the magnet to interfere with the prevention protrusion.

6. The refrigerator of claim 5, wherein
the magnet is insertable into the recess from a lower side of the final gear toward an upper side the final gear, and rotatable clockwise or counterclockwise within the recess so that the magnet is coupled to the final gear.

7. The refrigerator of claim 6, wherein
the prevention protrusion is provided under the central portion to prevent the magnet, which is accommodated in the recess, from being separated from the recess, and
the inner protrusion is arranged above the prevention protrusion while the magnet is accommodated in the recess.

8. The refrigerator of claim 1, further comprising:
a motor drive configured to apply a driving voltage to the drive motor; and
a processor connected to the door position sensor and the motor drive,
wherein the processor is configured to:
   identify an angle between the door and the housing based on an output signal of the door position sensor, and
   control the motor drive to allow the drive motor to rotate the door based on the identified angle.

9. The refrigerator of claim 8, wherein
the processor is configured to control the motor drive to stop opening of the door or closing of the door based on identifying that the door is stopped while the processor controls the motor drive to open the door or close the door.

10. The refrigerator of claim 8, wherein the processor is configured to:
control the motor drive to stop opening of the door based on identifying that the door is being closed while the processor controls the motor drive to open the door, and
control the motor drive to stop closing of the door based on identifying that the door is being opened while the processor controls the motor drive to close the door.

11. The refrigerator of claim 8, further comprising:
a microphone,
wherein the processor is configured to control the motor drive to open the door based on a voice signal through the microphone.

12. The refrigerator of claim 8, further comprising:
an object sensor,
wherein the processor is configured to:
detect a user around the refrigerator based on an output signal of the object sensor, and
control the motor drive to close the opened door based on a time, for which the user is undetected, being greater than or equal to a period of time.

13. The refrigerator of claim 8, wherein the processor is configured to control the motor drive to control a speed, at which the door is opened or closed, based on the identified angle.

14. The refrigerator of claim 8, wherein the processor is configured to:
control the motor drive to apply a substantially maximum driving voltage to the drive motor based on the identified angle being less than a first angle while opening the door;
control the motor drive to open the door at a first speed based on the identified angle being greater than or equal to the first angle and less than a second angle while opening the door;
control the motor drive to gradually decrease an opening speed of the door based on the identified angle being greater than or equal to the second angle and less than a third angle while opening the door; and
control the motor drive to open the door at a second speed less than the first speed, based on the identified angle being greater than or equal to the third angle and less than a fourth angle while opening the door.

15. The refrigerator of claim 14, wherein the processor is configured to:
control the motor drive to close the door at a third speed based on the identified angle being greater than or equal to a fifth angle while closing the door; and
control the motor drive to apply a substantially maximum driving voltage to the drive motor based on the identified angle being less than the fifth angle while closing the door.

16. A refrigerator comprising:
a housing;
a door configured to be rotatably couplable to the housing by a hinge shaft and a hinge gear fixed to the hinge shaft; and
a door opening and closing assembly provided at an end of the door to control opening of the door and closing of the door, the door opening and closing assembly including:
a drive motor;
a final gear to receive power from the drive motor and to transmit the power to the hinge shaft, the final gear being arranged at an end of the door opening and closing assembly to interlock with the hinge gear to thereby allow the opening of the door and the closing of the door according to the received power;
a door position sensor arranged on a side of the final gear to detect a rotation angle of the final gear; and
a magnet to interact with the door position sensor, the magnet being formed in an annular shape to be accommodated in the final gear; and
a case in which the drive motor, the final gear and the door position sensor are accommodated,
wherein the final gear includes:
a central portion couplable to the case with respect to a rotation axis of the final gear,
a tooth formed to protrude outwardly from the central portion to interlock with the hinge gear,
a recess formed in an annular shape between the central portion and the tooth to accommodate the magnet, and
a prevention protrusion formed to protrude from the central portion to the tooth to prevent the magnet from being separated from the recess.

17. The refrigerator of claim 16, wherein
the magnet is accommodated in the recess by being coupled to the final gear, and the magnet comprises an inner protrusion formed to protrude toward an inside of the magnet to interfere with the prevention protrusion.

18. The refrigerator of claim 17, wherein
the magnet is insertable into the recess from a lower side of the final gear toward an upper side the final gear, and rotatable clockwise or counterclockwise within the recess so that the magnet is coupled to the final gear.

19. The refrigerator of claim 18, wherein
the prevention protrusion is provided under the central portion to prevent the magnet, which is accommodated in the recess, from being separated from the recess, and
the inner protrusion is arranged above the prevention protrusion while the magnet is accommodated in the recess.

* * * * *